(12) United States Patent
Geistlinger et al.

(10) Patent No.: US 11,771,104 B2
(45) Date of Patent: *Oct. 3, 2023

(54) FOOD PRODUCTS COMPRISING MILK PROTEINS AND NON-ANIMAL PROTEINS, AND METHODS OF PRODUCING THE SAME

(71) Applicant: Perfect Day, Inc., Berkeley, CA (US)

(72) Inventors: Timothy Geistlinger, Oakland, CA (US); Ravirajsinh Jhala, Foster City, CA (US); Kathryn Patricia Krueger, New Haven, CA (US); Balakrishnan Ramesh, San Francisco, CA (US)

(*) Notice: Subject to any disclaimer, the term of this patent is extended or adjusted under 35 U.S.C. 154(b) by 228 days.

This patent is subject to a terminal disclaimer.

(21) Appl. No.: 16/328,268

(22) PCT Filed: Aug. 25, 2017

(86) PCT No.: PCT/US2017/048730
§ 371 (c)(1),
(2) Date: Feb. 25, 2019

(87) PCT Pub. No.: WO2018/039632
PCT Pub. Date: Mar. 1, 2018

(65) Prior Publication Data
US 2019/0216106 A1    Jul. 18, 2019

Related U.S. Application Data

(60) Provisional application No. 62/379,647, filed on Aug. 25, 2016.

(51) Int. Cl.
| | |
|---|---|
| A23C 9/15 | (2006.01) |
| A23J 3/08 | (2006.01) |
| A23J 3/14 | (2006.01) |
| A23C 9/13 | (2006.01) |
| A23C 19/093 | (2006.01) |
| A23C 9/152 | (2006.01) |
| A23C 11/06 | (2006.01) |
| A23C 20/00 | (2006.01) |
| A23C 21/08 | (2006.01) |

(52) U.S. Cl.
CPC .............. *A23C 9/15* (2013.01); *A23C 9/1315* (2013.01); *A23C 9/1526* (2013.01); *A23C 11/06* (2013.01); *A23C 19/093* (2013.01); *A23C 20/00* (2013.01); *A23C 21/08* (2013.01); *A23J 3/08* (2013.01); *A23J 3/14* (2013.01); *A23V 2002/00* (2013.01)

(58) Field of Classification Search
CPC ....... A23C 9/15; A23C 9/1315; A23C 9/1526; A23C 11/06; A23C 19/093; A23C 20/00; A23C 21/08; A23J 3/08; A23J 3/14; A23V 2002/00
USPC ......... 426/34, 580, 581, 582, 583, 585, 656, 426/657
See application file for complete search history.

(56) References Cited

U.S. PATENT DOCUMENTS

| | | |
|---|---|---|
| 3,873,751 A | 3/1975 | Arndt |
| 4,378,376 A | 3/1983 | Wagner |
| 4,954,361 A | 9/1990 | Girsh |
| 5,063,118 A | 11/1991 | Strandholm |
| 5,514,655 A | 5/1996 | Dewille |
| 5,882,705 A | 3/1999 | Sato |
| 5,942,274 A | 8/1999 | Slattery |
| 6,232,094 B1 | 5/2001 | Hansson |
| 6,270,827 B1 | 8/2001 | Gaull et al. |
| 6,290,974 B1 | 9/2001 | Swaisgood |
| 6,777,016 B2 | 8/2004 | Thresher |
| 6,893,674 B2 | 5/2005 | Lindstrom |
| 8,124,162 B2 | 2/2012 | Passe |
| 8,809,259 B2 | 8/2014 | Berry |
| 9,066,537 B2 | 6/2015 | Hofman |
| 9,682,119 B2 | 6/2017 | Hofman |
| 9,924,728 B2 | 3/2018 | Pandya et al. |
| 10,595,545 B2 | 3/2020 | Pandya et al. |
| 2004/0018292 A1 | 1/2004 | Lindstrom et al. |
| 2005/0170062 A1 | 5/2005 | Burling |
| 2005/0204454 A1 | 9/2005 | Wu |
| 2007/0128341 A1* | 6/2007 | Bakkene .................. A23L 33/19 426/657 |
| 2010/0119691 A1 | 5/2010 | Huang et al. |
| 2010/0223682 A1 | 9/2010 | Katz |
| 2010/0292168 A1 | 11/2010 | Hernandez |
| 2011/0008585 A1 | 1/2011 | Minor et al. |

(Continued)

FOREIGN PATENT DOCUMENTS

| | | |
|---|---|---|
| DE | 20300380 | 1/2003 |
| DE | 20300380 U1 † | 4/2003 |

(Continued)

OTHER PUBLICATIONS

Sayed K. Goda, Yasmin W. Abu Aqel, Mai R. Al-Aswad, Fatma A.B. Rashedy, and Amr 5. Mohamed, Production of Synthetic Methionine-Free and Synthetic Methionine-Limited Alpha Casein: Protein Foodstuff for Patients with Homocystinuria due to Cystathionine Beta-Synthase Deficiency, Protein ),2010, 29, pp. 44 to 49, DOI 10.1 007/s10930-009-921 9-7.

Roslyn M. Bill, Playing Catch-up with *Escherichia coli*: using yeast to increase success rates in recombinant protein production experiments, Frontiers in Microbiology—Perspectives Article, doi: 10.3389/fmicb.2014.00085, Mar. 5, 2014, vol. 5, Article 85, pp. 1 to 5.

Guus Simons, Wim van den Heuvel, Theo Reynen, Adri Frijiters, Ger Rutten, Charles J. Slangen, Martien Groenen. Willem M. de Vos, and Roland J. Siezen, Overproduction of bovine B-casein in *Escherichia coli* and engineering of its main chymosin cleavage site, Protein Engineering, vol. 3, No. 7, pp. 763 to 770, 1993.

(Continued)

*Primary Examiner* — Leslie A Wong
(74) *Attorney, Agent, or Firm* — David R. Conklin; Kirton McConkie

(57) ABSTRACT

Provided are food products comprising milk proteins and non-animal proteins, and methods of manufacturing the same.

42 Claims, 3 Drawing Sheets

(56) References Cited

U.S. PATENT DOCUMENTS

| | | |
|---|---|---|
| 2013/0066048 A1 | 3/2013 | Raskin |
| 2013/0189330 A1 | 7/2013 | Tani |
| 2014/0065264 A1 | 3/2014 | Do |
| 2014/0134294 A1 | 5/2014 | Merrill |
| 2015/0237885 A1 | 8/2015 | Boursier |
| 2017/0099852 A1 † | 4/2017 | Nono |
| 2017/0273328 A1 | 9/2017 | Pandya et al. |

FOREIGN PATENT DOCUMENTS

| | | |
|---|---|---|
| FR | 2092782 | 6/1970 |
| GB | 1556297 | 11/1979 |
| WO | 2008052062 | 5/2008 |
| WO | 2012069546 | 5/2012 |
| WO | 2013009182 | 1/2013 |
| WO | 2013148328 | 10/2013 |
| WO | 2013148330 | 10/2013 |
| WO | 2013148332 | 10/2013 |
| WO | 2013148685 | 10/2013 |
| WO | 2013148685 A1 † | 10/2013 |
| WO | 2013148688 | 10/2013 |
| WO | 2015014742 | 2/2015 |
| WO | 2015054507 | 4/2015 |
| WO | 2015054507 A1 † | 4/2015 |
| WO | 2015145082 A1 | 10/2015 |
| WO | 2016029193 | 2/2016 |
| WO | 2016038184 | 3/2016 |
| WO | 2016049198 | 3/2016 |
| WO | WO 2016/038184 A1 * | 3/2016 |
| WO | 2016097308 | 6/2016 |
| WO | 2016129998 A1 | 8/2016 |
| WO | 2017120597 | 3/2017 |

OTHER PUBLICATIONS

Young C. Kang and T. Richardson, Molecular Cloning and Expression of Bovine k-Casein in *Escherichia coli*, Journal of Dairy Science, vol. 71, No. 1, 1988, pp. 29 to 40.

Tae.Rak Kim, Yuji Goto, Nami Hirota, Kazuo Kuwata, Helen Denton, Su-Ying Wu, Lindsay Sawyer, and Carl A. Batt, High-Level Expression of Bovine B-lactoglobulin in Pichia pastoris and characterization of its physical properties, Protein Engineering, vol. 1 0, No. 1 1, p. 1 339 to 1345,1997.

Ann Viaene, Guido Volckaert, Marcel Joniau, Annie De Baetselier, and Frans Van Cauwelaert, Efficient Expression of Bovine x-lactalbumin in *Saccharomyes cerevisiae*, Eur. J. Blochem. 1991, 202, p. 471 ro 477, EJB 91 0903.

Byung-Kwong Choi and Rafael Jimenez-Flores, Expression and Purification of Glocosylated Bovine B-Casein(170SIP71S) inPichiaPastoris, . . . ,.Agric.FoodChem.,2001,49,pages176I ro1766.

Rafael Jimenez-Flores, Thomas Richardson, and Linda F. Eisson, Expression of Bovine B-Casein in *Saccharomyces cerevisiae* and Characterization of the Protein Produced in Vivo, J. Agric. Food Chem., i990,38, pp. 1'134 to 1141.

NIH Blast Report Comparing the Sequence of Human Alpha-Lactalbumin (Accession No. P00709.1) to Bovine Alpha-Lactalbumin (Accession No. P0071 1.2), Jan. 16, 2019, available at https://blast.ncbi.n 1 m.nih.gov/Blast.cAi.

Anonymous: "Real Vegan Cheese", Real_Vegan_Cheese, Aug. 8, 2014, pp. 1-3.

Anonymous: "Cioning Strategy", Real_Vegan_Cheese, Oct. 16, 2014.

Anonymous: "Ethical, Legal, and Social Implications", Real_Vegan_Cheese, Oct. 16, 2014.

Yirka: "Biohackers reengineering baker's yeast to make vegan cheese," Jul. 15, 2014.

Anonymous: "Molecular Biology", Reai_Vegan_Cheese, Mar. 17, 2015.

Gertz: "Can Biohackers Succeed at Making 'Real Vegan Cheese'?", Aug. 6, 2014.

Chihi_et. al., Heat-Induced Soluble Protein Aggregates from Mixed Pea Globulins and B-Lactoglobulin, J. Agric. Food Chem. 2016, 64 (13), 2780-2791 DOI: 10.1021/acs.jafc.6b00087; Mar. 21.2016.

* cited by examiner
† cited by third party

FOOD PRODUCTS COMPRISING MILK PROTEINS AND NON-ANIMAL PROTEINS, AND METHODS OF PRODUCING THE SAME

This application is a National Stage of International Application No. PCT/US2017/048730, filed Aug. 25, 2017, and entitled FOOD PRODUCTS COMPRISING MILK PROTEINS AND NON-ANIMAL PROTEINS AND METHODS OF PRODUCING THE SAME, which claims the benefit of U.S. Provisional Application No. 62/379,647, filed Aug. 25, 2016. This application claims priority to and incorporates herein by reference the above-referenced applications in their entirety.

FIELD OF THE INVENTION

Provided are food products comprising milk proteins and non-animal proteins, and methods of manufacturing the same.

BACKGROUND OF THE INVENTION

Milk is a popular source of nutrition. It comprises high-quality protein, essential minerals (e.g., calcium, phosphorus, zinc, magnesium), and vitamins (e.g., riboflavin, vitamin A, vitamin B12). In addition, milk components possess advantageous functional characteristics that permit production of a wide variety of derivative dairy products, including yogurt, cheese, cream, ice cream, and butter, which further contribute to the industrial and cultural significance of milk. Global yearly sales of dairy products are over $500 billion, and projected to grow.

Advantageous functional characteristics of milk components include denaturation, aggregation, and interactions of milk proteins, the type and extent of which can be influenced through processing conditions such as time, temperature, pH, protein content, ionic strength, lipid content, carbohydrate content, shear, and enzyme and starter culture action, and are largely responsible for the unique functional and sensory properties of milk and its derivative dairy products.

But milk and its derivative dairy products also harbor attributes that are suboptimal for human consumption, such as, for example, comprising components that cause unhealthy reactions in humans (e.g., allergies, lactose intolerance). Such suboptimal attributes are not easily correctable as milk is a complex mixture of several thousand components, the types and amounts of which are defined by the function of the mammary gland of the animal that produced the milk, which in turn evolved over millions of years to serve the particular needs of the animal's offspring and cannot easily be altered.

There is also widespread concern over the impact of conventional milk production via animal husbandry on animal welfare and the environment, and the potential danger of contaminating products derived from animal husbandry with pathogens, pesticide residues, heavy metals, and aflatoxin M1.

These concerns have fueled development of alternatives to milk and its derivative dairy products, such as lactose-free dairy products and plant- or nut-based dairy-like products (e.g., soy milk, almond milk, coconut milk, pea milk). U.S. sales of lactose-free dairy products in 2015 were $6.7 billion, and U.S. sales of plant- or nut-based dairy-like products in 2015 were $13.7 billion. However, the currently available alternatives to milk fall short on matching the flavor and nutritional profiles of conventionally produced milk, and are limited in their utility for producing alternative derivative dairy products.

Therefore, there exists a need for food products that have identical or superior attributes as milk and/or its derivative dairy products, and for methods for producing such food products.

SUMMARY OF THE INVENTION

Provided herein are food products that comprise one or more native and/or recombinant milk proteins and one or more native and/or recombinant non-animal proteins and/or hydrolyzed non-animal proteins and that has desirable attributes. In some embodiments, the food products are dairy products. In some embodiments, the food products comprise native and/or recombinant milk proteins with non-native glycosylation and/or phosphorylation patterns. In some embodiments, the food products are essentially free of animal lipids, animal carbohydrates, animal proteins other than the one or more milk proteins, allergenic epitopes, and/or lactose.

Also provided herein are yoghurt-like food products that comprise one or more native and/or recombinant milk proteins and one or more native and/or recombinant non-animal proteins and/or hydrolyzed non-animal proteins. In some embodiments, the yoghurt-like food products comprise milk proteins with non-native glycosylation and/or phosphorylation patterns. In some embodiments, the yoghurt-like food products comprise a single milk protein, wherein the single milk protein is β-lactoglobulin.

Also provided herein are methods for producing the food products provided herein.

DETAILED DESCRIPTION OF THE INVENTION

Figure 1:
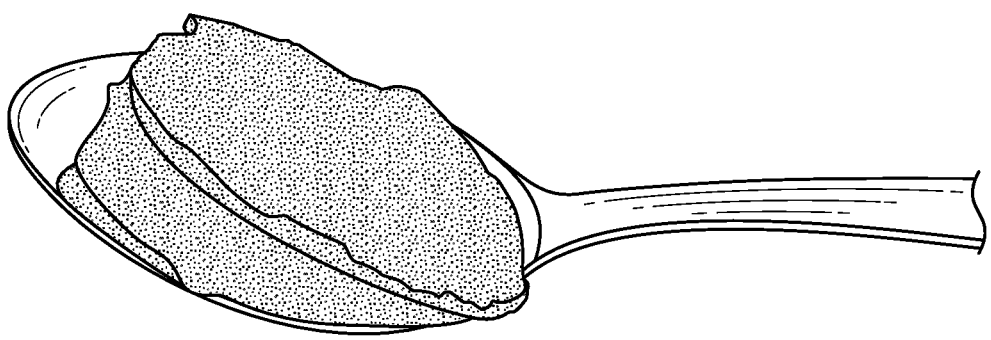
FIG. 1 shows a perspective view of a yoghurt-like food product, in accordance with a representative embodiment of the present invention.

Unless defined otherwise, all technical and scientific terms used herein have the same meaning as is commonly understood by one of ordinary skill in the art to which this disclosure pertains. Further, unless otherwise required by context, singular terms shall include the plural, and plural terms shall include the singular.

Definitions

The terms "a" and "an" and "the" and similar references as used herein refer to both the singular and the plural, unless otherwise indicated herein or clearly contradicted by context.

The terms "about" and "similar to" as used to herein refer to being within an acceptable error range for the particular value as determined by one of ordinary skill in the art, which can depend in part on how the value is measured or determined, or on the limitations of the measurement system.

The term "dairy product" as used herein refers to milk (e.g., whole milk [at least 3.25% milk fat], partly skimmed milk [from 1% to 2% milk fat], skim milk [less than 0.2% milk fat], cooking milk, condensed milk, flavored milk, goat milk, sheep milk, dried milk, evaporated milk, milk foam), and products derived from milk, including but not limited to yogurt (e.g., whole milk yogurt [at least 6 grams of fat per cup], low-fat yogurt [between 2 and 5 grams of fat per cup], nonfat yogurt [less than 0.5 percent milk fat by weight], greek yogurt [strained yogurt with whey removed], whipped yogurt, goat milk yogurt, Labneh [labne], sheep milk yogurt, yogurt drinks [e.g., whole milk Kefir, low-fat milk Kefir], Lassi), cheese (e.g., whey cheese such as ricotta and mozzarella, semi-soft cheese such as Havarti and Munster, medium-hard cheese such as Swiss and Jarlsberg, hard cheese such as Cheddar, soft ripened cheese such as Brie and Camembert, cottage cheese, cream cheese, curd), cream (e.g., whipping cream, coffee whitener, coffee creamer, sour cream, crème fraiche), frozen confections (e.g., ice cream, smoothie, milk shake, frozen yogurt, sundae), butter, infant formula, weight loss beverages, nutritional beverages, pudding, buttermilk, milk protein concentrate, whey protein concentrate, whey protein isolate, casein concentrate, casein isolate, skim milk powder, whole milk powder, nutritional supplements, texturizing blends, flavoring blends, or coloring blends.

The term "essentially free of" as used herein refers to the indicated component being either not detectable in the indicated composition by common analytical methods, or being present in such trace amounts as to not be functional. The term "functional" as used in this context refers to not contributing to properties of the composition comprising the trace amounts of the indicated component, or to not having health-adverse effects upon consumption of the composition comprising the trace amounts of the indicated component.

The term "food product" as used herein refers to a composition that can be ingested by humans or animals, including domesticated animals (e.g., dogs, cats), farm animals (e.g., cows, pigs, horses), and wild animals (e.g., non-domesticated predatory animals). In various embodiments, the food products provided herein meet standards for food safety required by the U.S. Food and Drug Administration (FDA), the U.S. Department of Agriculture, the European Food Safety Authority, and/or other state or region food regulatory agencies. The term includes compositions that can be combined with or added to other ingredients to make compositions that can be ingested by humans or animals.

The terms "glycosylation" and "glycosylated" as used herein refer to the attachment to proteins of glycan groups (i.e., monosaccharides, disaccharides, polysaccharides, linear glycans, branched glycans, glycans with galf residues, glycans with sulfate and/or phosphate residues; see, for example, Deshpande et al. 2008 Glycobiology 18(8):626-37) via C-linkage, N-linkage, or O-linkage, or via glypiation or phosphoglycosylation. Non-limiting examples of such glycan groups include D-glucose, D-galactose, D-mannose, L-fucose, N-acetyl-D-galactose amine, N-acetyl-D-glucose amine, N-acetyl-D-neuraminic acid, galactofuranose, phosphodiesters, acetylglucosamine, acetylgalactosamine, and sialic acid.

The term "glycosylation pattern" as used herein refers to the number and/or distribution and/or types of glycan groups on a protein.

The term "host cell" as used herein refers to a cell into which a recombinant nucleotide sequence has been introduced. It should be understood that such terms are intended to refer not only to the particular subject cell but to the progeny of such a cell. Because certain modifications may occur in succeeding generations due to either mutation or environmental influences, such progeny may not, in fact, be identical to the parent cell, but are still included within the scope of the term "host cell" as used herein.

The term "identical" as used herein in the context of nucleic acid or protein sequences refers to the residues in the two sequences that are the same when aligned for maximum correspondence. The length of sequence identity comparison may be over a stretch of at least 9 nucleotides, at least 20 nucleotides, at least 24 nucleotides, at least 28 nucleotides, at least 32 nucleotides, or at least 36 or more nucleotides. There are a number of different algorithms known in the art that can be used to measure nucleotide sequence or protein sequence identity. For instance, polynucleotide sequences can be compared using FASTA, Gap, or Bestfit, which are programs in Wisconsin Package Version 10.0, Genetics Computer Group (GCG), Madison, Wis. FASTA provides alignments and percent sequence identity of the regions of the best overlap between the query and search sequences (see, for example, Pearson, Methods Enzymol. 183:63-98, 1990, which is hereby incorporated by reference in its entirety). For instance, percent sequence identity between nucleic acid sequences can be determined using FASTA with its default parameters (a word size of 6 and the NOPAM factor for the scoring matrix) or using Gap with its default parameters as provided in GCG Version 6.1, herein incorporated by reference. Alternatively, sequences can be compared using the computer program, BLAST, especially blastp or tblastn (Altschul et al., J. Mol. Biol. 215:403-410, 1990; Gish and States, Nature Genet. 3:266-272, 1993; Madden et al., Meth. Enzymol. 266:131-141, 1996; Altschul et al., Nucleic Acids Res. 25:3389-3402, 1997; Zhang and Madden, Genome Res. 7:649-656, 1997).

The terms "including," "includes," "having," "has," "with," or variants thereof as used herein are intended to be inclusive in a manner similar to the term "comprising".

The term "isolated" as used herein refers to the component being substantially separated from cellular components (e.g., membrane lipids, chromosomes, proteins) of the source from which the component originated. As used herein, the term "isolated" with respect to protein indicates that the preparation of protein is at least 60% pure, e.g., greater than 65%, 70%, 75%, 80%, 85%, 90%, 95%, or 99% pure. The term does not require that the biomolecule has been separated from all other chemicals, although certain isolated biomolecules may be purified to near homogeneity.

The term "milk protein" as used herein refers to a protein that is found in a mammal-produced milk, or a protein that has a sequence that is at least 80% identical (e.g., at least 85%, at least 90%, at least 95% identical) to the sequence of a protein that is found in a mammal-produced milk, as well as to fragments of such proteins, as well as to polypeptides that comprise milk protein repeats. The term "fragment" as used in this context refers to a polypeptide that is shorter in length than a native milk protein (e.g., less than 95%, less than 90%, less than 85%, less than 80%, less than 75%, less than 70%, less than 65%, less than 60%, less than 55%, less than 50%, less than 45%, less than 40%, less than 35%, less than 30%, less than 25%, less than 20%, less than 15%, less than 10%, or less than 5% of the length of the native milk protein). The term "milk protein repeat" as used in this context refers to an amino acid sub-sequence of a native milk protein that is present more than once in a polypeptide (e.g., a concatenated sequence), wherein the repeated amino acid sub-sequences can be consecutive (i.e., have no intervening amino acid sequences) or non-consecutive (i.e., have intervening amino acid sequences).

The term "microbe" as used herein is an abbreviation for microorganism, and refers to a unicellular organism. As used herein, the term includes all bacteria, all archaea, unicellular protista, unicellular animals, unicellular plants, unicellular fungi, unicellular algae, all protozoa, and all chromista.

The term "native" as used herein refers to what is natural.

The term "natural" or "naturally occurring" as used herein refers to what is found in nature.

The term "non-animal" as used herein refers to a component (e.g., protein, lipid, carbohydrate) that is not native to an animal cell.

The term "non-native glycosylation pattern" as used herein refers to a difference in one or more location(s) of glycosylation in a protein, and/or a difference in the amount of and/or type of glycosylation at one or more location(s) in a protein compared to the native protein.

The term "non-purified protein" as used herein refers to a protein preparation in which no protein is more concentrated relative to other proteins in the protein preparation than is the case in the natural source from which the protein preparation is derived.

The nucleic acids disclosed herein may include both sense and antisense strands of RNA, cDNA, genomic DNA, and synthetic forms and mixed polymers of the above. They may be modified chemically or biochemically or may contain non-natural or derivatized nucleotide bases. Such modifications include, for example, labels, methylation, substitution of one or more of the naturally occurring nucleotides with an analog, internucleotide modifications such as uncharged linkages (e.g., methyl phosphonates, phosphotriesters, phosphoramidates, carbamates), charged linkages (e.g., phosphorothioates, phosphorodithioates), pendent moieties (e.g., polypeptides), intercalators (e.g., acridine, psoralen), chelators, alkylators, and modified linkages (e.g., alpha anomeric nucleic acids) Examples of modified nucleotides are described in Malyshev et al., Nature 509:385-388, 2014; and Li et al., J. Am. Chem. Soc. 136:826-829, 2014. Also included are synthetic molecules that mimic polynucleotides in their ability to bind to a designated sequence via hydrogen bonding and other chemical interactions. Such molecules are known in the art and include, for example, those in which peptide linkages substitute for phosphate linkages in the backbone of the molecule. Other modifications can include, for example, analogs in which the ribose ring contains a bridging moiety or other structure such as the modifications found in "locked" nucleic acids.

The terms "optional" or "optionally" as used herein refer to a feature or structure being present or not, or an event or circumstance occurring or not, and that the description includes instances in which a particular feature or structure is present and instances in which the feature or structure is absent, or instances in which the event or circumstance occurs and instances in which the event or circumstance does not occur.

The term "partially purified protein" as used herein refers to a protein preparation in which one or more proteins are between 2-fold and 10-fold more abundant relative to other proteins in the protein preparation than they are present in the natural source from which the protein preparation is derived.

The terms "phosphorylation" and "phosphorylated" as used herein refer to the attachment to proteins of phosphate groups.

The term "phosphorylation pattern" as used herein refers to the number and/or distribution of phosphate groups on a protein.

The term "protein" as used herein refers to a polymeric form of amino acids of any length, which can include coded and non-coded amino acids, chemically or biochemically modified or derivatized amino acids, and polypeptides having modified peptide backbones.

The term "protein concentrate" as used herein refers to a protein material that is obtained from a natural source and/or modified natural source upon removal of at least a portion of (or a substantial portion of) one or more of carbohydrates, lipids, ash, and other minor constituents. It typically comprises at least about 30%, 40%, 50%, 60%, 70%, or 80% by weight of protein.

The term "protein isolate" as used herein refers to a protein material that is obtained from a natural source and/or modified natural source upon removal of at least a portion of (or a substantial portion of) one or more of polysaccharides, soluble carbohydrates, ash, and other minor constituents. It typically has at least about 40%, 50% 60%, 70%, 80%, or 90% by weight of protein.

The term "purified protein" as used herein refers to a protein preparation in which one or more proteins are at least 10-fold more abundant relative to other proteins present in the protein preparation than they are present in the natural source from which the protein preparation is derived.

The term "recombinant" is an art known-term. When referring to a nucleic acid (e.g., a gene), the term can be used, for example, to describe a nucleic acid that has been removed from its naturally occurring environment, a nucleic acid that is not associated with all or a portion of a nucleic acid abutting or proximal to the nucleic acid when it is found in nature, a nucleic acid that is operatively linked to a nucleic acid that it is not linked to in nature, or a nucleic acid that does not occur in nature. The term "recombinant" can be used, e.g., to describe cloned DNA isolates, or a nucleic acid including a chemically-synthesized nucleotide analog. A nucleic acid is also considered "recombinant" if it contains any modifications that do not naturally occur to the corresponding nucleic acid in a genome. For instance, an endogenous coding sequence is considered "recombinant" if it contains an insertion, deletion, or a point mutation introduced artificially, e.g., by human intervention. A "recombinant nucleic acid" also includes a nucleic acid integrated into a host cell chromosome at a heterologous site and a nucleic acid construct present as an episome. When "recombinant" is used to describe a protein, it can refer to, for example, a protein that is produced in a cell of a different species or type as compared to the species or type of cell that produces the protein in nature. The term "recombinant host cell" as used herein refers to a cell into which a recombinant nucleic acid has been introduced. It should be understood that such terms are intended to refer not only to the particular subject cell but to the progeny of such a cell. Because certain modifications may occur in succeeding generations due to either mutation or environmental influences, such progeny may not, in fact, be identical to the parent cell, but are still included within the scope of the term "host cell" as used herein.

The term "secreted fungal protein" as used herein refers to a protein that is native to a fungus and that is natively secreted by the fungus, or to a protein that is at least 80% (e.g., at least 80%, at least 85%, at least 90%, at least 91%, at least 92%, at least 93%, at least 94%, at least 95%, at least 96%, at least 97%, at least 98%, at least 99%, or at least 99.5%) identical to such a protein.

The term "vector" as used herein refers to a nucleic acid molecule capable of transporting another nucleic acid to which it has been linked. One type of vector is a "plasmid," which generally refers to a circular double stranded DNA loop into which additional DNA segments may be ligated, but also includes linear double-stranded molecules such as those resulting from amplification by the polymerase chain reaction (PCR) or from treatment of a circular plasmid with a restriction enzyme. Other vectors include cosmids, bacterial artificial chromosomes (BAC) and yeast artificial chromosomes (YAC). Another type of vector is a viral vector, wherein additional DNA segments may be ligated into the viral genome (discussed in more detail below). Certain vectors are capable of autonomous replication in a host cell into which they are introduced (e.g., vectors having an origin of replication which functions in the host cell). Other vectors can be integrated into the genome of a host cell upon introduction into the host cell, and are thereby replicated along with the host genome.

Recitation of ranges of values herein are merely intended to serve as a shorthand method of referring individually to each separate value inclusively falling within the range, unless otherwise indicated herein, and each separate value is incorporated into the specification as if it were individually recited herein. It should be understood that all ranges and quantities described below are approximations and are not intended to limit the invention. Where ranges and numbers are used these can be approximate to include statistical ranges or measurement errors or variation. In some embodiments, for instance, measurements could be plus or minus 10%.

Food Products

In one aspect, provided herein are food products that comprise one or more native and/or recombinant milk proteins and one or more native and/or recombinant non-animal proteins and that have desirable attributes.

The invention is based on the discovery that milk proteins can be combined with non-animal proteins to produce compositions that have desirable attributes. The invention is further based on the discovery that milk proteins can be produced recombinantly. The invention is further based on the discovery that recombinant milk proteins can be engineered to have specific functional properties, and that combining the engineered recombinant milk proteins with non-animal proteins can produce compositions that have desirable attributes.

These discoveries enable production of food products that are devoid of components that cause unhealthy reactions in humans (e.g., allergens, lactose), that have high nutrient contents (e.g., favorable amino acid profiles, low sugar), and that are optimized for production of milk derivative products (e.g., yoghurt). Additional advantages of the food products provided herein include, for example, advantages in production, including but not limited to smaller negative impacts on the environment (e.g., less carbon dioxide production than the estimated 600 billion kg of carbon dioxide that are produced per year during conventional milk production); no negative impact on animal welfare (e.g., no animal confinement, force feeding, premature weaning, or hormone treatment); smaller resource requirements (e.g., less water used than the estimated 1,000 L/L of water that are used during conventional milk production, less land use, less energy use, less feed, no animals, less shipment due to local production); mitigation of supply chain and production risk (e.g., use of non-animal proteins derived from a greater variety of natural sources providing supply chain variations and increased flexibility in production methods); and reduced production costs.

In some embodiments, the food products comprise only non-purified milk protein and/or non-animal protein. In other embodiments, the food products comprise at least some partially purified milk protein and/or non-animal protein. In yet other embodiments, the food products comprise at least some purified milk protein and/or non-animal protein. In some embodiments, the food products comprise more than 100, more than 50, more than 40, more than 30, more than 20, more than 15, more than 10, more than 5, or more than 2; or no more than 10, no more than 5, no more than 4, no more than 3, or no more than 2 different types of proteins. In some embodiments, the food products comprise more than 50%, more than 60%, more than 70%, more than 80%, more than 90%, or more than 95% by weight of a single type of protein. In some embodiments, the food products comprise less than 50%, less than 40%, less than 30%, less than 20%, less than 10%, or less than 5% by weight of a single type of protein.

In some embodiments, the food products comprise one or more milk proteins and one or more non-animal proteins at weight ratios of total milk protein to total non-animal protein of about 100 to 1, about 50 to 1, about 40 to 1, about 30 to 1, about 20 to 1, about 10 to 1, about 9 to 1, about 8 to 1, about 7 to 1, about 6 to 1, about 5 to 1, about 4 to 1, about 3 to 1, about 2 to 1, about 1 to 1, about 1 to 2, about 1 to 3, about 1 to 4, about 1 to 5, about 1 to 6, about 1 to 7, about 1 to 8, about 1 to 9, about 1 to 10, about 1 to 20, about 1 to 30, about 1 to 40, about 1 to 50, or about 1 to 100.

In some embodiments, the food products further comprise lipids. In some embodiments, the food products further comprise carbohydrates. In some embodiments, the food products further comprise micelles. In some embodiments, the food products further comprise other components disclosed herein.

In some embodiments, the food products resemble dairy products. In some such embodiments, the food products resemble milk, yogurt (i.e., the food products are "yoghurt-like"), cheese (i.e., the food products are "cheese-like"; e.g., Parmesan cheese-like, mozzarella cheese-like, pasta filata cheese-like, processed cheese-like), cream, ice cream, butter, infant formula, milk protein concentrate, whey protein concentrate, whey protein isolate, casein concentrate, casein isolate, skim milk powder, whole milk powder, infant formula, nutritional supplements, texturizing blends, flavoring blends, or coloring blends.

In some embodiments, the food products are vegan. In some embodiments, the food products are kosher. In some embodiments, the food products are halal. In some embodiments, the food products are essentially free of components derived from nuts. In some embodiments, the food products are essentially free of gluten. In some embodiments, the food products are essentially free of allergenic epitopes (e.g., see, for example, Simonetta et al. 2012 Allergenicity of Milk Proteins, Milk Protein, Dr. Walter Hurley (ed.), InTech.). In some embodiments, the food products are essentially free of soy protein. In some embodiments, the compositions are essentially free of saturated lipids. In some embodiments, the food products are essentially free of animal lipids. In some embodiments, the food products are essentially free of cholesterol. In some embodiments, the food products are essentially free of animal carbohydrates. In some embodiments, the food products are essentially free of lactose. In some embodiments, the food products are essentially free of animal proteins other than the one or more native and/or recombinant milk proteins. In some embodiments, the food products are essentially free of serum proteins (e.g., enzymes, growth factors, nutrient transporters, or disease resistance factors found in serum). In some embodiments, the food products are essentially free of whey proteins. In some embodiments, the food products are essentially free of immunoglobulins. In some embodiments, the food products are essentially free of lactoferrin. In some embodiments, the food products are essentially free of caseins. In some embodiments, the food products are essentially free of lactoperoxidase. In some embodiments, the food products are essentially free of lipase. In some embodiments, the food products are essentially free of leukocytes. In some embodiments, the food products are essentially free of infectious agents transmitted by breastfeeding. In some embodiments, the food products are essentially free of antibiotics. In some embodiments, the food products are essentially free of hormones (e.g., stress hormones, growth hormones). In some embodiments, the food products are essentially free of heavy metals. In some embodiments, the food products are essentially free of bacteria (e.g., *E. coli, Brucella, Camplyobacter, Listeria, Mycobacterium, Salmonella, Shigella, Yersinia, Giardia*). In some embodiments, the food products are essentially free of yeast. In some embodiments, the food products are essentially free of viruses (e.g., noroviruses). In some embodiments, the food products are essentially free of prions. In some embodiments, the food products are essentially free of pesticides. In some embodiments, the food products are essentially free of mycotoxins (e.g., aflatoxin).

In some embodiments, the compositions are principally or entirely composed of components derived from non-animal sources. In alternative embodiments, the compositions are composed of components partially derived from animal sources but supplemented with components derived from non-animal sources. In some such embodiments, the compositions comprise 2% or less by weight of components derived from animal.

Milk Proteins

The food products provided herein comprise one or more native and/or recombinant milk proteins.

The milk proteins can be derived from any mammalian species, including but not limited to cow, human, sheep, goat, buffalo, camel, horse, donkey, lemur, panda, guinea pig, squirrel, bear, macaque, gorilla, chimpanzee, mountain goat, monkey, ape, cat, dog, wallaby, rat, mouse, elephant, opossum, rabbit, whale, baboons, gibbons, orangutan, mandrill, pig, wolf, fox, lion, tiger, echidna, and woolly mammoth.

In some embodiments, the food products comprise between 0.1% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, 0.4%, 0.3%, or 0.2%; between 0.2% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, 0.4%, or 0.3%; between 0.3% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, or 0.4%; between 0.4% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, or 0.5%; between 0.5% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, or 0.6%; between 0.6% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, or 0.7%; between 0.7% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, or 0.8%; between 0.8% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, or 0.9%; between 0.9% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, or 1%; between 1% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, or 2%; between 2% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, or 3%; between 3% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, or 4%; between 4% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, or 5%; between 5% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, or 6%; between 6% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, or 7%; between 7% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, or 8%; between 8% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, or 9%; between 9% and 95%, 90%, 85%, 80%, 75%, 70%, 65%, 60%, 55%, 50%, 45%, 40%, 35%, 30%, 25%, 20%, 15%, 14%, 13%, 12%, 11%, or 10%; between 10% and 95%, 90%, 85%, 80%, 75%, 70%, 65%, 60%, 55%, 50%, 45%, 40%, 35%, 30%, 25%, 20%, 15%, 14%, 13%, 12%, or 11%; between 11% and 95%, 90%, 85%, 80%, 75%, 70%, 65%, 60%, 55%, 50%, 45%, 40%, 35%, 30%, 25%, 20%, 15%, 14%, 13%, or 12%; between 12% and 95%, 90%, 85%, 80%, 75%, 70%, 65%, 60%, 55%, 50%, 45%, 40%, 35%, 30%, 25%, 20%, 15%, 14%, or 13%; between 13% and 95%, 90%, 85%, 80%, 75%, 70%, 65%, 60%, 55%, 50%, 45%, 40%, 35%, 30%, 25%, 20%, 15%, or 14%; between 14% and 95%, 90%, 85%, 80%, 75%, 70%, 65%, 60%, 55%, 50%, 45%, 40%, 35%, 30%, 25%, 20%, or 15%; between 15% and 95%, 90%, 85%, 80%, 75%, 70%, 65%, 60%, 55%, 50%, 45%, 40%, 35%, 30%, 25%, or 20%; between 20% and 95%, 90%, 85%, 80%, 75%, 70%, 65%, 60%, 55%, 50%, 45%, 40%, 35%, 30%, or 25%; between 25% and 95%, 90%, 85%, 80%, 75%, 70%, 65%, 60%, 55%, 50%, 45%, 40%, 35%, or 30%; between 30% and 95%, 90%, 85%, 80%, 75%, 70%, 65%, 60%, 55%, 50%, 45%, 40%, or 35%; between 35% and 95%, 90%, 85%, 80%, 75%, 70%, 65%, 60%, 55%, 50%, 45%, or 40%; between 40% and 95%, 90%, 85%, 80%, 75%, 70%, 65%, 60%, 55%, 50%, or 45%; between 44% and 95%, 90%, 85%, 80%, 75%, 70%, 65%, 60%, 55%, or 50%; between 50% and 95%, 90%, 85%, 80%, 75%, 70%, 65%, 60%, or 55%; between 55% and 95%, 90%, 85%, 80%, 75%, 70%, 65%, or 60%; between 60% and 95%, 90%, 85%, 80%, 75%, 70%, or 65%; between 65% and 95%, 90%, 85%, 80%, 75%, or 70%; between 70% and 95%, 90%, 85%, 80%, or 75%; between 75% and 95%, 90%, 85%, or 80%; between 80% and 95%, 90%, or 85%; or between 85% and 95%, 90%; or between 90% and 95% by weight of milk proteins.

The milk proteins can be a single type of milk protein (e.g., only β-lactoglobulin) or two or more different types of milk protein (e.g., β-lactoglobulin and κ-casein and α-lactoalbumin).

In some embodiments, the milk proteins are caseins. The caseins can be native or recombinant caseins, or combinations thereof. Non-limiting examples of caseins include *Bos taurus* β-casein, *Bos taurus* γ-caseins, *Bos taurus* κ-caseins, *Bos taurus* α-S1-caseins, *Bos taurus* α-S2-caseins, and mixtures thereof. Food products comprising β-caseins are desirable as β-caseins aide in emulsification of other ingredients (e.g., other proteins) in food products. Food products comprising κ-caseins are desirable as κ-casein comprises sites for enzyme rennet activity, which is key to making cheese. Food products comprising α-S1-caseins are desirable as α-S1-caseins are essential to flavor development and ripening of aged cheese varieties. In some embodiments, the caseins are less than 5 different types of caseins, less than 4 different types of caseins, less than 3 different types of caseins (e.g., 2 types of caseins, such as κ-casein and β-casein), or less than 2 different types of caseins (i.e., a single type of casein; e.g., only κ-casein).

In some embodiments, the milk proteins are whey proteins. The whey proteins can be native or recombinant whey proteins, or combinations thereof. Non-limiting examples of whey proteins include α-lactalbumins, β-lactoglobulins, lactoferrins, transferrins, serum albumins, lactoperoxidases, glycomacropeptides, and mixtures thereof. Food products comprising β-lactoglobulin and/or α-lactoalbumin are desirable, particularly for athletes, as β-lactoglobulin and α-lactoalbumin have high contents of branched amino acids, which are thought to aide production of muscle tissue. Moreover, β-lactoglobulin is desirable as a food additive as it has good water binding ability, which property makes β-lactoglobulin suitable for managing water activity of food products (see, for example, Gustavo et al. Water Activity in Foods: Fundamentals and Applications, October 2007, Wiley-Blackwell, ISBN: 978-0-8138-2408-6) and as an anti-microbial agent that can extend the shelf life of food products. Another property that makes β-lactoglobulin a desirable food additive is that β-lactoglobulin can readily absorb at interfaces and produce highly stable dispersions. Food products comprising lactoferrin are desirable as lactoferrin binds free iron and depletes microorganisms from essential substances needed for their growth, making it suitable for use as an anti-bacterial and anti-viral agent in food products such as infant formula, functional dairy products, and dietary supplements. Food products comprising lactoperoxidase are desirable as lactoperoxidase is suitable for use as a preservative. In some embodiments, the whey protein is a single type of whey protein. In some such embodiments, the single type of whey protein is β-lactoglobulin. In other such embodiments, the single type of whey protein is α-lactalbumin.

In some embodiments, the food products comprise caseins and whey proteins. In some such embodiments, the food products comprise total caseins and total whey proteins at ratios of about 10 to 1, about 9 to 1, about 8 to 1, about 7 to 1, about 6 to 1, about 5 to 1, about 4 to 1, about 3 to 1, about 2 to 1, about 1 to 1, about 1 to 2, about 1 to 3, about 1 to 4, about 1 to 5, about 1 to 6, about 1 to 7, about 1 to 8, about 1 to 9, or about 1 to 10.

Non-limiting examples of caseins and whey proteins, and nucleic acid sequences encoding caseins and whey proteins, are disclosed in PCT filing PCT/US2015/046428 filed Aug. 21, 2015, which is hereby incorporated herein in its entirety, and Table 1.

TABLE 1

Non-Limiting Examples of Whey Proteins

| Uniprote Protein ID | Description |
|---|---|
| A0JNP2 | Secretoglobin family 1D member |
| A1YZ34 | Xanthine oxidoreductase |
| A2I7M9 | Serpin A3-2 |
| A2I7N2 | Serpin A3-6 |
| A2SY11 | Lipoprotein lipase |
| A5D7Q2 | PutAtive uncharacterized protein |
| A5JSS7 | GlycosylAtion-dependent cell adhesion molecule-1 |
| A5JST2 | Serum amyloid A protein |
| A5YVD9 | 45 kDa calcium-binding protein |
| A6H7J6 | Protein disulfide-isomerase |
| A6QLY8 | IGFBP7 protein |
| A6QM09 | PutAtive uncharacterized protein |
| A6QNJ8 | GANAB protein (Fragment) |
| A6QNW7 | CD5L protein |
| A6QPP2 | SERPIND1 protein |
| A6QPQ2 | Serpin A3-8 |
| A7E340 | Mucin 15, cell surface associAted |
| A7E350 | Plasminogen |
| A7E3W4 | Transketolase |
| A8DR93 | HeAt shock protein alpha |
| B0JYP6 | IGK protein |
| B5TBC9 | CD14 (Fragment) |
| B8XH67 | Solute carrier family 9 member 3 regulAtor 1 |
| D2U6Q1 | Haptoglobin (Fragment) |
| D4QBF4 | Hemoglobin beta |
| D6PX62 | Cysteine-rich secretory protein 3 |
| E1B6Z6 | Uncharacterized protein (Fragment) |
| E1B8H1 | Uncharacterized protein |
| E1BA17 | Uncharacterized protein |
| E1BI82 | Uncharacterized protein |
| E1BJL8 | Uncharacterized protein |
| E1BMJ0 | Uncharacterized protein |
| E3VVJ1 | Prosaposin variant 1 |
| E3VVJ2 | Prosaposin variant 2 |
| F1MAV0 | Uncharacterized protein |
| F1MFI4 | Uncharacterized protein (Fragment) |
| F1MK50 | Uncharacterized protein (Fragment) |
| F1MLW7 | Uncharacterized protein |
| F1MLW8 | Uncharacterized protein |
| F1MNV5 | Uncharacterized protein |
| F1MR22 | Uncharacterized protein |
| F1MSZ6 | Uncharacterized protein |
| F1MUT3 | Uncharacterized protein |
| F1MWU9 | Uncharacterized protein |
| F1MZA0 | Uncharacterized protein (Fragment) |
| F1MZN6 | Uncharacterized protein (Fragment) |
| F1N2D9 | Uncharacterized protein |
| F1N5M2 | Uncharacterized protein |
| F1N726 | Uncharacterized protein |
| F1RQU2 | Uncharacterized protein |
| F1RQW8 | Uncharacterized protein |
| F1RRP2 | Uncharacterized protein |
| F1RXG3 | Uncharacterized protein (Fragment) |
| F1S3Y7 | Uncharacterized protein (Fragment) |
| F1S9A4 | Uncharacterized protein |
| F5BZ34 | Milk fAt globule EGF factor 8 (Fragment) |
| F8U3U7 | CD36 |
| G0Z2N2 | L-lactAte dehydrogenase |
| G3EHG6 | Adipose differentiAtion-relAted protein |
| G3N0S9 | Uncharacterized protein |
| G3N0V0 | Uncharacterized protein (Fragment) |

TABLE 1-continued

Non-Limiting Examples of Whey Proteins

| Uniprote Protein ID | Description |
|---|---|
| G3N1U4 | Uncharacterized protein |
| G3N2D7 | Uncharacterized protein (Fragment) |
| G3N2D8 | Uncharacterized protein |
| G3N342 | Uncharacterized protein (Fragment) |
| G5CC03 | Milk fAt globule EGF factor 8 protein (Fragment) |
| G5E513 | Uncharacterized protein (Fragment) |
| G5E5T5 | Uncharacterized protein (Fragment) |
| G5E604 | Uncharacterized protein (Fragment) |
| G8JKW7 | Uncharacterized protein |
| O18738 | Dystroglycan |
| O18836 | Growth/differentiAtion factor 8 |
| O97896 | Xanthine:oxygen oxidoreductase (Fragment) |
| P00442 | Superoxide dismutase [Cu—Zn] |
| P00735 | Prothrombin |
| P00978 | Protein AMBP |
| P01888 | Beta-2-microglobulin |
| P01966 | Hemoglobin subunit alpha |
| P02672 | Fibrinogen alpha chain |
| P02702 | FolAte receptor alpha |
| P08037 | Beta-1,4-galactosyltransferase 1 |
| P09837 | Whey acidic protein |
| P0CB32 | HeAt shock 70 kDa protein 1-like |
| P10790 | FAtty acid-binding protein |
| P12763 | Alpha-2-HS-glycoprotein |
| P13696 | PhosphAtidylethanolamine-binding protein 1 |
| P15497 | Apolipoprotein A-I |
| P15522 | GlycosylAtion-dependent cell adhesion molecule 1 |
| P17690 | Beta-2-glycoprotein 1 |
| P17697 | Clusterin |
| P18892 | Butyrophilin subfamily 1 member A1 |
| P19120 | HeAt shock cognAte 71 kDa protein |
| P20757 | Angiotensinogen |
| P21809 | Biglycan |
| P21856 | Rab GDP dissociAtion inhibitor alpha |
| P22226 | CAthelicidin-1 |
| P26201 | PlAtelet glycoprotein 4 |
| P26779 | ProactivAtor polypeptide |
| P28801 | GlutAthione S-transferase P |
| P31096 | Osteopontin |
| P34955 | Alpha-1-antiproteinase |
| P50397 | Rab GDP dissociAtion inhibitor beta |
| P50448 | Factor XIIa inhibitor |
| P55859 | Purine nucleoside phosphorylase |
| P60712 | Actin, cytoplasmic 1 |
| P62833 | Ras-relAted protein Rap-1A |
| P62935 | Peptidyl-prolyl cis-trans isomerase A |
| P62992 | Ubiquitin-40S ribosomal protein S27a |
| P63048 | Ubiquitin-60S ribosomal protein L40 |
| P63258 | Actin, cytoplasmic 2 |
| P79345 | Epididymal secretory protein E1 |
| P80195 | GlycosylAtion-dependent cell adhesion molecule 1 |
| P80221 | C—X—C motif chemokine 6 |
| P80457 | Xanthine dehydrogenase/oxidase |
| P81187 | Complement factor B |
| P81265 | Polymeric immunoglobulin receptor |
| Q03247 | Apolipoprotein E |
| Q06B57 | FAtty acid synthase |
| Q08DW4 | Mannan-binding lectin serine peptidase 1 |
| Q0IIH5 | Nucleobindin 2 |
| Q0P569 | Nucleobindin-1 |
| Q0VCM5 | Inter-alpha-trypsin inhibitor heavy chain H1 |
| Q0VCX2 | 78 kDa glucose-regulAted protein |
| Q148D9 | Cellular repressor of E1A-stimulAted genes 1 |
| Q27965 | HeAt shock 70 kDa protein 1B |
| Q27975 | HeAt shock 70 kDa protein 1A |
| Q28178 | Thrombospondin-1 |
| Q28452 | Quinone oxidoreductase |
| Q29437 | Primary amine oxidase, liver isozyme |
| Q29545 | Inhibitor of carbonic anhydrase |
| Q29RQ1 | Complement component C7 |
| Q2HJ49 | Moesin |
| Q2KIF2 | Leucine-rich alpha-2-glycoprotein 1 |
| Q2KIS7 | Tetranectin |
| Q2KIT0 | Protein HP-20 homolog |
| Q2KJ32 | Selenium-binding protein 1 |
| Q2KJF1 | Alpha-1B-glycoprotein |
| Q2TBI0 | Lipopolysaccharide-binding protein |
| Q2UVX4 | Complement C3 |
| Q307G4 | Cytosolic NADP-isocitrAte dehydrongenase (Fragment) |
| Q32KV6 | Nucleotide exchange factor SIL1 |
| Q32PJ2 | Apolipoprotein A-IV |
| Q3MHN5 | Vitamin D-binding protein |
| Q3MHX6 | Protein OS-9 |
| Q3SX14 | Gelsolin |
| Q3SYR8 | Immunoglobulin J chain |
| Q3SZR3 | Alpha-1-acid glycoprotein |
| Q3SZV7 | Hemopexin |
| Q3SZZ9 | FGG protein |
| Q3T052 | Inter-alpha-trypsin inhibitor heavy chain H4 |
| Q3T0Z0 | Uncharacterized protein |
| Q3T101 | IGL@ protein |
| Q3ZBY4 | Fructose-bisphosphAte aldolase |
| Q3ZCH5 | Zinc-alpha-2-glycoprotein |
| Q3ZCL0 | Cysteine-rich secretory protein 2 |
| Q58DP6 | Ribonuclease, RNase A family, 4 |
| Q5DPW9 | CystAtin E/M |
| Q5E946 | Protein DJ-1 |
| Q5J801 | Endopin 2B |
| Q7SIH1 | Alpha-2-macroglobulin |
| Q8SQ82 | Polymeric immunoglobulin receptor (Fragment) |
| Q95114 | Lactadherin |
| Q95121 | Pigment epithelium-derived factor |
| Q95122 | Monocyte differentiAtion antigen CD14 |
| Q95M18 | Endoplasmin |
| Q9GJW6 | Peroxidase |
| Q9GK12 | Peptidoglycan recognition protein 1 |
| Q9MZ06 | Fibroblast growth factor-binding protein 1 |
| Q9TRB9 | Enterotoxin-binding glycoprotein PP20K (Fragment) |
| Q9TSF1 | Butyrophilin (Fragment) |
| Q9TTE1 | Serpin A3-1 |
| Q9TUM6 | Perilipin-2 |
| Q9XSG3 | IsocitrAte dehydrogenase [NADP] cytoplasmic |
| Q9XSH0 | Secreted folAte binding protein |
| Q9XSJ4 | Alpha-enolase |
| Q9XT27 | Ceruloplasmin |

Caseins and whey proteins can also be proteins that are at least 80% (e.g., at least 80%, at least 85%, at least 90%, at least 91%, at least 92%, at least 93%, at least 94%, at least 95%, at least 96%, at least 97%, at least 98%, at least 99%, or at least 99.5%) identical to native caseins and native whey proteins, respectively, and nucleic acids encoding caseins and whey proteins can also be nucleic acids that encode proteins that are at least 80% (e.g., at least 80%, at least 85%, at least 90%, at least 91%, at least 92%, at least 93%, at least 94%, at least 95%, at least 96%, at least 97%, at least 98%, at least 99%, or at least 99.5%) identical to native caseins and native whey proteins, respectively.

In some embodiments, the milk proteins are glycosylated. In some such embodiments, the milk proteins have native glycosylation. In other such embodiments, the milk proteins have non-native glycosylation. In some such embodiments, the non-native glycosylation is non-mammalian glycosylation (i.e., glycosylation not found in a mammal). In various embodiments, the food products provided herein comprise one or more milk proteins with native glycosylation, or one or more proteins with non-native glycosylation, or mixtures thereof. In some embodiments, the milk proteins have a native number and/or distribution of consensus sequences for N-glycosylation (e.g., amino acid sequence Asn—X—See/Thr, wherein X is any amino acid residue), O-glycosylation, and/or C-glycosylation. In various embodiments, the food products provided herein comprise one or more milk proteins with native glycosylation, or one or more proteins with non-native glycosylation, or mixtures thereof. In some embodiments, the milk proteins have a non-native number and/or distribution of consensus sequences for N-glycosylation, O-glycosylation, and/or C-glycosylation (see, for example, Tatsumi et al. 2012 Biosci. Biotechnol. Biochem. 76(3):478; Kalidas et al. 2001 Protein Eng. 14(3):201).

In some embodiments, the milk proteins are phosphorylated. In some such embodiments, the milk proteins have native phosphorylation. In other such embodiments, the milk proteins have non-native phosphorylation. Altered phosphorylation can influence properties of milk proteins (e.g., increase solubility, hydrophilicity, heat stability), which in some embodiments can make such milk proteins more suitable for use in the food products provided herein (for example, proteins with better solubility are more suitable for production of beverages). In various embodiments, the food products provided herein comprise one or more milk proteins with native phosphorylation, or one or more proteins with non-native phosphorylation, or mixtures thereof. In some embodiments, the milk proteins have a non-native number and/or distribution of amino acid residues capable of being phosphorylated (e.g., tyrosine, threonine, serine).

In some embodiments in which the food products comprise recombinant milk proteins, the recombinant milk proteins lack epitopes that can elicit immune responses in human or animals.

In some embodiments in which the food products comprise recombinant milk proteins, the recombinant milk proteins can have one or more identical or similar properties as equivalent native milk proteins. In other embodiments in which the food products comprise recombinant milk proteins, the recombinant milk proteins can have one or more different properties than equivalent native milk proteins. Non-limiting examples of such properties include solubility, turbidity, effect on viscosity, ability to withstand heat (i.e., aggregation or precipitation upon heating), ability to bind specific types or amounts of compounds (e.g., water, minerals [e.g., calcium, phosphate, zinc], vitamins [e.g., vitamin D], micronutrients, carotenoids), digestibility (i.e., rate at which a composition is degraded in a human or animal intestinal tract), ability to form micelles, ability to form micelles that encapsulate specific types or amounts of compounds (e.g., water, minerals [e.g., calcium, phosphate, zinc], vitamins [e.g., vitamin D], micronutrients, carotenoids), ability to form micelles of specific sizes, ability to form micelles of specific digestibility, ability to form micelles with specific stabilities at specific temperatures (e.g., refrigeration, ambient temperature, heat), ability to form micelles that have similar or superior emulsifying qualities as micelles comprised in milk or other dairy products, ability to form micelle aggregates (e.g., in response to changes in pH, salt concentration, enzymes [e.g., renin; "rennet coagulability"]), and ability to be encapsulated by micelles. The ability to from micelles can be determined experimentally, for example, by combining the micelle forming proteins in water or oil, homogenizing the mixture, and analyzing the types and amounts of micelles formed. The ability of compounds to be encapsulated by micelles can be determined experimentally by combining the compounds with micelle forming proteins, homogenizing the mixture, extracting the micelles (e.g., via centrifugation at 14,000 g), and determining the concentration of the compounds left in the liquid phase. The emulsifying quality of micelles can be measured using a rheometer.

Non-Animal Proteins

The food products provided herein comprise one or more native and/or recombinant non-animal proteins.

The non-animal proteins can be derived from any one or more non-animal sources. Non-animal sources may be obtained from a variety of sources including but not limited to nature (e.g., lakes, oceans, soils, rocks, gardens, forests, plants, animals), brewery stores, and commercial cell banks (e.g., ATCC, collaborative sources).

Suitable non-animal sources include naturally occurring plants, algae, fungi, or microbes.

Examples of suitable plants include but are not limited to spermatophytes (spermatophyta), acrogymnospermae, angiosperms (magnoliophyta), ginkgoidae, pinidae, mesangiospermae, cycads, *Ginkgo*, conifers, gnetophytes, *Ginkgo biloba*, cypress, junipers, *thuja*, cedarwood, pines, *angelica*, caraway, coriander, cumin, fennel, parsley, dill, dandelion, helichrysum, marigold, mugwort, safflower, camomile, lettuce, wormwood, calendula, citronella, sages, thyme, chia seed, mustard, olive, coffee, *capsicum*, eggplant, paprika, cranberry, kiwi, vegetable plants (e.g., carrot, celery), *tagetes*, tansy, tarragon, sunflower, wintergreen, basil, hyssop, lavender, lemon *verbena*, marjoram, melissa, patchouli, pennyroyal, peppermint, rosemary, sesame, spearmint, primroses, samara, pepper, pimento, potato, sweet potato, tomato, blueberry, nightshades, *petunia*, morning glory, lilac, jasmin, honeysuckle, snapdragon, *psyllium*, wormseed, buckwheat, amaranth, chard, *quinoa*, spinach, rhubarb, jojoba, cypselea, *chlorella*, manila, hazelnut, canola, kale, bok choy, rutabaga, frankincense, myrrh, elemi, hemp, pumpkin, squash, curcurbit, manioc, *dalbergia*, legume plants (e.g., alfalfa, lentils, beans, clovers, peas, fava coceira, frijole bola roja, frijole negro, *lespedeza*, licorice, lupin, mesquite, carob, soybean, peanut, tamarind, *wisteria, cassia*, chickpea, garbanzo, fenugreek, green pea, yellow pea, snow pea, lima bean, fava bean), geranium, flax, pomegranate, cotton, okra, neem, fig, mulberry, clove, *eucalyptus*, tea tree, niaouli, fruiting plants (e.g., apple, apricot, peach, plum, pear, nectarine), strawberry, blackberry, raspberry, cherry, prune, rose, tangerine, citrus (e.g., grapefruit, lemon, lime, orange, bitter orange, mandarin), mango, citrus bergamot, buchu, grape, broccoli, brussels, sprout, camelina, cauliflower, rape, rapeseed (canola), turnip, cabbage, cucumber, watermelon, honeydew melon, zucchini, birch, walnut, cassava, baobab, allspice, almond, breadfruit, sandalwood, macadamia, taro, tuberose, aloe vera, garlic, onion, shallot, vanilla, *yucca*, vetiver, galangal, barley, corn, *curcuma aromatica*, ginger, lemon grass, oat, palm, pineapple, rice, rye, sorghum, triticale, turmeric, yam, bamboo, barley, cajuput, *canna*, cardamom, maize, oat, wheat, cinnamon, *sassafras, lindera benzoin*, bay laurel, avocado, ylang-ylang, mace, nutmeg, moringa, horsetail, oregano, cilantro, chervil, chive, aggregate fruits, grain plants, herbal plants, leafy vegetables, non-grain legume plants, nut plants, succulent plants, land plants, water plants, delbergia, millets, drupes, schizocarps, flowering plants, non-flowering plants, cultured plants, wild plants, trees, shrubs, flowers, grasses, herbaceous plants, brushes, lianas, cacti, green algae, tropical plants, subtropical plants, temperate plants, and derivatives and crosses thereof.

Examples of suitable algae include but are not limited to green algae (e.g., *Chlorella*), brown algae (e.g., *Alaria marginata, Analipus japonicus, Ascophyllum nodosum, Ecklonia* sp, *Eisenia bicyclis, Hizikia fusiforme, Kjellmaniella gyrata, Laminaria angustata, Laminaria longirruris, Laminaria Longissima, Laminaria ochotensis, Laminaria claustonia, Laminaria saccharina, Laminaria digitata, Laminaria japonica, Macrocystis pyrifera, Petalonia fascia,*

*Scytosiphon lome*), red algae (e.g., Gigartinaceae, Soliericeae, *Chondrus crispus, Chondrus ocellatus, Eucheuma cottonii, Eucheuma spinosum, Furcellaria fastigiata, Gracilaria bursa-pastoris, Gracilaria lichenoides, Gloiopeltis furcata, Gigartina acicularis, Gigartina bursa-pastoris, Gigartina pistillata, Gigartina radula, Gigartina skottsbergii, Gigartina stellata, Palmaria palmata, Porphyra columbina, Porphyra crispata, Porhyra deutata, Porhyra perforata, Porhyra suborbiculata, Porphyra tenera, Porphyridium cruentum, Porphyridium purpureum, Porphyridium aerugineum, Rhodella maculate, Rhodella reticulata, Rhodella violacea, Rhodophyceae, Rhodymenia palmata*), and derivatives and crosses thereof.

Examples of suitable fungi include but are not limited to *Aspergillus* sp., *Aspergillus nidulans, Aspergillus niger, Aspergillus niger* var. *awamori, Aspergillus oryzae, Candida albicans, Candida etchellsii, Candida guilliermondii, Candida humilis, Candida lipolytica, Candida pseudotropicalis, Candida utilis, Candida versatilis, Chrysosporium lucknowense, Debaryomyces hansenii, Endothia parasitica, Eremothecium ashbyii, Fusarium* sp., *Fusarium gramineum, Fusarium moniliforme, Fusarium venenatum, Hansenula polymorpha, Kluyveromyces* sp., *Kluyveromyces lactis, Kluyveromyces marxianus, Kluyveromyces marxianus* var. *lactis, Kluyveromyces thermotolerans, Morteirella vinaceae* var. *raffinoseutilizer, Mucor miehei, Mucor miehei* var. Cooney et Emerson, *Mucor pusillus* Lindt *Myceliophthora thermophile, Neurospora crassa, Penicillium roquefortii, Physcomitrella patens, Pichia* sp., *Pichia pastoris, Pichia finlandica, Pichia trehalophila, Pichia koclamae, Pichia membranaefaciens, Pichia minuta* (*Ogataea minuta, Pichia lindneri*), *Pichia opuntiae, Pichia thermotolerans, Pichia salictaria, Pichia guercuum, Pichia pijperi, Pichia stiptis, Pichia methanolica, Rhizopus niveus, Rhodotorula* sp., *Saccharomyces* sp., *Saccharomyces bayanus, Saccharomyces beticus, Saccharomyces cerevisiae, Saccharomyces chevalieri, Saccharomyces diastaticus, Saccharomyces ellipsoideus, Saccharomyces exiguus, Saccharomyces florentinus, Saccharomyces fragilis, Saccharomyces pastorianus, Saccharomyces pombe, Saccharomyces sake, Saccharomyces uvarum, Sporidiobolus johnsonii, Sporidiobolus salmonicolor, Sporobolomyces roseus, Trichoderma, Trichoderma reesei, Xanthophyllomyces dendrorhous, Yarrowia lipolytica, Zygosaccharomyces rouxii*, and derivatives and crosses thereof.

Examples of suitable microbes include but are not limited to firmicutes, cyanobacteria (blue-green algae), oscillatoriophcideae, bacillales, lactobacillales, oscillatoriales, bacillaceae, lactobacillaceae, *Acetobacter suboxydans, Acetobacter xylinum, Actinoplane missouriensis, Arthrospira platensis, Arthrospira maxima, Bacillus cereus, Bacillus coagulans, Bacillus subtilus, Bacillus cerus, Bacillus licheniformis, Bacillus stearothermophilus, Bacillus subtilis, Escherichia coli, Lactobacillus acidophilus, Lactobacillus bulgaricus, Lactococcus lactis, Lactococcus lactis* Lancefield Group N, *Lactobacillus reuteri, Leuconostoc citrovorum, Leuconostoc dextranicum, Leuconostoc mesenteroides* strain NRRL B-512(F), *Micrococcus lysodeikticus, Spirulina, Streptococcus cremoris, Streptococcus lactis, Streptococcus lactis* subspecies *diacetylactis, Streptococcus thermophilus, Streptomyces chattanoogensis, Streptomyces griseus, Streptomyces natalensis, Streptomyces olivaceus, Streptomyces olivochromogenes, Streptomyces rubiginosus, Tetrahymena thermophile, Tetrahymena hegewischi, Tetrahymena hyperangularis, Tetrahymena malaccensis, Tetrahymena pigmentosa, Tetrahymena pyriformis*, and *Tetrahymena vorax*, and *Xanthomonas campestris*, and derivatives and crosses thereof.

In some embodiments, the food products comprise between 0.01% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, 0.1%, or 0.05%; between 0.05% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, or 0.1%; between 0.1% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, 0.4%, 0.3%, or 0.2%; between 0.2% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, 0.4%, or 0.3%; between 0.3% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, or 0.4%; between 0.4% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, or 0.5%; between 0.5% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, or 0.6%; between 0.6% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, or 0.7%; between 0.7% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, or 0.8%; between 0.8% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, or 0.9%; between 0.9% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, or 1%; between 1% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, or 2%; between 2% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, or 3%; between 3% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, or 4%; between 4% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, or 5%; between 5% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, or 6%; between 6% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, or 7%; between 7% and 90%, 85%, 80%, 75%, 70%, 65%, 60%, 55%, 50%, 45%, 40%, 35%, 30%, 25%, 20%, 15%, 14%, 13%, 12%, 11%, 10%, 9%, or 8%; between 8% and 90%, 85%, 80%, 75%, 70%, 65%, 60%, 55%, 50%, 45%, 40%, 35%, 30%, 25%, 20%, 15%, 14%, 13%, 12%, 11%, 10%, or 9%; between 9% and 90%, 85%, 80%, 75%, 70%, 65%, 60%, 55%, 50%, 45%, 40%, 35%, 30%, 25%, 20%, 15%, 14%, 13%, 12%, 11%, or 10%; between 10% and 90%, 85%, 80%, 75%, 70%, 65%, 60%, 55%, 50%, 45%, 40%, 35%, 30%, 25%, 20%, 15%, 14%, 13%, 12%, or 11%; between 11% and 90%, 85%, 80%, 75%, 70%, 65%, 60%, 55%, 50%, 45%, 40%, 35%, 30%, 25%, 20%, 15%, 14%, 13%, or 12%; between 12% and 90%, 85%, 80%, 75%, 70%, 65%, 60%, 55%, 50%, 45%, 40%, 35%, 30%, 25%, 20%, 15%, 14%, or 13%; between 13% and 90%, 85%, 80%, 75%, 70%, 65%, 60%, 55%, 50%, 45%, 40%, 35%, 30%, 25%, 20%, 15%, or 14%; between 14% and 90%, 85%, 80%, 75%, 70%, 65%, 60%, 55%, 50%, 45%, 40%, 35%, 30%, 25%, 20%, or 15%; between 15% and 90%, 85%, 80%, 75%, 70%, 65%, 60%, 55%, 50%, 45%, 40%, 35%, 30%, 25%, or 20%; between 20% and 90%, 85%, 80%, 75%, 70%, 65%, 60%, 55%, 50%, 45%, 40%, 35%, 30%, or 25%; between 25% and 90%, 85%, 80%, 75%, 70%, 65%, 60%, 55%, 50%, 45%, 40%, 35%, or 30%; between 30% and 90%, 85%, 80%, 75%, 70%, 65%, 60%, 55%, 50%, 45%, 40%, or 35%; between 35% and 90%, 85%, 80%, 75%, 70%, 65%, 60%, 55%, 50%, 45%, or 40%; between 40% and 90%, 85%, 80%, 75%, 70%, 65%, 60%, 55%, 50%, or 45%; between 44% and 90%, 85%, 80%, 75%, 70%, 65%, 60%, 55%, or 50%; between 50% and 90%, 85%, 80%, 75%, 70%, 65%, 60%, or 55%; between 55% and 90%, 85%, 80%, 75%, 70%, 65%, or 60%; between 60% and 90%, 85%, 80%, 75%, 70%, or 65%; between 65% and 90%, 85%, 80%, 75%, or 70%; between 70% and 90%, 85%, 80%, or 75%; between 75% and 90%, 85%, or 80%; between 80% and 90%, or 85%; or between 85% and 90% by weight of non-animal protein.

The non-animal proteins can be native or recombinant non-animal proteins, or combinations thereof. In some embodiments, the non-animal proteins are hydrolyzed native or recombinant non-animal proteins. In some such embodiments, the hydrolyzed non-animal proteins do not comprise terminal leucine and/or valine amino acids as terminal leucine and valine amino acid residues can impart a bitter taste on proteins.

In some embodiments, at least some of the non-animal protein is derived from pea (i.e., pea proteins). The pea proteins may be derived from whole pea, or from a component of pea in accordance with methods generally known in the art. The pea may be standard pea (i.e., non-genetically modified pea), commoditized pea, genetically modified pea, or combinations thereof. In some embodiments, the pea proteins are *Pisum sativum* proteins.

In some embodiments, at least some of the non-animal protein is derived from fungi (i.e., fungal proteins). In some embodiments, the fungal proteins are native to one of the fungi disclosed herein (e.g., *Aspergillus niger, Aspergillus niger* var. *awamori, Aspergillus oryzae, Candida guilliermondii, Candida lipolytica, Candida pseudotropicalis, Candida utilis, Chrysosporium lucknowense, Endothia parasitica, Eremothecium ashbyii, Fusarium moniliforme, Kluyveromyces lactis, Kluyveromyces marxianus* var. *lactis, Morteirella vinaceae* var. *raffinoseutilizer, Mucor miehei, Mucor miehei* var. Cooney et Emerson, *Mucor pusillus* Lindt, *Myceliophthora thermophile, Penicillium roquefortii, Pichia pastoris, Rhizopus niveus, Saccharomyces cerevisiae, Saccharomyces fragilis,* and *Trichoderma reesei*). In some embodiments, the fungal proteins have a similar charge (isoelectric point, pI) and/or size (molecular weight) as the milk proteins comprised in the food products. Non-limiting examples of fungal proteins include glucoamylase, xylanases, amylases, glucanases, members of the SUN family (Sim1p, Uth1p, Nca3p, Sun4p), elongation factor 1-alpha, and mitochondrial leucyl-tRNA synthetase. In some embodiments, the fungal proteins are secreted fungal proteins. Non-limiting examples of secreted fungal proteins include alpha-amylase, alpha-galactosidase, cellulase, endo-1,4-beta-xylanase, endoglucanase, exo-1,4-beta-xylosidase, glucoamylase, peptidase, aspergillopepsin-1, 1,4-beta-D-glucan cellobiohydrolase A, alpha-galactosidase A, alpha-galactosidase B, alpha-galactosidase D, alpha-glucuronidase A, beta-galactosidase C, glucan 1,3-beta-glucosidase A, and glucan endo-1,3-beta-glucosidase eglC.

Non-animal proteins can also be proteins that are at least 80% (e.g., at least 80%, at least 85%, at least 90%, at least 91%, at least 92%, at least 93%, at least 94%, at least 95%, at least 96%, at least 97%, at least 98%, at least 99%, or at least 99.5%) identical to native non-animal proteins, respectively, and nucleic acids encoding non-animal proteins can also be nucleic acids that encode proteins that are at least 80% (e.g., at least 80%, at least 85%, at least 90%, at least 91%, at least 92%, at least 93%, at least 94%, at least 95%, at least 96%, at least 97%, at least 98%, at least 99%, or at least 99.5%) identical to native non-animal proteins, respectively.

In some embodiments, the non-animal proteins have identical or similar properties as milk proteins. In some embodiments, the non-animal proteins have different properties than milk proteins. Examples of such properties include but are not limited to solubility, turbidity, effect on viscosity, heat stability (i.e., aggregation or precipitation behavior upon heating), ability to bind specific types or amounts of compounds (e.g., water, minerals [e.g., calcium, phosphate, zinc], vitamins [e.g., vitamin D], micronutrients, carotenoids), cellular localization (e.g., entirely extracellular, partially extracellular), glycosylation pattern, phosphorylation pattern, amphiphilicity, emulsifying ability, foam forming ability, [i.e., ability to form stable foams], flavor binding ability, water binding ability, ability to form heat- or pressure-induced gels, spectral absorption pattern, rennet cleavage sites, syneresis properties of rennet gels produced, digestibility, ability to form micelles, ability to form micelles that encapsulate specific types or amounts of compounds (e.g., water, minerals [e.g., calcium, phosphate, zinc], vitamins [e.g., vitamin D], micronutrients, carotenoids), ability to form micelles of specific sizes, ability to form micelles of specific digestibility, ability to form micelles with specific stabilities at specific temperatures (e.g., refrigeration, ambient temperature, heat), ability to form micelles that have similar or superior emulsifying qualities as micelles comprised in milk and other dairy products, ability to form micelle aggregates (e.g., in response to changes in pH, salt concentration, enzymes [e.g., renin; "rennet coagulability"]), and ability to be encapsulated by micelles.

In some embodiments, the non-animal proteins comprise phosphate groups. Examples of plant phosphoproteins include, but are not limited to, the proteins listed in Table 2.

TABLE 2

| Non-Limiting Examples of Non-Animal Phosphoproteins | |
|---|---|
| AGI code | Protein name |
| At1g22530 | PAtellin-2 (PAtL-2) |
| At4g24190 | Endoplasmin homologue (SHD) |
| At5g56030 | HeAt shock protein 81-2 |
| At5g11170 | DEAD-box AtP-dependent RNA helicase 15 |

TABLE 2-continued

Non-Limiting Examples of Non-Animal Phosphoproteins

| AGI code | Protein name |
| --- | --- |
| At5g22650 | Histone deacetylase HDT2 |
| At1g09640 | Probable elongAtion factor 1-γ 1 |
| At1g76180 | Dehydrin ERD14 |
| At5g60640 | Protein disulphide isomerase-like protein |
| AtCg00120 | AtP synthase subunit α, chloroplastic |
| AtCg00490 | Rubisco large chain |
| At1g67090 | Rubisco small chain 1A, chloroplastic |
| At2g39990 | eIF2 (eukaryotic translAtion initiAtion factor) |
| At5g14740 | β-Carbonic anhydrase 2 |
| At5g43830 | GAtase-like protein |
| At5g56030 | HeAt shock protein 81-2 |
| At5g56030 | HeAt shock protein 81-2/3/4 |
| At3g16420 | PBP1 |
| At5g42790 | Proteasome subunit a type-1-A |
| At3g51880 | HMGB1 |
| At3g09200 | 60S Acidic ribosomal protein P0-2 |
| At1g20440 | Dehydrin COR47 |
| At4g26110 | NAP1 |
| AtCg00490 | Rubisco large subunit |
| AtCg00490 | Rubisco large subunit |
| At1g76180 | Dehydrin ERD14 |
| At1g26630 | eIF5A-2 (eukaryotic translAtion initiAtion factor) |
| At1g20010 | Tubulin β-5 chain |
| At5g44340 | Tubulin β-4 chain |
| At3g09200 | 60S Acidic ribosomal protein P0-2 |
| At1g01540.1 | At1g01540.1 |
| At1g07985.1 | At1g07985.1 |
| At1g08680.1 | At1g08680.1 |
| At1g20440.1 | At1g20440.1 |
| At1g26540.1 | At1g26540.1 |
| At1g27500.1 | At1g27500.1 |
| At1g29220.1 | At1g29220.1 |
| At1g29350.1 | At1g29350.1 |
| At1g35580.1 | At1g35580.1 |
| At1g35580.1 | At1g35580.1 |
| At1g45688.1 | At1g45688.1 |
| At1g55310.1 | At1g55310.1 |
| At1g59710.1 | At1g59710.1 |
| At1g59870.1 | At1g59870.1 |
| At1g62830.1 | At1g62830.1 |
| At1g66680.1 | At1g66680.1 |
| At1g73200.1 | At1g73200.1 |
| At1g76920.1 | At1g76920.1 |
| At1g80530.1 | At1g80530.1 |
| At2g01190.1 | At2g01190.1 |
| At2g23350.1 | At2g23350.1 |
| At2g26730.1 | At2g26730.1 |
| At2g29210.1 | At2g29210.1 |
| At2g31650.1 | At2g31650.1 |
| At2g35030.1 | At2g35030.1 |
| At2g35350.1 | At2g35350.1 |
| At2g35880.1 | At2g35880.1 |
| At2g37340.1 | At2g37340.1 |
| At2g41705.1 | At2g41705.1 |
| At2g41720.1 | At2g41720.1 |
| At2g41740.1 | At2g41740.1 |
| At2g43680.1 | At2g43680.1 |
| At2g45540.1 | At2g45540.1 |
| At2g46170.1 | At2g46170.1 |
| At2g46495.1 | At2g46495.1 |
| At3g05090.1 | At3g05090.1 |
| At3g07790.1 | At3g07790.1 |
| At3g13570.1 | At3g13570.1 |
| At3g13990.1 | At3g13990.1 |
| At3g17420.1 | At3g17420.1 |
| At3g23100.1 | At3g23100.1 |
| At3g27960.1 | At3g27960.1 |
| At3g29310.1 | At3g29310.1 |
| At3g29390.1 | At3g29390.1 |
| At3g48530.1 | At3g48530.1 |
| At3g52400.1 | At3g52400.1 |
| At3g52930.1 | At3g52930.1 |
| At3g53500.1 | At3g53500.1 |
| At3g55460.1 | At3g55460.1 |
| At3g55460.1 | At3g55460.1 |
| At3g55460.1 | At3g55460.1 |
| At3g56510.1 | At3g56510.1 |
| At3g58940.1 | At3g58940.1 |
| At3g61860.1 | At3g61860.1 |
| At3g62280.1 | At3g62280.1 |
| At4g05150.1 | At4g05150.1 |
| At4g07523.1 | At4g07523.1 |
| At4g11740.1 | At4g11740.1 |
| At4g13510.1 | At4g13510.1 |
| At4g25160.1 | At4g25160.1 |
| At4g25580.1 | At4g25580.1 |
| At4g31580.1 | At4g31580.1 |
| At4g31700.1 | At4g31700.1 |
| At4g32250.1 | At4g32250.1 |
| At4g35785.1 | At4g35785.1 |
| At4g38600.1 | At4g38600.1 |
| At4g39680.1 | At4g39680.1 |
| At5g02240.1 | At5g02240.1 |
| At5g04930.1 | At5g04930.1 |
| At5g06210.1 | At5g06210.1 |
| At5g18660.1 | At5g18660.1 |
| At5g21160.1 | At5g21160.1 |
| At5g41600.1 | At5g41600.1 |
| At5g47690.1 | At5g47690.1 |
| At5g52040.1 | At5g52040.1 |
| At5g52040.1 | At5g52040.1 |
| At5g57110.1 | At5g57110.1 |
| At5g62820.1 | At5g62820.1 |
| At5g64200.1 | At5g64200.1 |

In some embodiments, the non-animal proteins have similar or similarly distributed phosphorylation patterns as milk proteins. In some embodiments, the non-animal proteins comprise carbohydrate groups (e.g., glycosylated groups). In some embodiments, the non-animal proteins have similar or similarly distributed glycosylation patterns as milk proteins. In some embodiments, the non-animal proteins have even distributions of hydrophobic and hydrophilic residues. In some embodiments, the non-animal proteins have similar or similarly distributed hydrophobic sites as milk proteins. In some embodiments, the non-animal proteins have similar or similarly distributed hydrophilic sites as milk proteins. In some embodiments, the non-animal proteins have even distributions of basic and acidic residues (i.e., are amphipathic in unfolded conformation). In some embodiments, the non-animal proteins have similar or similarly distributed acidic sites as milk proteins. In some embodiments, the non-animal proteins have similar or similarly distributed basic sites as milk proteins. In some embodiments, the non-animal proteins are lipid soluble. In some embodiments, the non-animal proteins are water soluble.

In some embodiments, the non-animal proteins have similar or superior abilities to form micelles as caseins. In some embodiments, the non-animal proteins can form micelles without caseins. In some embodiments, the non-animal proteins can form micelles with one or more caseins that mimic a similar or superior emulsion quality as micelles formed only by caseins. In some embodiments, the non-animal proteins can form micelles without caseins that mimic a similar or superior emulsion quality as micelles formed only by caseins. In some embodiments, the non-animal proteins can form micelles with one or more caseins that encapsulate different types or amounts of compounds (e.g., water, minerals [e.g., calcium, phosphate, zinc], vitamins [e.g., vitamin D], micronutrients, carotenoids) than are encapsulated by micelles formed by caseins alone. In some embodiments, the non-animal proteins can form micelles without caseins that encapsulate different types or amounts of compounds than are encapsulated by micelles formed by caseins alone.

Suitable non-animal proteins can be identified by obtaining secretomes (i.e., secreted proteins, obtained by, for example, culturing the non-animal sources in liquid culture, removing cells from the cell culture [e.g., via centrifugation], and optionally concentrating the remaining culture medium; or by sequencing genomes and in silico identifying secreted proteins, as described, for example, by Mattanovich et al. [Microbial Cell Factories 2009, 8:29]), whole cell extracts, or fractionated whole cell extracts of non-animal sources; optionally partially digesting, glycosylating, phosphorylating, or otherwise enzymatically treating the proteins; and then screening them in assays (e.g., high-throughput assays) for proteins that have similar, identical, or different properties compared to milk proteins. In some embodiments, the non-animal proteins are identified by screening a calcium-enriched fraction of soy proteins for proteins that have similar, identical, or different properties compared to milk proteins.

A suitable assay for identifying the ability of proteins to form micelles is by combining the constituent proteins (e.g., caseins, non-animal proteins), homogenizing the mixture, isolating micelles (e.g., by centrifugation), and quantitating the micelles. A suitable assay for identifying the encapsulation ability of micelles is by combining the constituent proteins (e.g., caseins, non-animal proteins) with the compounds to be encapsulated, homogenizing the mixture, isolating micelles (e.g., by centrifugation), and quantitating the amount of the compounds to be encapsulated in the remaining solution.

In some embodiments, the non-animal proteins readily associate with other proteins. In some embodiments, the non-animal proteins can bind calcium. In some embodiments, non-animal proteins are secreted proteins. In some embodiments, the non-animal proteins are resistant to degradation by proteases. In some embodiments, the non-animal proteins comprise extracellular domains of fungal flocculation proteins (i.e., flocculins; e.g., flocculin FLO5 of *Saccharomyces cerevisiae*).

In some embodiments, the non-animal proteins comprise domains of legume nodulation proteins (e.g., NodO of *Rhizobium leguminosarum* and its homologs in *Lotus japonicus*). In some embodiments, the non-animal proteins are C2-domain ABA proteins of *Arabidopsis thaliana* (CARS). In some embodiments, the non-animal proteins are heat shock proteins (e.g., Uniprot ID C4QZS3). In some embodiments, the non-animal proteins are proteases (e.g., vacuolar aspartyl protease (Proteinase A) of *Komagataella pastoris*, vacuolar proteinase B (YscB) of *Komagataella pastoris*). In some embodiments, the non-animal proteins are peptidases.

Lipids

In some embodiments, the food products provided herein further comprise lipids. Lipids are present in, for example, dairy products, and are critical for sensory characteristics such as mouthfeel and consistency. In addition, lipids provide nutrition and health benefits. Furthermore, lipids can influence the flavors and/or aroma of food products.

In some embodiments, the food products provided herein comprise one or more lipids selected from the group consisting of fats, oils, monoglycerides, diglycerides, triglycerides, phospholipids, and free fatty acids. In some embodiments, the food products comprise essentially no animal lipids. In some embodiments, the food products comprise only saturated lipids. In some embodiments, the food products comprise only unsaturated lipids. In some embodiments, the food products comprise saturated lipids and unsaturated lipids.

Non-limiting examples of oils include plant oils (e.g., sunflower oil, coconut oil, mustard oil, peanut oil, canola oil, corn oil, cottonseed oil, flax seed oil, olive oil, palm oil, rapeseed oil, safflower oil, sesame oil, soybean oil, almond oil, beech nut oil, brazil nut oil, cashew oil, hazelnut oil, macadamia nut oil, mongongo nut oil, pecan oil, pine nut oil, pistachio nut oil, walnut oil, avocado oil, grape oil), microbe-derived oils, algae-derived oils, fungus-derived oils, marine animal oils (e.g., Atlantic fish oil, Pacific fish oil, Mediterranean fish oil, light pressed fish oil, alkaline treated fish oil, heat treated fish oil, light and heavy brown fish oil, bonito oil, pilchard oil, tuna oil, sea bass oil, halibut oil, spearfish oil, barracuda oil, cod oil, menhaden oil, sardine oil, anchovy oil, capelin oil, Atlantic cod oil, Atlantic herring oil, Atlantic mackerel oil, Atlantic menhaden oil, salmonid oil, and shark oil, squid oil, cuttlefish oil, octopus oil, krill oil, seal oil, whale oil), non-essential oils, essential oils, natural oils, non-hydrogenated oils, partially hydrogenated oils, hydrogenated oils (e.g., hydrogenated coconut oil), crude oils, semi-refined (also called alkaline refined) oils, and refined oils. In some embodiments, longer chain oils (e.g., sunflower oil, corn oil, olive oil, soy oil, peanut oil, walnut oil, almond oil, sesame oil, cottonseed oil, canola oil, safflower oil, flax seed oil, palm oil, palm kernel oil, palm fruit oil, coconut oil, babassu oil, shea butter, mango butter, cocoa butter, wheat germ oil, rice bran oil, engineered sunflower oil that overexpresses oleic acid by 400%) are combined with short-chain triglycerides to produce transesterified fatty acid esters. Various combinations of triglycerides and longer chain oils can be incorporated to create a number of different flavor profiles.

Non-limiting examples of monoglycerides and diglycerides include plant-derived monoglycerides and diglycerides, (e.g., monoglycerides and diglycerides derived from sunflower, coconut, peanut, cottonseed, olive, palm, rapeseed, safflower, sesame seed, soybean, almond, beech nut, Brazil nut, cashew, hazelnut, macadameia nut, mongongo nut, pecan, pine nut, pistachio, walnut, and avocado). The monoglycerides and diglycerides can include the acyl chain of any of the free fatty acids listed herein. Additional examples of monoglycerides and diglycerides are known in the art.

Non-limiting examples of free fatty acids include butyric acid, caproic acid, caprylic acid, capric acid, lauric acid, myristic acid, palmitic acid, stearic acid, arachidic acid, behenic acid, lignoceric acid, cerotic acid, myristoleic acid, pamitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, omega-fatty acids (e.g., arachidonic acid, omega-3-fatty acids, omega-6-fatty acids, omega-7-fatty acids, omega-9-fatty acids), fatty acids with even number of carbons of 4-16 carbons in length, monosaturated acids [particularly with 18 carbons], fatty acids with low interfacial tension (e.g., less than 20, less than 15, less than 11, less than 9, less than 7, less than 5, less than 3, less than 2, less than 1, or less than 0.5 dynes/cm, from 0.1 to 20, from 1 to 15, from 2 to 9, from 3 to 9, from 4 to 9, from 5 to 9, from 2 to 7, from 0.1 to 5, from 0.3 to 2, or from 0.5 to 1 dynes/cm, 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0), butyric (4:0) acid or caproic (6:0) acid that is esterified at sn-3, medium-chain fatty acids (8:0-14:0) as well as 16:0 that are esterified at positions sn-1 and sn-2, fatty acids in which stearic acid (18:0) is placed at position sn-1, fatty acids in which oleic acid (18:1) is placed at positions sn-1 and sn-3, fatty acids that have a range of carbon atoms (e.g., from 8 to 40, from 10 to 38, from 12 to 36, from 14 to 34, from 16 to 32, from 18 to 30, or from 20 to 28 carbon atoms), fatty acids that comprise at least one unsaturated bond (i.e., a carbon-carbon double or triple bond; e.g., at least 2, at least 3, at least 4, at least 5, at least 6, at least 7, or at least 8 carbon-carbon double bonds and/or triple bonds), fatty acids with conjugated unsaturated bonds (i.e., at least one pair of carbon-carbon double and/or triple bonds are bonded together, without a methylene (CH2) group between them [e.g., 4CH:CHi CH:CHi]), and derivatives of the above named fatty acids (e.g., esters [e.g., methyl and ethyl esters], salts [e.g., sodium and potassium salts], triglyceride derivatives, diglycerides derivatives, monoglyceride derivatives). The free fatty acids can be saturated on unsaturated. In some embodiments, the free fatty acids are not derived from or produced by a mammal. Additional examples of free fatty acids are known in the art.

Non-limiting examples of phospholipids include lecithin phospholipids (e.g., soy lecithin phospholipids, sunflower lecithin phospholipids, cotton lecithin phospholipids, rapeseed lecithin phospholipids. rice bran lecithin phospholipids, and corn lecithin phospholipids), cardiolipin, ceramide phosphocholines, ceramide phosphoethanolamines, glycerophospholipids, phasphatidicacid, phosphatidylcholine, phosphatidylethanolamine, phosphatidylinositol, phosphospingolipids, and phsophatidylserine. In some embodiments, the phospholipids are not derived from or produced by a mammal. Additional aspects of phospholipids are known in the art.

Non-limiting examples of triglycerides include tributyrin, short-chain triglycerides, short-chain triglycerides comprising three oleic acids; short-chain triglycerides comprising hexanoic acid; short-chain triglycerides comprising hexanoic acid and butyric acid; short-chain triglycerides comprising hexanoic acid and decanoic acid; and short-chain triglycerides comprising one butyric, one hexanoic, and one octanoic acid. In some embodiments, the flavor profiles of the compositions provided herein are modulated by incorporating synthetic short-chain triglycerides combined with plant-based oils (e.g., sunflower oil) in desired combinations. For example, a mixture of [C18 C18 C6] and [C18 C6 C18] provides a different flavor profile than a mixture of [C18 C4 C4] and [C18 C10 C10].

In some embodiments, the food products provided herein comprise between 0% and 50%, 45%, 40%, 35%, 30%, 25%, 20%, 15%, 10%, 9%, 8%, 6%, 5%, 4%, 3%, 2%, 1%, 0.5%, 0.4%, 0.3%, 0.2%, or 0.1%; between 0.1% and 50%, 45%, 40%, 35%, 30%, 25%, 20%, 15%, 10%, 9%, 8%, 7%, 6%, 5%, 4%, 3%, 2%, 1%, 0.5%, 0.4%, 0.3%, or 0.2%; between 0.2% and 50%, 45%, 40%, 35%, 30%, 25%, 20%, 15%, 10%, 9%, 8%, 7%, 6%, 5%, 4%, 3%, 2%, 1%, 0.5%, 0.4%, or 0.3%; between 0.3% and 50%, 45%, 40%, 35%, 30%, 25%, 20%, 15%, 10%, 9%, 8%, 7%, 6%, 5%, 4%, 3%, 2%, 1%, 0.5%, or 0.4%; between 0.4% and 50%, 45%, 40%, 35%, 30%, 25%, 20%, 15%, 10%, 9%, 8%, 7%, 6%, 5%, 4%, 3%, 2%, 1%, or 0.5%; between 0.5% and 50%, 45%, 40%, 35%, 30%, 25%, 20%, 15%, 10%, 9%, 8%, 7%, 6%, 5%, 4%, 3%, 2%, or 1%; between 1% and 50%, 45%, 40%, 35%, 30%, 25%, 20%, 15%, 10%, 9%, 8%, 7%, 6%, 5%, 4%, 3%, or 2%; between 2% and 50%, 45%, 40%, 35%, 30%, 25%, 20%, 15%, 10%, 9%, 8%, 7%, 6%, 5%, 4%, or 3%; between 3% and 50%, 45%, 40%, 35%, 30%, 25%, 20%, 15%, 10%, 9%, 8%, 7%, 6%, 5%, or 4%; between 4% and 50%, 45%, 40%, 35%, 30%, 25%, 20%, 15%, 10%, 9%, 8%, 7%, 6%, or 5%; between 5% and 50%, 45%, 40%, 35%, 30%, 25%, 20%, 15%, 10%, 9%, 8%, 7%, or 6%; between 6% and 50%, 45%, 40%, 35%, 30%, 25%, 20%, 15%, 10%, 9%, 8%, or 7%; between 7% and 50%, 45%, 40%, 35%, 30%, 25%, 20%, 15%, 10%, 9%, or 8%; between 8% and 50%, 45%, 40%, 35%, 30%, 25%, 20%, 15%, 10%, or 9%; between 9% and 50%, 45%, 40%, 35%, 30%, 25%, 20%, 15%, or 10%; between 10% and 50%, 45%, 40%, 35%, 30%, 25%, 20%, or 15%; between 15% and 50%, 45%, 40%, 35%, 30%, 25%, or 20%; between 20% and 50%, 45%, 40%, 35%, 30%, or 25%; between 25% and 50%, 45%, 40%, 35%, or 30%; between 30% and 50%, 45%, 40%, or 35%; between 35% and 50%, 45%, or 40%; between 40% and 50%, or 45%; or between 45% and 50% by weight of lipid.

In some embodiments, the food products provided herein comprise between 0% and 50%, 40%, 35%, 30%, 25%, 20%, 15%, 10%, 9%, 8%, 6%, 5%, 4%, 3%, 2%, 1%, 0.5%, 0.4%, 0.3%, 0.2%, or 0.1%; between 0.1% and 50%, 40%, 35%, 30%, 25%, 20%, 15%, 10%, 9%, 8%, 7%, 6%, 5%, 4%, 3%, 2%, 1%, 0.5%, 0.4%, 0.3%, or 0.2%; between 0.2% and 50%, 40%, 35%, 30%, 25%, 20%, 15%, 10%, 9%, 8%, 7%, 6%, 5%, 4%, 3%, 2%, 1%, 0.5%, 0.4%, or 0.3%; between 0.3% and 50%, 40%, 35%, 30%, 25%, 20%, 15%, 10%, 9%, 8%, 7%, 6%, 5%, 4%, 3%, 2%, 1%, 0.5%, or 0.4%; between 0.4% and 50%, 40%, 35%, 30%, 25%, 20%, 15%, 10%, 9%, 8%, 7%, 6%, 5%, 4%, 3%, 2%, 1%, or 0.5%; between 0.5% and 50%, 40%, 35%, 30%, 25%, 20%, 15%, 10%, 9%, 8%, 7%, 6%, 5%, 4%, 3%, 2%, or 1%; between 1% and 50%, 40%, 35%, 30%, 25%, 20%, 15%, 10%, 9%, 8%, 7%, 6%, 5%, 4%, 3%, or 2%; between 2% and 50%, 40%, 35%, 30%, 25%, 20%, 15%, 10%, 9%, 8%, 7%, 6%, 5%, 4%, or 3%; between 3% and 50%, 40%, 35%, 30%, 25%, 20%, 15%, 10%, 9%, 8%, 7%, 6%, 5%, or 4%; between 4% and 50%, 40%, 35%, 30%, 25%, 20%, 15%, 10%, 9%, 8%, 7%, 6%, or 5%; between 5% and 50%, 40%, 35%, 30%, 25%, 20%, 15%, 10%, 9%, 8%, 7%, or 6%; between 6% and 50%, 40%, 35%, 30%, 25%, 20%, 15%, 10%, 9%, 8%, or 7%; between 7% and 50%, 40%, 35%, 30%, 25%, 20%, 15%, 10%, 9%, or 8%; between 8% and 50%, 40%, 35%, 30%, 25%, 20%, 15%, 10%, or 9%; between 9% and 50%, 40%, 35%, 30%, 25%, 20%, 15%, or 10%; between 10% and 50%, 40%, 35%, 30%, 25%, 20%, or 15%; between 15% and 50%, 40%, 35%, 30%, 25%, or 20%; between 20% and 50%, 40%, 35%, 30%, or 25%; between 25% and 50%, 40%, 35%, or 30%; between 30% and 50%, 40%, or 35%; between 35% and 50%, or 40%; or between 40% and 50% by weight of lipid derived from plant.

Carbohydrates

In some embodiments, the food products provided herein further comprise carbohydrates. Carbohydrates are present in, for example, dairy products, and provide sweetness to the taste profiles and/or serve as fast-acting energy and nutrition sources.

In some embodiments, the food products provided herein comprise one or more saccharides (e.g., monosaccharides, disaccharides, polysaccharides). Non-limiting examples of saccharides include glucose, mannose, maltose, fructose, galactose, lactose, sucrose, monatin, and tagatose.

In some embodiments, the food products comprise between 0.001% and 25%, 20%, 15%, 10%, 9%, 8%, 7%, 6%, 5%, 4%, 3%, 2%, 1%, 0.5%, 0.1%, or 0.01%; between 0.001% and 25%, 20%, 15%, 10%, 9%, 8%, 7%, 6%, 5%, 4%, 3%, 2%, 1%, 0.5%, or 0.1%; between 0.1% and 25%, 20%, 15%, 10%, 9%, 8%, 7%, 6%, 5%, 4%, 3%, 2%, 1%, or 0.5%; between 0.5% and 25%, 20%, 15%, 10%, 9%, 8%, 7%, 6%, 5%, 4%, 3%, 2%, or 1%; between 1% and 25%, 20%, 15%, 10%, 9%, 8%, 7%, 6%, 5%, 4%, 3%, or 2%; between 2% and 25%, 20%, 15%, 10%, 9%, 8%, 7%, 6%, 5%, 4%, or 3%; between 3% and 25%, 20%, 15%, 10%, 9%, 8%, 7%, 6%, 5%, or 4%; between 4% and 25%, 20%, 15%, 10%, 9%, 8%, 7%, 6%, or 5%; between 5% and 25%, 20%, 15%, 10%, 9%, 8%, 7%, or 6%; between 6% and 25%, 20%, 15%, 10%, 9%, 8%, or 7%; between 7% and 25%, 20%, 15%, 10%, 9%, or 8%; between 8% and 25%, 20%, 15%, 10%, or 9%; between 9% and 25%, 20%, 15%, or 10%; between 10% and 25%, 20%, or 15%; between 15% and 25%, or 20%; or between 20% and 25% by weight of carbohydrate.

In some embodiments, the food products comprise carbohydrates derived from plants (e.g., beet, celery, basil, honey, cherries, corn, spinach, plums, kiwis, peas).

In some embodiments, the food products comprise less than 4.5%, less than 4.25%, less than 4%, less than 3.75%, less than 3.5%, less than 3.25%, less than 3%, less than 2.75%, or less than 2.5% by weight of monosaccharides and/or disaccharides.

Lactic Acid Bacteria

In some embodiments, the food products comprise lactic acid bacteria (i.e., members of the order Lactobacillales that produce lactic acid during fermentation). Lactic acid bacteria are used in the fermentative production of a large number of dairy and non-dairy food products, including yoghurt, cheese, butter, buttermilk, kefir, koumiss, sourdough bread, sorghum beer, cassava, and pickled vegetables. The lactic acid produced by lactic acid bacteria contributes to required low pH conditions. In addition, lactic acid bacteria can contribute taste agents and probiotics to food products.

Non-limiting examples of suitable lactic acid bacteria include *Lactobacillus acidophilus*, *Lactobacillus klebsiella*, *Lactobacillus leuconostoc*, *Lactobacillus acidophilus*, *Lactobacillus bulgaricus*, *Lactobacillus plantarum*, *Lactobacillus caret*, *Lactobacillus pentoaceticus*, *Lactobacillus brevis*, *Lactobacillus thermophilus*, and other members of the genera *Lactobacillus*, *Leuconostoc*, *Pediococcus*, *Lactococcus*, and *Streptococcus*, as well as the more peripheral *Aerococcus*, *Carnobacterium*, *Enterococcus*, *Oenococcus*, *Sporolactobacillus*, *Tetragenococcus*, *Vagococcus*, and *Weissella* that are classified as safe for consumption by humans and/or other animals by a federal or local regulatory agency (e.g., the Federal Food and Drug Agency [FDA]).

In some embodiments, the food products are derived by fermentative production of lactic acid by lactic acid bacteria comprised in the food products. In some such embodiments, the food products comprise lactic acid. In some such embodiments, the food products comprise at least 0.5% by weight of lactic acid. In some such embodiments, the food products have a pH of less than 7.5, less than 7, less than 6.5, less than 6, less than 5.5, less than 5, less than 4.9, less than 4.8, less than 4.7, less than 4.6, or less than 4.5; between 3.8 and 7.5, 7, 6.5, 6, 5.5, 5, 4.9, 4.8, 4.7, 4.6, 4.5, 4.4, 4.3, 4.2, 4.1, 4, or 3.9; between 3.9 and 7.5, 7, 6.5, 6, 5.5, 5, 4.9, 4.8, 4.7, 4.6, 4.5, 4.4, 4.3, 4.2, 4.1, 4; between 4 and 7.5, 7, 6.5, 6, 5.5, 5, 4.9, 4.8, 4.7, 4.6, 4.5, 4.4, 4.3, 4.2, 4.1; between 4.1 and 7.5, 7, 6.5, 6, 5.5, 5, 4.9, 4.8, 4.7, 4.6, 4.5, 4.4, 4.3, 4.2; between 4.2 and 7.5, 7, 6.5, 6, 5.5, 5, 4.9, 4.8, 4.7, 4.6, 4.5, 4.4, 4.3; between 4.3 and 7.5, 7, 6.5, 6, 5.5, 5, 4.9, 4.8, 4.7, 4.6, 4.5, 4.4; between 4.4 and 7.5, 7, 6.5, 6, 5.5, 5, 4.9, 4.8, 4.7, 4.6, 4.5; between 4.5 and 7.5, 7, 6.5, 6, 5.5, 5, 4.9, 4.8, 4.7, 4.6; between 4.6 and 7.5, 7, 6.5, 6, 5.5, 5, 4.9, 4.8, 4.7; between 4.7 and 7.5, 7, 6.5, 6, 5.5, 5, 4.9, or 4.8; between 4.8 and 7.5, 7, 6.5, 6, 5.5, 5, 4.9, or 4.8; between 4.9 and 7.5, 7, 6.5, 6, 5.5, or 5; between 5 and 7.5, 7, 6.5, 6, or 5.5; between 5.5 and 7.5, 7, 6.5, or 6; between 6 and 7.5, 7, or 6.5; between 6.5 and 7.5, or 7; or between 7 and 7.5.

Micelles

In some embodiments, the food products provided herein further comprise micelles.

Micelles are generally (or roughly) spherical supramolecular structures that exist as dispersions within a composition and that can encapsulate components such as water, minerals (mainly calcium and phosphorous), and vitamins. Micelles can be obtained by combining micelle forming proteins (e.g., caseins, whey proteins, or non-animal proteins with certain desirable attributes), homogenizing the mixture, and isolating micelles (e.g., by centrifugation).

In some embodiments, the food products provided herein comprise between 0.1% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, or 0.5%; between 0.5% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%; between 1% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, or 2%; between 2% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, or 3%; between 3% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, or 4%; between 4% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, or 5%; between 5% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, or 6%; between 6% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, or 7%; between 7% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, or 8%; between 8% and 95%, 90%, 85%, 80%, 75%, 70%, 65%, 60%, 55%, 50%, 45%, 40%, 35%, 30%, 25%, 20%, 15%, 14%, 13%, 12%, 11%, 10%, or 9%; between 9% and 95%, 90%, 85%, 80%, 75%, 70%, 65%, 60%, 55%, 50%, 45%, 40%, 35%, 30%, 25%, 20%, 15%, 14%, 13%, 12%, 11%, or 10%; between 10% and 95%, 90%, 85%, 80%, 75%, 70%, 65%, 60%, 55%, 50%, 45%, 40%, 35%, 30%, 25%, 20%, 15%, 14%, 13%, 12%, or 11%; between 11% and 95%, 90%, 85%, 80%, 75%, 70%, 65%, 60%, 55%, 50%, 45%, 40%, 35%, 30%, 25%, 20%, 15%, 14%, 13%, or 12%; between 12% and 95%, 90%, 85%, 80%, 75%, 70%, 65%, 60%, 55%, 50%, 45%, 40%, 35%, 30%, 25%, 20%, 15%, 14%, or 13%; between 13% and 95%, 90%, 85%, 80%, 75%, 70%, 65%, 60%, 55%, 50%, 45%, 40%, 35%, 30%, 25%, 20%, 15%, or 14%; between 14% and 95%, 90%, 85%, 80%, 75%, 70%, 65%, 60%, 55%, 50%, 45%, 40%, 35%, 30%, 25%, 20%, or 15%; between 15% and 95%, 90%, 85%, 80%, 75%, 70%, 65%, 60%, 55%, 50%, 45%, 40%, 35%, 30%, 25%, or 20%; between 20% and 95%, 90%, 85%, 80%, 75%, 70%, 65%, 60%, 55%, 50%, 45%, 40%, 35%, 30%, or 25%; between 25% and 95%, 90%, 85%, 80%, 75%, 70%, 65%, 60%, 55%, 50%, 45%, 40%, 35%, or 30%; between 30% and 95%, 90%, 85%, 80%, 75%, 70%, 65%, 60%, 55%, 50%, 45%, 40%, or 35%; between 35% and 95%, 90%, 85%, 80%, 75%, 70%, 65%, 60%, 55%, 50%, 45%, or 40%; between 40% and 95%, 90%, 85%, 80%, 75%, 70%, 65%, 60%, 55%, 50%, or 45%; between 44% and 95%, 90%, 85%, 80%, 75%, 70%, 65%, 60%, 55%, or 50%; between 50% and 95%, 90%, 85%, 80%, 75%, 70%, 65%, 60%, or 55%; between 55% and 95%, 90%, 85%, 80%, 75%, 70%, 65%, or 60%; between 60% and 95%, 90%, 85%, 80%, 75%, 70%, or 65%; between 65% and 95%, 90%, 85%, 80%, 75%, or 70%; between 70% and 95%, 90%, 85%, 80%, or 75%; between 75% and 95%, 90%, 85%, or 80%; between 80% and 95%, 90%, or 85%; or between 85% and 95%, 90%; or between 90% and 95% by weight of micelles.

In some embodiments, the food products comprise micelles that comprise recombinant and/or native casein. In some embodiments, the food products comprise micelles that comprise recombinant and/or native whey protein. In other embodiments, the food products comprise micelles that comprise recombinant and/or native casein and non-animal proteins. In other embodiments, the food products comprise micelles that comprise recombinant and/or native whey protein and non-animal proteins. In other embodiments, the food products comprise micelles formed only of non-animal proteins.

In some embodiments, the micelles comprise κ-caseins (e.g., any of the κ-caseins described herein). In some embodiments, the micelles comprise κ-caseins (e.g., any of the κ-caseins described herein) and β-caseins (e.g., any of the β-caseins described herein). In some such embodiments, the ratios of β-caseins to K-caseins in the micelles are 2:1 to 5.5:1, 2:1 to 5:1, 2:1 to 4.5:1, 2:1 to 4:1, 2:1 to 3.5:1, 2:1 to 3:1, 2:1 to 2.5:1, 2.5:1 to 5:1, 2.5:1 to 4.5:1, 2.5:1 to 4:1, 2.5:1 to 3.5:1, 2.5:1 to 3:1, 3:1 to 5:1, 3:1 to 4.5:1, 3:1 to 4:1, 3:1 to 3.5:1, 3.5:1 to 5:1, 3.5:1 to 4.5:1, 3.5:1 to 4:1, 4:1 to 5:1, 4:1 to 4.5:1, or 4.5:1 to 5:1. In some embodiments, the micelles comprise β-lactoglobulin.

In some embodiments, the micelles have diameters (or populations of micelles have average diameters) of 20 nm to 350 nm, 320 nm, 300 nm, 280 nm, 260 nm, 240 nm, 220 nm, 200 nm, 180 nm, 160 nm, 140 nm, 120 nm, 100 nm, 80 nm, 60 nm, or 40 nm; 40 nm to 350 nm, 340 nm, 320 nm, 300 nm, 280 nm, 260 nm, 240 nm, 220 nm, 200 nm, 180 nm, 160 nm, 140 nm, 120 nm, 100 nm, 80 nm, or 60 nm; 60 nm to 350 nm, 340 nm, 320 nm, 300 nm, 280 nm, 260 nm, 240 nm, 220 nm, 200 nm, 180 nm, 160 nm, 140 nm, 120 nm, or 100 nm; 80 nm to 350 nm, 340 nm, 320 nm, 300 nm, 280 nm, 260 nm, 240 nm, 220 nm, 200 nm, 180 nm, 160 nm, 140 nm, 120 nm, or 100 nm; 100 nm to 350 nm, 340 nm, 320 nm, 300 nm, 280 nm, 260 nm, 240 nm, 220 nm, 200 nm, 180 nm, 160 nm, 140 nm, or 120 nm; 120 nm to 350 nm, 340 nm, 320 nm, 300 nm, 280 nm, 260 nm, 240 nm, 220 nm, 200 nm, 180 nm, 160 nm, or 140 nm; 140 nm to 350 nm, 340 nm, 320 nm, 300 nm, 280 nm, 260 nm, 240 nm, 220 nm, 200 nm, 180 nm, or 160 nm; 160 nm to 350 nm, 340 nm, 320 nm, 300 nm, 280 nm, 260 nm, 240 nm, 220 nm, 200 nm, or 180 nm; 180 nm to 350 nm, 340 nm, 320 nm, 300 nm, 280 nm, 260 nm, 240 nm, 220 nm, or 200 nm; 200 nm to 350 nm, 340 nm, 320 nm, 300 nm, 280 nm, 260 nm, 240 nm, or 220 nm; 220 nm to 350 nm, 340 nm, 320 nm, 300 nm, 280 nm, 260 nm, or 240 nm; 240 nm to 350 nm, 340 nm, 320 nm, 300 nm, 280 nm, or 260 nm; 260 nm to 350 nm, 340 nm, 320 nm, 300 nm, or 280 nm; 280 nm to 350 nm, 340 nm, 320 nm, or 300 nm; 300 nm to 350 nm or 325 nm; or 325 nm to 350 nm.

In some embodiments, the food products provided herein comprise micelles comprising recombinant κ-casein and/or recombinant β-casein and/or β-lactoglobulin, wherein the micelles have any of the subranges of the diameter of micelles described herein, and wherein the recombinant κ-casein and/or the recombinant β-casein and/or β-lacto-globulins are unglycosylated and/or unphosphorylated, or have a non-native glycosylation and/or phosphorylation patterns.

Micelle properties can be major determinants of the desirable attributes of the compositions provided herein. Examples of micelle properties include but are not limited to micelle composition (e.g., types and/or amounts of proteins that form the micelles, types and/or amounts of compounds encapsulated by the micelles), micelle size, and micelle density. The size of micelles can be determined by methods known in the art including but not limited to light scattering, microscopy, and spectroscopy. The density of micelles can be determined by methods known in the art including but not limited to microscopy and evaporative mass measurements.

In some embodiments, the food products provided herein comprise micelles of such properties (e.g., composition, size, density) that the compositions have similar or identical attributes as dairy products. Such similar or identical attributes include but are not limited to colors of dairy products (e.g., due to micelles that comprise coloring agents, color enhancers, or color stabilizer; due to the effect of micelle sizes and/or densities on light scattering), aromas of dairy products (e.g., due to micelles that comprise aroma agents, aroma enhancers, or aroma stabilizers), tastes of dairy products (e.g., due to micelles that comprise taste agents, taste enhancers, or taste stabilizer), textures of dairy products (including but not limited to mouthfeel, fattiness, creaminess, viscosity, homogenization, G' storage modules value, melting behavior, stretching behavior, gratability, dicability, browning behavior, etc.), digestibilities of dairy products (e.g., due to micelles that comprise proteins that harbor or lack target sites for digestive enzymes), nutrient contents of dairy products (e.g., due to micelles that encapsulate specific compounds), shelf lives of dairy products (e.g., due to micelles that comprise microbial or plant proteases), and use versatilities of milk (e.g., due to micelles that comprise caseins).

In some embodiments, the food products provided herein comprise micelles of such properties (e.g., composition, size, density) that the food products have different attributes as dairy products. Such different attributes include but are not limited to nutrient contents that are different to nutrient contents of dairy products (e.g., protein and/or amino acid content [e.g., due to micelles that comprise microbial or plant proteins], mineral content [e.g., due to micelles that encapsulate more calcium and/or other metal ions such as, for example, potassium, sodium, magnesium, zinc, iron]), not comprising one or more of undesirable components of dairy products (e.g., allergenic epitopes [e.g., due to micelles that comprise recombinant α-s1-caseins, β-caseins, or β-lac-toglobulins that lack allergenic epitopes or micelles that comprise microbial and/or plant proteins]), and longer shelf-lives than dairy products (e.g., due to micelles that comprise microbial or plant proteases).

Other Components

The food products provided herein may comprise one or more other components.

Non-limiting examples of such other components include minerals (e.g., fat soluble minerals, water soluble minerals, calcium, phosphorous, potassium, sodium, citrate, chloride, phosphate, magnesium, potassium, zinc, iron, molybdenum, manganese, copper). Minerals can contribute to the structure and stability of the food products provided herein by interacting with fat globules and micelles to maintain an emulsified mixture. Minerals can also affect sensory characteristics such as mouthfeel, consistency, and to a certain extent, flavor of the food products. Minerals can also improve the nutritional profile of the food products.

Further non-limiting examples of such other components include vitamins (e.g., lipid soluble vitamins, water soluble vitamins, thiamin [vitamin B1], riboflavin [vitamin B2], niacin [vitamin B3], pantothenic acid [vitamin B5], vitamin B6 [pyridoxine], vitamin B12 [cobalamin], vitamin C, folate, vitamins A, vitamin D, vitamin E, vitamin K).

Further non-limiting examples of such other components include coloring agents, color enhancers, and color stabilizers (e.g., titanium oxide).

Further non-limiting examples of such other components include taste agents, taste enhancers, and taste stabilizers (e.g., δ-decalactone, ethyl butyrate, 2-furyl methyl ketone, 2,3-pentanedione, γ-undecalactone, δ-undecalactone, natural favors, artificial flavors [e.g., chocolate, coffee, strawberry, almond, hazelnut, vanilla, green tea, Irish cream, coconut flavoring], triglycerides, hydrolyzed casein or whey protein).

Further non-limiting examples of such other components include sweetening agents (e.g., *stevia*, aspartame, cyclamate, saccharin, sucralose, mogrosides, brazzein, curculin, erythritol, glycyrrhizin, inulin, isomalt, lacititol, mabinlin, malititol, mannitol, miraculin, monatin, monelin, osladin, pentadin, sorbitol, thaumatin, xylitol, acesulfame potassium, advantame, alitame, aspartame-acesulfame, sodium cyclamate, dulcin, glucin, neohesperidin dihyrdochalcone, neotame, and P-4000). In some embodiments, the sweetening agents do not comprise carbohydrates.

Further non-limiting examples of such other components include aroma agents, aroma stabilizers, and aroma enhancers (e.g., propylene glycol, glycerol, ethyl alcohol, salt, sugars).

Further non-limiting examples of such other components include shelf life extending agents (e.g., carbon monoxide, nitrites, sodium metabisulfite, Bombal, vitamin E, rosemary extract, greet tea extract, catechins, antioxidants).

Further non-limiting examples of such other components include fungal contaminants. Such fungal contaminants may derive from the recombinant host cells used in embodiments in which the milk protein and/or non-animal proteins are produced recombinantly. In some embodiments, the fungal contaminants are secreted fungal proteins as disclosed herein. In some embodiments, the fungal contaminants have a similar charge (isoelectric point, pI) and/or size (molecular weight) as the milk proteins comprised in the food products. Non-limiting examples of fungal contaminants are disclosed herein as fungal proteins and secreted fungal proteins.

Further non-limiting examples of such other components include anti-caking agents, anti-foaming agents, anti-inflammatory agents, anti-microbial agents, anti-oxidants, buffering agents, clotting agents, coenzymes, enzymes, essential nutrients, essential amino acids, neuroactive compounds, neutraceuticals, nutritional supplements, pH and/or ionic strength adjusting agents (i.e., agents that raise or lower the pH and/or the ionic strength of a solution), prebiotics, fibers, probiotic cultures, salts, emulsifiers, stabilizers, and mixtures of any of the other components disclosed herein.

Further non-limiting examples of such other components include supramolecules (i.e., complexes of linked molecules [e.g., linked proteins]) other than micelles.

In most embodiments, the food products comprise between 0.001% and 12%, 11%, 10%, 9%, 8%, 7%, 6%, 5%, 4%, 3%, 2%, 1%, 0.5%, 0.1%, 0.05%, 0.01%, or 0.005%; between 0.005% and 12%, 11%, 10%, 9%, 8%, 7%, 6%, 5%, 4%, 3%, 2%, 1%, 0.5%, 0.1%, 0.05%, or 0.01%; between 0.01% and 12%, 11%, 10%, 9%, 8%, 7%, 6%, 5%, 4%, 3%, 2%, 1%, 0.5%, 0.1%, or 0.05%; between 0.05% and 12%, 11%, 10%, 9%, 8%, 7%, 6%, 5%, 4%, 3%, 2%, 1%, 0.5%, or 0.1%; between 0.1% and 12%, 11%, 10%, 9%, 8%, 7%, 6%, 5%, 4%, 3%, 2%, 1%, or 0.5%; between 0.5% and 12%, 11%, 10%, 9%, 8%, 7%, 6%, 5%, 4%, 3%, 2%, or 1%; between 1% and 12%, 11%, 10%, 9%, 8%, 7%, 6%, 5%, 4%, 3%, or 2%; between 2% and 12%, 11%, 10%, 9%, 8%, 7%, 6%, 5%, 4%, or 3%; between 3% and 12%, 11%, 10%, 9%, 8%, 7%, 6%, 5%, or 4%; between 4% and 12%, 11%, 10%, 9%, 8%, 7%, 6%, or 5%; between 5% and 12%, 11%, 10%, 9%, 8%, 7%, or 6%; between 6% and 12%, 11%, 10%, 9%, 8%, or 7%; between 7% and 12%, 11%, 10%, 9%, or 8%; between 8% and 12%, 11%, 10%, or 9%; between 9% and 12%, 11%, or 10%; between 10% and 12%, or 11%; or between 11% and 12% by weight of any one of such other components.

In some embodiments, the food products comprise between 0.001% and 10%, 9%, 8%, 7%, 6%, 5%, 4%, 3%, 2%, 1%, 0.5%, 0.1%, 0.05%, 0.01%, or 0.005%; between 0.005% and 10%, 9%, 8%, 7%, 6%, 5%, 4%, 3%, 2%, 1%, 0.5%, 0.1%, 0.05%, or 0.01%; between 0.01% and 10%, 9%, 8%, 7%, 6%, 5%, 4%, 3%, 2%, 1%, 0.5%, 0.1%, or 0.05%; between 0.05% and 10%, 9%, 8%, 7%, 6%, 5%, 4%, 3%, 2%, 1%, 0.5%, or 0.1%; between 0.1% and 10%, 9%, 8%, 7%, 6%, 5%, 4%, 3%, 2%, 1%, or 0.5%; between 0.5% and 10%, 9%, 8%, 7%, 6%, 5%, 4%, 3%, 2%, or 1%; between 1% and 10%, 9%, 8%, 7%, 6%, 5%, 4%, 3%, or 2%; between 2% and 10%, 9%, 8%, 7%, 6%, 5%, 4%, or 3%; between 3% and 10%, 9%, 8%, 7%, 6%, 5%, or 4%; between 4% and 10%, 9%, 8%, 7%, 6%, or 5%; between 5% and 10%, 9%, 8%, 7%, or 6%; between 6% and 10%, 9%, 8%, or 7%; between 7% and 10%, 9%, or 8%; between 8% and 10%, or 9%; or between 9% and 10% by weight of all other components.

In most embodiments, the food products further comprise water. In some such embodiments, the food products comprise between 2% and 95%, 85%, 75%, 65%, 55%, 45%, 35%, 25%, 15%, 10%, or 5%; between 5% and 95%, 85%, 75%, 65%, 55%, 45%, 35%, 25%, 15%, or 10%; between 10% and 95%, 85%, 75%, 65%, 55%, 45%, 35%, 25%, or 15%; between 15% and 95%, 85%, 75%, 65%, 55%, 45%, 35%, or 25%; between 25% and 95%, 85%, 75%, 65%, 55%, 45%, or 35%; between 35% and 95%, 85%, 75%, 65%, 55%, or 45%; between 45% and 95%, 85%, 75%, 65%, or 55%; between 55% and 95%, 85%, 75%, or 65%; between 65% and 95%, 85%, or 75%; between 75% and 95%, or 85%; or between 85% and 95% by weight of water.

In some embodiments, one or more of such other components are not derived from or produced by mammals or mammalian cells.

Attributes

The food products provided herein have desirable attributes.

In some embodiments, the desirable attributes are attributes that are similar or identical to attributes of dairy products. In some embodiments, the desirable attributes are attributes that are different to attributes of dairy products.

In some embodiments, the desirable attributes are desirable colors. In some such embodiments, the desirable colors are colors of dairy products. In other such embodiments, the desirable colors are colors that are different from the colors of dairy products. In some such embodiments, the desirable colors are fluorescent colors. The color of a composition can be evaluated by a panel of expert human subjects. Alternatively, the color of a composition can be described, for example, by measuring its spectral absorption pattern using a spectrophotometer or colorimeter (e.g., a Microcolor tristimulus colorimeter [Dr. Bruno Lange GmbH, Berlin, Germany]) and the L*a*b color space according to CIE-LAB (Commission Internationale de l'Éclairage, 1971). Variables that can be titrated to modulate the color of the food products provided herein include but are not limited to amounts and/or types of coloring agents, amounts and/or types of color stabilizers, amounts and/or types of color modifiers, and micelle characteristics (e.g., compositions, sizes, densities). In some embodiments, the food products have a L* color value of between 80 and 95, an a* color value of between −5 and 0.5, and a b* color value of between 4 and 10. In some embodiments, the food products comprise fluorescent proteins selected from the group consisting of green fluorescent protein (GFP), blue fluorescent protein (BFP), cyan fluorescent protein (CFP), yellow fluorescent protein (YFP), orange fluorescent protein (OFP), red fluorescent protein (RFP), and derivatives thereof.

In some embodiments, the desirable attributes are desirable tastes. In some such embodiments, the desirable tastes are tastes of dairy products. In other such embodiments, the desirable tastes are tastes that are different from the tastes of dairy products. The taste of a composition can be evaluated by a panel of expert human subjects. Alternatively, the taste of a composition can be described using automated devices (e.g., iNSENT TS-5000Z Taste Testing System [Higuchi USA Inc., Japan], Astree tongue system [Alpha MOS America, Hanover, Md.]). Variables that can be titrated to modulate the taste of the food products provided herein include but are not limited to amounts and/or types taste agents, amounts and/or types taste stabilizers, amounts and/or types taste modifiers, and amounts and/or types of taste blockers.

In some embodiments, the desirable attributes are desirable textures (i.e., mechanical characteristics that are correlated with sensory perceptions; non-limiting examples are mouthfeel, fattiness, creaminess, viscosity, homogenization, richness, thickness, G' storage modules value). In some such embodiments, the desirable textures are textures of dairy products. In other such embodiments, the desirable textures are textures that are different from the textures of dairy products. The texture of a composition can be evaluated by a panel of expert human subjects. Alternatively, the texture of a composition can be described by dynamic oscillation rheology, viscosity analysis, flow analysis, melt analysis, sheer stress analysis, storage modulus analysis, and texture profile analysis using a texture analyzer. Variables that can be titrated to modulate the texture of the food products provided herein include but are not limited to composition (e.g., types and/or amounts of milk proteins, types and/or amounts of non-animal proteins, ratios of milk proteins to non-animal proteins, types and/or amounts of lipids, types and/or amounts of carbohydrates, types and/or amounts of micelles, types and/or amounts of hydrocolloids, types and/or amounts of stabilizers, types and/or amounts of emulsifiers), micelle characteristics (e.g., composition, size, density), pH, water activity, and production process conditions (e.g., temperature, hold time at temperature, pH, amount of shear applied, types of starter cultures, post fermentation treatments, and ion strengths).

In some embodiments, the desirable attributes are desirable digestibilities. In some such embodiments, the desirable digestibilities are digestibilities of dairy products. In other such embodiments, the desirable digestibilities are digestibilities that are different from the digestibilities of dairy products. The digestibility of a composition can be described by incubating the composition in the presence of digestive enzymes (e.g., porcine pepsin) and under conditions that prevail in the digestive tract (e.g., in presence of simulated gastric fluid with acidic pH). Variables that can be titrated to modulate the digestibility of the food products provided herein include but are not limited to the content of proteins comprising target sites for digestive enzymes, thermal treatment, and content of anti-nutritional factors.

In some embodiments, the desirable attributes are desirable nutrient contents. In some such embodiments, the desirable nutrient contents are nutrient contents of dairy products. In other such embodiments, the desirable nutrient contents are nutrient contents that are different from the nutrient contents of dairy products (e.g., better amino acid content, better mineral balance). Nutrient content can be defined by protein content, types and/or amounts of amino acids, types and/or amounts of lipids, types and/or amounts of carbohydrates, types and/or amounts of minerals, types and/or amounts of vitamins, types and/or amounts of bioactive compounds, types and/or amounts of micronutrients, types and/or amounts of macronutrients, types and/or amounts of lactic acid bacteria, PDCAAS score, etc. The nutrient content of a composition can be determined by analytical methods (e.g., AOAC International reference methods AOAC 990.03 and AOAC 992.15, electrophoresis (e.g., SDS-PAGE), liquid column chromatography, immunochemical tests, or on-chip electrophoresis (e.g., using the Agilent Protein 80 kit and the Agilent 2100 Bioanalyzer) for determination of type and/or content of proteins and amino acids; AOAC International reference method AOAC 954.02 for determination of type and/or content of lipids), or it can be derived from the nutrient contents of the ingredients of a food product. In some embodiments, the food products provided herein comprise at least 0.5%, 0.6%, 0.7%, or 0.8%; between 0.5% and 2.5%, 2%, 1.5%, 1.4%, 1.3%, 1.2%, 1.1%, 1.0%, 0.9%, 0.8%, 0.7%, or 0.6%; between 0.6% and 2.5%, 2%, 1.5%, 1.4%, 1.3%, 1.2%, 1.1%, 1.0%, 0.9%, 0.8%, or 0.7%; between 0.7% and 2.5%, 2%, 1.5%, 1.4%, 1.3%, 1.2%, 1.1%, 1.0%, 0.9%, or 0.8%; between 0.8% and 2.5%, 2%, 1.5%, 1.4%, 1.3%, 1.2%, 1.1%, 1.0%, or 0.9%; between 0.9% and 2.5%, 2%, 1.5%, 1.4%, 1.3%, 1.2%, 1.1%, or 1.0%; between 1.0% and 2.5%, 2%, 1.5%, 1.4%, 1.3%, 1.2%, or 1.1%; between 1.1% and 2.5%, 2%, 1.5%, 1.4%, 1.3%, or 1.2%; between 1.2% and 2.5%, 2%, 1.5%, 1.4%, or 1.3%; between 1.3% and 2.5%, 2%, 1.5%, or 1.4%; between 1.4% and 2.5%, 2%, or 1.5%; between 1.5% and 2.5%, or 2%; or between 2% and 2.5% by weight of branched amino acids. In some embodiments, the food products have PDCAAS scores of at least 80; at least 85; at least 90; at least 100; at least 105; at least 110; at least 115; at least 120; at least 125; between 80 and 150, 140, 130, 120, 110, 100, or 90; between 90 and 150, 140, 130, 120, 110, or 100; between 100 and 150, 140, 130, 120, or 110; between 110 and 150, 140, 130, or 120; between 120 and 150, 140, or 130; between 130 and 150, or 140; or between 140 and 150. In some embodiments, the food products comprise less than 4% by weight of lactose. In some embodiments, the food products comprise less than 2% by weight of monosaccharides. In some embodiments, the food products comprise less than 2% by weight of disaccharides. In some embodiments, the food products compared to dairy products have a higher content of at least one component selected from the group consisting of calcium, phosphate, B complex vitamins, vitamin A, vitamin D, vitamin E, and vitamin K.

In some embodiments, the desirable attributes are desirable shelf-lives. In some such embodiments, the desirable shelf-lives are shelf-lives of dairy products. In other such embodiments, the desirable shelf-lives are shelf-lives that are different from the shelf-lives of dairy products. The shelf life of a composition can be described by repeatedly measuring key attributes of the composition over the course of storage. Variables that can be titrated to modulate the shelf life of a composition include but are not limited to types and/or amounts of proteases, microbial load, solid concentration, water activity, redox potential, salt concentration, pH, natural preservative content, and humidity. In some embodiments, the food products provided herein are stable at temperatures of 4 C or below for at least 4 days, at least 5 days, at least 6 days, at least 7 days, at least 10 days, at least 15 days, at least 20 days, at least 30 days, at least 40 days at least 50 days, at least 60 days, at least 70 days, at least 80 days, at least 90 days, between 4 days and 25 days, between 8 days and 20 days, between 15 days and 30 days, or between 40 days and 90 days. In some embodiments, the food products are stable at ambient temperature for at least 2 months; at least 3 months; at least 4 months; at least 5 months; at least 6 months; between 2 months and 12 months, 10 months, 8 months, 6 months, or 4 months; between 4 months and 12 months, 10 months, 8 months, or 6 months; between 6 months and 12 months, 10 months, or 8 months; between 8 months and 12 months, or 10 months; or between 10 months and 12 months.

In some embodiments, the desirable attributes are desirable hunger and/or satiety regulation. In some such embodiments, the desirable hunger and/or satiety regulation are hunger and/or satiety regulation of dairy products. In other such embodiments, the desirable hunger and/or satiety regulation are different from the hunger and/or satiety regulation of dairy products. The hunger and/or satiety regulation of a composition can be evaluated by a panel of expert human subjects. Variables that can be titrated to modulate the hunger and/or satiety regulation of the food products provided herein include but are not limited to nutrient content (e.g., types and/or amounts of protein, types and/or amounts of lipid, types and/or amounts of carbohydrate), digestibility, fiber content, and glycemic response.

In some embodiments, the desirable attributes are desirable use versatility (i.e., ability to use the food products in a variety of manners and/or to derive a diversity of other compositions from the food product). The use versatility of dairy milk includes but is not limited to the ability to use it to produce other dairy products (e.g., yogurt, cheese, cream, butter). In some such embodiments, the desirable use versatility is use versatility of dairy products. In other such embodiments, the desirable use versatility is use versatility that is different from the use versatility of dairy products. Variables that can be titrated to modulate the use versatilities of a composition provided herein include but are not limited to types and/or amounts of milk proteins, types and/or amounts of non-animal proteins, types and/or amounts of proteins with rennet cleavage sites, types and/or amounts of carbohydrates, types and/or amounts of lipids, hydrocolloid contents, process conditions (e.g., temperature, hold time, pH, shear amount), membrane processing, types and/or amounts of starter cultures, post-fermentation treatments, and ion strengths.

In some embodiments, the desirable attributes are melting behaviors of cheese. The melting behavior of a composition can be evaluated using, for example, the Schreiber melt test (Kosikowski, 1977, Pages 331-376 in Cheese Rheology and Texture, CRC Press, Boca Raton, Fla.), which involves placing a 0.5-cm-(3/16-in.-) high plug of cheese in a glass petri dish, heating it in an oven at 232° C. (450° F.) for 5 minutes, then cooling it for 30 minutes, and assigning a score of 0.0 to over 5.5 on the Schreiber scale. In various embodiments, the compositions provided herein have a Schreiber score of between 0.0 and 5.5, 4.5, 3.5, 2.5, 1.5, or 0.5; between 0.5 and 5.5, 4.5, 3.5, 2.5, or 1.5; between 1.5 and 5.5, 4.5, 3.5, or 2.5; between 2.5 and 5.5, 4.5, or 3.5; between 3.5 and 5.5, or 4.5; between 4.5 and 5.5; or greater than 5.5. Variables that can be titrated to modulate the melting behavior of the food products provided herein include but are not limited to amounts and/or types of lipids, moisture content, hydrocolloid content, emulsifying salt content, pH, and production process conditions (e.g., shear).

In some embodiments, the desirable attributes are stretching behaviors of cheese. The stretching behavior of a composition can be evaluated using, for example, the pizza cheese fork test. Variables that can be titrated to modulate the stretching behavior of the food products provided herein include but are not limited to amounts and/or types of protein, amounts and/or types of lipid, moisture content, calcium content, mineral salt content, pH, amounts and/or types of starter culture, hydrocolloid content, method of manufacture (e.g., dosing, cutting, cooking, holding, plasticization, brining, cooling), and storage condition.

In some embodiments, the desirable attributes are gratabilities of cheese. The gratability of a composition can be evaluated using, for example, particle size analysis, sieve grading, or by measuring hardness, stickiness, and/or gumminess. Variables that can be titrated to modulate the gratability of the food products provided herein include but are not limited to amounts and/or types of protein, amounts and/or types of lipid, moisture content, pH, calcium content, mineral salt content, amounts and/or types of starter culture, hydrocolloid content, method of manufacture (e.g., dosing, cutting, cooking, holding, plasticization, brining, cooling), storage condition, and amounts and/or types of anti-caking agents.

In some embodiments, the desirable attributes are diceabilities of cheese. Variables that can be titrated to modulate the diceability of the food products provided herein include but are not limited to amounts and/or types of protein, amounts and/or types of lipids, moisture content, pH, calcium content, mineral salt content, amounts and/or types of starter cultures, hydrocolloid contents, method of manufacture (e.g., dosing, cutting, cooking, holding, plasticization, brining, cooling), storage conditions, and amounts and/or types of anti-caking agents.

In some embodiments, the desirable attributes are browning behaviors of cheese. The browning behavior of a composition can be evaluated by visual inspection. Variables that can be titrated to modulate the browning behavior of the food products provided herein include but are not limited to amounts and/or types of protein, amounts and/or types of lipids, moisture content, pH, calcium content, mineral salt content, amounts and/or types of starter cultures, hydrocolloid contents, method of manufacture (e.g., dosing, cutting, cooking, holding, plasticization, brining, cooling), storage conditions, amounts and/or types of anti-caking agents, and amounts and/or types of reducing sugars.

In some embodiments, the desirable attributes are textures of cream or ice cream (e.g., creaminess, richness, thickness, smoothness, hardness, crystallization, shape retention). The texture of a composition can be evaluated by panels of expert human subjects, melt tests, shape retention tests, ice crystal counting, altitude stability testing, and overrun capacity analysis. Variables that can be titrated to modulate the texture of the food products provided herein include but are not limited to amounts and/or types of protein, amounts and/or types of lipids, amounts and/or types of carbohydrates, moisture content, pH, amounts and/or types of high and low molecular weight components that can affect freezing points, hydrocolloid contents, emulsified contents, method of manufacture (e.g., temperature of pasteurization, hold time, homogenization conditions, cooling/aging rate, conditions and/or methods of freezing, hardening), and storage conditions.

In some embodiments, the desirable attributes are not comprising or comprising lower amounts of at least one component found in dairy products. Non-limiting examples of such components include animal lipids (e.g., saturated fat, cholesterol), animal carbohydrates, milk proteins that have mammalian glycosylation and/or phosphorylation patterns, proteins with allergenic epitopes (e.g., specific epitopes of α-s1-casein, specific epitopes of β-casein, specific epitopes of β-lactoglobulin, specific immunoglobulins, lactose), antibiotics, hormones (e.g., stress hormones, growth hormones), heavy metals, bacteria (e.g., *E. coli, Brucella, Camplyobacter, Listeria, Mycobacterium, Salmonella, Shigella, Yersinia, Giardia*), viruses (e.g., noroviruses), and prions. In some embodiments, the food products comprise less than 0.05%, less than 0.04%, less than 0.03%, less than 0.02%, less than 0.01% by weight of cholesterol. In some embodiments, the food products do not comprise β-lactoglobulin with mammalian glycosylation pattern and/or mammalian phosphorylation pattern. In some such embodiments, the food products comprise only a single type of milk protein (e.g., comprise only (3-lactoglobulin and no other milk protein). In some embodiments, the food products comprise at least one component other than the non-animal protein that is not present in dairy products. Non-limiting examples of such components include artificial sweeteners, non-animal lipids, non-animal carbohydrates, and milk proteins that have non-native glycosylation and/or phosphorylation patterns.

In some such embodiments, the desirable attributes are not requiring pasteurization or cold shipping (e.g., due to possibility of sterilizing components individually prior to combining). Variables that can be titrated to modulate the pasteurization or cold shipping requirement of food products provided herein include but are not limited to amounts and/or types of bacteria in the composition.

In some embodiments, the desirable attributes persist over storing the food products provided herein at suitable storage conditions. In some such embodiments, the suitable storage conditions include storage at temperatures of less than 15° C. In some embodiments, the desirable attributes persist over one or more cycles of freezing and thawing. In some such embodiments, the one or more cycles of freezing and thawing are 1 cycle, 2 cycles, 3 cycles, 4 cycles, 5 cycles, or more than 5 cycles of freezing and thawing.

Supplemented Food Products

In a further aspect, the present invention provides supplemented food products that are produced by supplementing animal-derived food products (i.e., food products that comprise components derived from animals) with the food products provided herein.

The amount of food products provided herein in relation to the amount of animal-derived food products during blending can vary. In some embodiments, the supplemented food product comprise between 10% and 75%, 70%, 65%, 60%, 55%, 50%, 45%, 40%, 35%, 30%, 25%, 20%, or 15%; between 15% and 75%, 70%, 65%, 60%, 55%, 50%, 45%, 40%, 35%, 30%, 25%, or 20%; between 20% and 75%, 70%, 65%, 60%, 55%, 50%, 45%, 40%, 35%, 30%, or 25%; between 25% and 75%, 70%, 65%, 60%, 55%, 50%, 45%, 40%, 35%, or 30%; between 30% and 75%, 70%, 65%, 60%, 55%, 50%, 45%, 40%, or 35%; between 35% and 75%, 70%, 65%, 60%, 55%, 50%, 45%, or 40%; between 40% and 75%, 70%, 65%, 60%, 55%, 50%, or 45%; between 45% and 75%, 70%, 65%, 60%, 55%, or 50%; between 50% and 75%, 70%, 65%, 60%, or 55%; between 55% and 75%, 70%, 65%, or 60%; between 60% and 75%, 70%, or 65%; between 65% and 75%, or 70%; or between 70% and 75% by weight of animal-derived food products, and between 1% and 99%, 95%, 90%, 80%, 70%, 60%, 50%, 40%, 30%, 20%, 10%, 7%, 5%, 3%, or 2%; between 2% and 99%, 95%, 90%, 80%, 70%, 60%, 50%, 40%, 30%, 20%, 10%, 7%, 5%, or 3%; between 3% and 99%, 95%, 90%, 80%, 70%, 60%, 50%, 40%, 30%, 20%, 10%, 7%, or 5%; between 5% and 99%, 95%, 90%, 80%, 70%, 60%, 50%, 40%, 30%, 20%, 10%, or 7%; between 7% and 99%, 95%, 90%, 80%, 70%, 60%, 50%, 40%, 30%, 20%, or 10%; between 10% and 99%, 95%, 90%, 80%, 70%, 60%, 50%, 40%, 30%, or 20%; between 20% and 99%, 95%, 90%, 80%, 70%, 60%, 50%, 40%, or 30%; between 30% and 99%, 95%, 90%, 80%, 70%, 60%, 50%, or 40%; between 40% and 99%, 95%, 90%, 80%, 70%, 60%, or 50%; between 50% and 99%, 95%, 90%, 80%, 70%, or 60%; between 60% and 99%, 95%, 90%, 80%, or 70%; between 70% and 99%, 95%, 90%, or 80%; between 80% and 99%, 95%, or 90%; between 90% and 99%, or 95%; or between 95% and 99% by weight of the food products provided herein.

Yoghurt-Like Food Products

In a further aspect, the present invention provides yoghurt-like food products that comprise one or more milk proteins disclosed herein, and one or more non-animal proteins or hydrolyzed non-animal protein disclosed herein, and that have attributes of dairy yoghurts, as shown in FIG. 1.

In some embodiments, the yoghurt-like food products comprise between 0.5% and 14%, 12%, 10%, 9%, 8%, 7%, 6%, 5%, 4%, 3%, 2%, or 1%; between 1% and 14%, 12%, 10%, 9%, 8%, 7%, 6%, 5%, 4%, 3%, or 2%; between 2% and 14%, 12%, 10%, 9%, 8%, 7%, 6%, 5%, 4%, or 3%; between 3% and 14%, 12%, 10%, 9%, 8%, 7%, 6%, 5%, or 4%; between 4% and 14%, 12%, 10%, 9%, 8%, 7%, 6%, or 5%; between 5% and 14%, 12%, 10%, 9%, 8%, 7%, or 6%; between 6% and 14%, 12%, 10%, 9%, 8%, or 7%; between 7% and 14%, 12%, 10%, 9%, or 8%; between 8% and 14%, 12%, 10%, or 9%; between 9% and 14%, 12%, or 10%; between 10% and 14%, or 12%; or between 12% and 14% by weight of total protein (i.e., milk protein and non-animal protein).

In some embodiments, the yoghurt-like food products comprise between 0.1% and 14%, 13%, 12%, 11%, 10%, 9%, 8.5%, 8%, 7.5%, 7%, 6.5%, 6%, 5.5%, 5%, 4.5%, 4%, 3.5%, 3%, 2.5%, 2%, 1.5%, 1%, or 0.5%; between 0.5% and 14%, 13%, 12%, 11%, 10%, 9.5%, 9%, 8.5%, 8%, 7.5%, 7%, 6.5%, 6%, 5.5%, 5%, 4.5%, 4%, 3.5%, 3%, 2.5%, 2%, 1.5%, or 1%; between 1% and 14%, 13%, 12%, 11%, 10%, 9.5%, 9%, 8.5%, 8%, 7.5%, 7%, 6.5%, 6%, 5.5%, 5%, 4.5%, 4%, 3.5%, 3%, 2.5%, 2%, or 1.5%; between 1.5% and 14%, 13%, 12%, 11%, 10%, 9.5%, 9%, 8.5%, 8%, 7.5%, 7%, 6.5%, 6%, 5.5%, 5%, 4.5%, 4%, 3.5%, 3%, 2.5%, or 2%; between 2% and 14%, 13%, 12%, 11%, 10%, 9.5%, 9%, 8.5%, 8%, 7.5%, 7%, 6.5%, 6%, 5.5%, 5%, 4.5%, 4%, 3.5%, 3%, or 2.5%; between 2.5% and 14%, 13%, 12%, 11%, 10%, 9.5%, 9%, 8.5%, 8%, 7.5%, 7%, 6.5%, 6%, 5.5%, 5%, 4.5%, 4%, 3.5%, or 3%; between 3% and 14%, 13%, 12%, 11%, 10%, 9.5%, 9%, 8.5%, 8%, 7.5%, 7%, 6.5%, 6%, 5.5%, 5%, 4.5%, 4%, or 3.5%; between 3.5% and 14%, 13%, 12%, 11%, 10%, 9.5%, 9%, 8.5%, 8%, 7.5%, 7%, 6.5%, 6%, 5.5%, 5%, 4.5%, or 4%; between 4% and 14%, 13%, 12%, 11%, 10%, 9.5%, 9%, 8.5%, 8%, 7.5%, 7%, 6.5%, 6%, 5.5%, 5%, or 4.5%; between 4.5% and 14%, 13%, 12%, 11%, 10%, 9.5%, 9%, 8.5%, 8%, 7.5%, 7%, 6.5%, 6%, 5.5%, or 5%; between 5% and 14%, 13%, 12%, 11%, 10%, 9.5%, 9%, 8.5%, 8%, 7.5%, 7%, 6.5%, 6%, or 5.5%; between 5.5% and 14%, 13%, 12%, 11%, 10%, 9.5%, 9%, 8.5%, 8%, 7.5%, 7%, 6.5%, or 6%; between 6% and 14%, 13%, 12%, 11%, 10%, 9.5%, 9%, 8.5%, 8%, 7.5%, 7%, or 6.5%; between 6.5% and 14%, 13%, 12%, 11%, 10%, 9.5%, 9%, 8.5%, 8%, 7.5%, or 7%; between 7% and 14%, 13%, 12%, 11%, 10%, 9.5%, 9%, 8.5%, 8%, or 7.5%; between 7.5% and 14%, 13%, 12%, 11%, 10%, 9.5%, 9%, 8.5%, or 8%; between 8% and 14%, 13%, 12%, 11%, 10%, 9.5%, 9%, or 8.5%; between 8.5% and 14%, 13%, 12%, 11%, 10%, 9.5%, or 9%; between 9% and 14%, 13%, 12%, 11%, 10%, or 9.5%; between 9.5% and 14%, 13%, 12%, 11%, or 10%; between 10% and 14%, 13%, 12%, or 11%; between 11% and 14%, 13%, or 12%; between 12% and 14%, or 13%; or between 13% and 14% by weight of milk proteins.

The milk proteins can be native and/or recombinant caseins, native and/or recombinant whey proteins, or combinations thereof. In some embodiments in which the milk proteins are recombinant caseins and/or recombinant whey proteins, the recombinant caseins and/or recombinant whey proteins lack epitopes that can elicit immune responses in human or animals. In some embodiments, the yoghurt-like food products comprise a single milk protein. In some such embodiments, the single milk protein is β-lactoglobulin. In some such embodiments, the β-lactoglobulin has a native glycosylation and/or phosphorylation pattern as provided herein. In other such embodiments, the β-lactoglobulin has a non-native glycosylation and/or phosphorylation pattern as provided herein. In some embodiments, the β-lactoglobulin consists of a mixture of β-lactoglobulin having a native glycosylation and/or phosphorylation pattern and β-lactoglobulin having a non-native glycosylation and/or phosphorylation pattern.

In some embodiments, the yoghurt-like food products comprise between 0.1% and 14%, 13%, 12%, 11%, 10%, 9%, 8.5%, 8%, 7.5%, 7%, 6.5%, 6%, 5.5%, 5%, 4.5%, 4%, 3.5%, 3%, 2.5%, 2%, 1.5%, 1%, or 0.5%; between 0.5% and 14%, 13%, 12%, 11%, 10%, 9.5%, 9%, 8.5%, 8%, 7.5%, 7%, 6.5%, 6%, 5.5%, 5%, 4.5%, 4%, 3.5%, 3%, 2.5%, 2%, 1.5%, or 1%; between 1% and 14%, 13%, 12%, 11%, 10%, 9.5%, 9%, 8.5%, 8%, 7.5%, 7%, 6.5%, 6%, 5.5%, 5%, 4.5%, 4%, 3.5%, 3%, 2.5%, 2%, or 1.5%; between 1.5% and 14%, 13%, 12%, 11%, 10%, 9.5%, 9%, 8.5%, 8%, 7.5%, 7%, 6.5%, 6%, 5.5%, 5%, 4.5%, 4%, 3.5%, 3%, 2.5%, or 2%; between 2% and 14%, 13%, 12%, 11%, 10%, 9.5%, 9%, 8.5%, 8%, 7.5%, 7%, 6.5%, 6%, 5.5%, 5%, 4.5%, 4%, 3.5%, 3%, or 2.5%; between 2.5% and 14%, 13%, 12%, 11%, 10%, 9.5%, 9%, 8.5%, 8%, 7.5%, 7%, 6.5%, 6%, 5.5%, 5%, 4.5%, 4%, 3.5%, or 3%; between 3% and 14%, 13%, 12%, 11%, 10%, 9.5%, 9%, 8.5%, 8%, 7.5%, 7%, 6.5%, 6%, 5.5%, 5%, 4.5%, 4%, or 3.5%; between 3.5% and 14%, 13%, 12%, 11%, 10%, 9.5%, 9%, 8.5%, 8%, 7.5%, 7%, 6.5%, 6%, 5.5%, 5%, 4.5%, or 4%; between 4% and 14%, 13%, 12%, 11%, 10%, 9.5%, 9%, 8.5%, 8%, 7.5%, 7%, 6.5%, 6%, 5.5%, 5%, or 4.5%; between 4.5% and 14%, 13%, 12%, 11%, 10%, 9.5%, 9%, 8.5%, 8%, 7.5%, 7%, 6.5%, 6%, 5.5%, 5%, or 5%; between 5% and 14%, 13%, 12%, 11%, 10%, 9.5%, 9%, 8.5%, 8%, 7.5%, 7%, 6.5%, 6%, or 5.5%; between 5.5% and 14%, 13%, 12%, 11%, 10%, 9.5%, 9%, 8.5%, 8%, 7.5%, 7%, 6.5%, or 6%; between 6% and 14%, 13%, 12%, 11%, 10%, 9.5%, 9%, 8.5%, 8%, 7.5%, 7%, or 6.5%; between 6.5% and 14%, 13%, 12%, 11%, 10%, 9.5%, 9%, 8.5%, 8%, 7.5%, or 7%; between 7% and 14%, 13%, 12%, 11%, 10%, 9.5%, 9%, 8.5%, 8%, or 7.5%; between 7.5% and 14%, 13%, 12%, 11%, 10%, 9.5%, 9%, 8.5%, or 8%; between 8% and 14%, 13%, 12%, 11%, 10%, 9.5%, 9%, or 8.5%; between 8.5% and 14%, 13%, 12%, 11%, 10%, 9.5%, or 9%; between 9% and 14%, 13%, 12%, 11%, 10%, or 9.5%; between 9.5% and 14%, 13%, 12%, 11%, or 10%; between 10% and 14%, 13%, 12%, or 11%; between 11% and 14%, 13%, or 12%; between 12% and 14%, or 13%; or between 13% and 14% by weight of non-animal proteins.

The non-animal proteins can be native or recombinant non-animal protein, or hydrolyzed native or recombinant non-animal protein, or combinations thereof. In some embodiments, the yoghurt-like food products comprise at least 5 different types of non-animal proteins. In some such embodiments, the non-animal proteins are pea proteins. In some such embodiments, the pea proteins are *Pisum sativum* proteins. In some embodiments, the non-animal proteins are fungal proteins as provided herein. In some embodiments, the non-animal proteins are secreted fungal proteins as provided herein. In some embodiments, the yoghurt-like food products comprise β-lactoglobulin and non-animal proteins (e.g., pea proteins, hydrolyzed pea proteins, secreted fungal proteins, hydrolyzed secreted fungal proteins, or combinations thereof) at weight ratios of β-lactoglobulin to non-animal proteins of about 100 to 1, about 50 to 1, about 40 to 1, about 30 to 1, about 20 to 1, about 10 to 1, about 9 to 1, about 8 to 1, about 7 to 1, about 6 to 1, about 5 to 1, about 4 to 1, about 3 to 1, about 2 to 1, about 1 to 1, about 1 to 2, about 1 to 3, about 1 to 4, about 1 to 5, about 1 to 6, about 1 to 7, about 1 to 8, about 1 to 9, about 1 to 10, about 1 to 20, about 1 to 30, about 1 to 40, about 1 to 50, or about 1 to 100.

In some embodiments, the yoghurt-like food products further comprise between 0.2% and 8%, 7%, 6%, 5%, 4%, 3%, 2%, 1%, 0.5%, 0.4%, or 0.3%; between 0.3% and 8%, 7%, 6%, 5%, 4%, 3%, 2%, 1%, 0.5%, or 0.4%; between 0.4% and 8%, 7%, 6%, 5%, 4%, 3%, 2%, 1%, or 0.5%; between 0.5% and 8%, 7%, 6%, 5%, 4%, 3%, 2%, or 1%; between 1% and 8%, 7%, 6%, 5%, 4%, 3%, or 2%; between 2% and 8%, 7%, 6%, 5%, 4%, or 3%; between 3% and 8%, 7%, 6%, 5%, or 4%; between 4% and 8%, 7%, 6%, or 5%; between 5% and 8%, 7%, or 6%; between 6% and 8%, or 7%; or between 7% and 8% by weight of lipid derived from non-animal sources (e.g., plant, fungi, microbes, algae).

In some embodiments, the yoghurt-like food products further comprise between 2.5%, and 8%, 7.5%, 7%, 6.5%, 6%, 5.5%, 5%, 4.5%, 4%, 3.5%, or 3%; between 3%, and 8%, 7.5%, 7%, 6.5%, 6%, 5.5%, 5%, 4.5%, 4%, or 3.5%; between 3.5% and 8%, 7.5%, 7%, 6.5%, 6%, 5.5%, 5%, 4.5%, or 4%; between 4% and 8%, 7.5%, 7%, 6.5%, 6%, 5.5%, 5%, or 4.5%; between 4.5% and 8%, 7.5%, 7%, 6.5%, 6%, 5.5%, or 5%; between 5% and 8%, 7.5%, 7%, 6.5%, 6%, or 5.5%; between 5.5% and 8%, 7.5%, 7%, 6.5%, or 6%; between 6% and 8%, 7.5%, 7%, or 6.5%; between 6.5% and 8%, 7.5%, or 7%; between 7% and 8%, or 7.5%; or between 7.5% and 8% by weight of carbohydrate derived from non-animal sources (e.g., plant, fungi, microbes, algae).

In some embodiments, the yoghurt-like food products comprise less than 3%, less than 2.75%, or less than 2.5% by weight of monosaccharides and disaccharides.

In some embodiments, the yoghurt-like food products further comprise at least 0.5% by weight of lactic acid.

In some embodiments, the yoghurt-like food products further comprise between 0.115% and 0.23% by weight of calcium.

In some embodiments, the yoghurt-like food products are essentially free of whey protein. In some embodiments, the yoghurt-like food products are essentially free of casein. In some embodiments, the yoghurt-like food products are essentially free of other animal proteins than whey protein or casein. Non-limiting examples of such other animal proteins include glycosylation-dependent cell adhesion molecule 1 precursor, beta-2-microglobulin, epididymal secretory protein E1 isoform X1, immunoglobulin lambda-like polypeptide 1 isoform X1, zinc-alpha-2-glycoprotein precursor, immunoglobulin lambda-like polypeptide 1 precursor, folate receptor alpha precursor, immunoglobulin J chain precursor, protein phosphatase 1 regulatory subunit 14A, prostaglandin-H2 D-isomerase precursor, ribonuclease pancreatic precursor, centromere protein M, nucleobindin-1 precursor, allergen Bos d 2 precursor, apolipoprotein E precursor, pancreatic secretory granule membrane major glycoprotein GP2 isoform X1, keratin type II cytoskeletal 1, ectonucleotide pyrophosphatase/phosphodiesterase family member 6 isoform X7, alpha-1-acid glycoprotein precursor, butyrophilin subfamily 1 member A1 precursor, polymeric immunoglobulin receptor precursor, alpha-2-HS-glycoprotein precursor, xanthine dehydrogenase/oxidase, alpha-1-antiproteinase isoform X1, beta-2-glycoprotein 1 precursor, leucine zipper putative tumor suppressor 2 isoform X1, vitamin D-binding protein precursor, ceruloplasmin precursor, multidrug resistance-associated protein 4 isoform X4, caskin-1 isoform X5, serotransferrin precursor, protein SCAF11 isoform X1, cytoplasmic dynein 1 heavy chain 1 isoform X1, rho guanine nucleotide exchange factor 1 isoform X6, and usherin isoform X1.

In some embodiments, the yoghurt-like food products are essentially free of lactose.

In some embodiments, the yoghurt-like food products are essentially free of animal lipid.

In some embodiments, the yoghurt-like food products are essentially free of animal proteins other than the one or more milk proteins.

In some embodiments, the yoghurt-like food products are essentially free of casein. In some embodiments, the yoghurt-like food products are essentially free of whey proteins other than β-lactoglobulin and/or α-lactoalbumin.

In some embodiments, the yoghurt-like food products are essentially free of stabilizers (e.g., pectin, locust bean gum, gellan gum, gelatin, xanthan gum, native or modified food starches and flours, carrageenan, guar gum, tara gum).

In some embodiments the yogurt-like food products are set style yogurts. In some embodiments, the yoghurt-like food products are drinkable yogurts.

In some embodiments, the yoghurt-like food products comprise at least 0.5%, at least 1%, at least 1.5%, at least 2%, or at least 2.5% by weight of branched amino acids.

In some embodiments, the yoghurt-like food product have a pH of less than 5.5, less than 5.3, less than 5.1, less than 5, less than 4.9, less than 4.8, less than 4.7, less than 4.6, or less than 4.5; between 3.8 and 5.5, 5, 4.9, 4.8, 4.7, 4.6, 4.5, 4.4, 4.3, 4.2, 4.1, 4, or 3.9; between 3.9 and 5.5, 5, 4.9, 4.8, 4.7, 4.6, 4.5, 4.4, 4.3, 4.2, 4.1, 4; between 4 and 5.5, 5, 4.9, 4.8, 4.7, 4.6, 4.5, 4.4, 4.3, 4.2, 4.1; between 4.1 and 5.5, 5, 4.9, 4.8, 4.7, 4.6, 4.5, 4.4, 4.3, 4.2; between 4.2 and 5.5, 5, 4.9, 4.8, 4.7, 4.6, 4.5, 4.4, 4.3; between 4.3 and 5.5, 5, 4.9, 4.8, 4.7, 4.6, 4.5, 4.4; between 4.4 and 5.5, 5, 4.9, 4.8, 4.7, 4.6, 4.5; between 4.5 and 5.5, 5, 4.9, 4.8, 4.7, 4.6; between 4.6 and 5.5, 5, 4.9, 4.8, 4.7; between 4.7 and 5.5, 5, 4.9, or 4.8; between 4.8 and 5.5, 5, 4.9, or 4.8; between 4.9 and 5.5, or 5; or between 5 and 5.5.

In some embodiments, the yoghurt-like food products have a viscosity of between 4E+05 and 1E+03 Pa-s at shear rates of between 0.01/s and 0.1/s. In some embodiments, the yoghurt-like food products have a viscosity of between 1E+04 and 100 Pa-s at shear rates of between 0.1/s and 1/s. In some embodiments, the yoghurt-like food products have a viscosity of between 1000 Pa-s and 0.1 Pa-s at shear rates of between 1/s and 100/s. In some embodiments, the yoghurt-like food products have a viscosity of between 4E+05 and 1E+03 Pa-s at shear rates of between 0.01/s and 0.1/s, a viscosity of between 1E+04 and 100 Pa-s at shear rates of between 0.1/s and 1/s, and a viscosity of between 1000 Pa-s and 0.1 Pa-s at shear rates of between 1/s and 100/s.

Methods for Producing Food Products

In another aspect, provided herein are methods for producing the food products provided herein. The methods comprise the steps of: a) obtaining one or more milk proteins; b) obtaining one or more non-animal proteins; c) optionally hydrolyzing the one or more non-animal proteins; and d) combining the one or more milk proteins and the one or more non-animal proteins or one or more hydrolyzed non-animal protein under conditions that provide food products with desirable attributes.

In some embodiments, the methods for producing the food products provided herein further comprise the step of adding, at any step during the preparation of the food products, one or more other components (e.g., any of the minerals, lipids, carbohydrates, taste agents, coloring agents, or other components described herein). As one of skill in the art can appreciate, the amount of each components used in these methods can be calculated to produce any of the food products described herein.

Methods for Obtaining Milk Proteins and Non-Animal Proteins

In some embodiments, the milk proteins are/or non-animal proteins are obtained from natural sources (e.g., milk, plants, microbes). Methods for isolating proteins from natural sources are known in the art. Suitable methods include but are not limited to methods that provide protein isolates, protein concentrates, protein flours, and partially purified or purified proteins from natural sources.

In other embodiments, the milk proteins and/or non-animal proteins are obtained as recombinant proteins according to methods known in the art (see, for example, Sambrook et al., Molecular Cloning: A Laboratory Manual, 2d ed., Cold Spring Harbor Laboratory Press, Cold Spring Harbor, N.Y., 1989; Ausubel et al., Current Protocols in Molecular Biology, Greene Publishing Associates, 1992, and Supplements to 2002); Harlow and Lane, Antibodies: A Laboratory Manual, Cold Spring Harbor Laboratory Press, Cold Spring Harbor, N.Y., 1990; Taylor and Drickamer, Introduction to Glycobiology, Oxford Univ. Press, 2003; Worthington Enzyme Manual, Worthington Biochemical Corp., Freehold, N.J.; Handbook of Biochemistry: Section A Proteins, Vol I, CRC Press, 1976; Handbook of Biochemistry: Section A Proteins, Vol II, CRC Press, 1976; Essentials of Glycobiology, Cold Spring Harbor Laboratory Press, 1999). Methods for producing recombinant milk proteins and recombinant non-animal proteins are known in the art (see, for example, Batt et al. 1990 Agric. Biol. Chem. 54(4):949; Saito et al. 2002 J. Biochemie 132:77; Tatsumi et al. 2012 Biosci. Biotechnol. Biochem. 76(3):478; Katakura et al. 1997 Cytotechnology 23(1-3):133; Choi et al. 2008 Glyconj. J. 25(6):581).

In some embodiments, the non-animal proteins are hydrolyzed prior to use. Hydrolyzing native or recombinant non-animal proteins can be accomplished chemically or enzymatically (e.g., using proteases such as trypsin, pepsin, or chymotrypsin). Alternatively, hydrolyzed recombinant non-animal proteins can be obtained by producing recombinant fragments of non-animal proteins (i.e., by fermenting recombinant host cells that comprise nuclei acids encoding fragments of non-animal proteins). In some embodiments, hydrolyzed recombinant non-animal proteins are produced in recombinant host cells that also produce recombinant proteases that can provide specific mixtures of hydrolyzed recombinant non-animal proteins.

Methods for Obtaining Recombinant Milk Proteins and Recombinant Non-Animal Proteins In some embodiments in which the milk proteins and/or non-animal proteins are obtained as recombinant proteins, the methods comprise the steps of: a) obtaining a nucleic acid (e.g., vectors) encoding the recombinant protein; b) introducing the nucleic acid into host cells to obtain recombinant host cells; c) culturing the recombinant host cells in culture media under conditions suitable for production and/or secretion of the recombinant protein; and d) optionally isolating the recombinant protein.

The nucleic acid typically includes: a promoter (e.g., yeast promoter, bacterial promoter, mammalian promoter); optionally a sequence encoding a signal sequence; a sequence encoding a protein; and a termination sequence, wherein the promoter is operably linked to the optional signal sequence, the optional signal sequence is operably linked to the sequence encoding the protein, and the termination sequence is operably linked to the sequence encoding the protein.

The promoter may be any suitable promoter that is functional in the host cells. In some embodiments, the promoter is a constitutive promoter. In other embodiments, the promoter is an inducible promoter. Induction may, for example, occur via glucose repression, galactose induction, sucrose induction, or phosphate repression. Non-limiting examples of suitable promoters include $P_{LAC4-PBI}$, T7 promoter, TAC promoter, GAL1 promoter, λPL promoter, λPR promoter, beta-lactamase promoter, spa promoter, CYC1 promoter, TDH3 promoter, GPD promoter, TEF1 promoter, ENO2 promoter, PGL1 promoter, GAP promoter, SUC2 promoter, ADH1 promoter, ADH2 promoter, HXT7 promoter, PHO5 promoter, CLB1 promoter, AOX1 promoter, cellulase promoter, amylase promoters, protease promoters, and xylanase promoters. In some embodiments, the promoters are promoters of stress (e.g., heat shock) response genes. Additional promoters that can be used in the present vectors are known in the art.

The signal sequence can be a signal sequence from the encoded protein or from a different protein, or a signal sequence from a yeast mating factor (e.g., any alpha mating factor), a cellulose, an amylase, a protease, or a xylanase. Additional signal sequences that can be used in the present vectors are known in the art.

The encoded protein can be any of the recombinant milk proteins or non-animal proteins described herein.

The termination sequence may be any suitable termination sequence that is functional in the host cells. Non-limiting examples of suitable termination sequences include but are not limited to the PGK1 and TPS1 termination sequences. Additional termination sequences are known in the art.

The nucleic acids can further include a bacterial origin of replication and/or a selection marker (e.g., an antibiotic resistance gene or an auxotrophic marker). Bacterial origins of replication and selection markers are known in the art. In some embodiments, the selection markers comprise alterations that decrease the production of the selective marker, thus increasing the number of copies needed to permit host cells comprising the nucleic acids to survive under selection.

In some embodiments, the nucleic acid further comprises: an additional promoter (e.g., any of the exemplary promoters described herein); optionally an additional sequence encoding a signal sequence (e.g., any of the exemplary signal sequences described herein); an additional sequence encoding a protein (e.g., any of the exemplary proteins described herein); and an additional termination sequence (e.g., any of the exemplary termination sequences described herein), wherein the additional promoter is operably linked to the optional additional signal sequence, the optional additional sequence encoding is operably linked to the additional sequence encoding the protein, and the additional sequence encoding the protein is operably linked to the additional terminal sequence. The promoter and the additional promoter can be the same or different. The termination sequence and the additional termination sequence can be the same or different. The signal sequence and the additional signal sequence can be the same or different.

Methods for introducing nucleic acids (e.g., any of the nucleic acids described herein) into host cells are well-known in the art. Non-limiting examples of such methods include but are not limited to calcium phosphate transfection, dendrimer transfection, liposome transfection (e.g., cationic liposome transfection), cationic polymer transfection, electroporation, cell squeezing, sonoporation, optical transfection, protoplast fusion, impalefection, hyrodynamic delivery, gene gun, magnetofection, and viral transduction. One skilled in the art would be able to select one or more suitable methods for introducing the nucleic acids into a cell based on the knowledge in the art that certain techniques for introducing a nucleic acid into a cell work better for different types of host cells. Exemplary methods for introducing a nucleic acid into a yeast cell are described in Kawai et al., *Bioeng. Bugs* 1:395-403, 2010.

In some embodiments, the nucleic acids are stably integrated within the genome (e.g., a chromosome) of host cells. In other embodiments, the nucleic acids are not stably integrated within the genome of host cells. Suitable sites of genomic integration include but are not limited to the Ty1 loci is *Saccharomyces cervisea*, the rDNA locus in *Pichia pastoris*, other transposable elements that have copies scattered throughout the genome of the host cells, sequences containing tandem repeats, intergenic sequences, coding sequences (e.g., the AOX1 gene in *Pichia pastoris*), glucoamylase loci, cellulase loci, amylase loci, xylanase loci, secondary metabolite loci, protease loci, high transcribed loci, GLA loci, telomeric regions, and rRNA loci. In some embodiments, the nucleic acids are randomly integrated within the genome of the recombinant host cell.

The host cells can be fungal cells or bacterial cells or protozoa cells. In some embodiments, the host cells are generally recognized as safe (GRAS) industrial stains.

Examples of suitable fungal cells include but are not limited to *Aspergillus niger*, *Aspergillus niger* var. *awamori*, *Aspergillus oryzae*, *Candida guilliermondii*, *Candida lipolytica*, *Candida pseudotropicalis*, *Candida utilis*,

*Endothia parasitica, Eremothecium ashbyii, Fusarium moniliforme, Kluyveromyces lactis, Kluyveromyces marxianus* var. *lactis, Morteirella vinaceae* var. *raffinoseutilizer, Mucor miehei, Mucor miehei* var. *Cooney* en *Emerson, Mucor pusillus* Lindt, *Penicillium roquefortii, Pichia pastoris, Rhizopus niveus, Saccharomyces cervisea, Saccharomyces fragilis,* and *Trichoderma reesei.*

Examples of suitable bacterial cells include but are not limited to *Acetobacter* suboxydans, *Acetobacter xylinum, Actinoplane missouriensis, Bacillus cereus, Bacillus coagulans, Bacillus licheniformis, Bacillus stearothermophilus, Bacillus subtilis, Escherichia coli, Lactobacillus bulgaricus, Lactococcus lactis, Lactococcus lactis* Lancefield Group N, *Leuconostoc citrovorum, Leuconostoc dextranicum, Leuconostoc mesenteroides* strain NRRL B-512(F), *Micrococcus lysodeikticus, Streptococcus cremoris, Streptococcus lactis, Streptococcus lactis* subspecies *diacetylactis, Streptococcus thermophilus, Streptomyces chattanoogensis, Streptomyces griseus, Streptomyces natalensis, Streptomyces olivaceus, Streptomyces olivochromogenes, Streptomyces rubiginosus,* and *Xanthomonas campestris.*

Examples of suitable protozoa cells include but are not limited to *Tetrahymena thermophile, Tetrahymena hegewischi, Tetrahymena hyperangularis, Tetrahymena malaccensis, Tetrahymena pigmentosa, Tetrahymena pyriformis,* and *Tetrahymena vorax.* Additional strains that can be used as host cells are known in the art.

In some embodiments, the recombinant host cells further comprise genetic modifications that improve production of the recombinant proteins. Non-limiting examples of such genetic modifications include altered promoters, altered kinase activities, altered protein folding activities, altered protein secretion activities, and altered gene expression induction pathways. In some such embodiments, the recombinant host cells comprise genetic modifications that reduce the activity of one or more proteases produced by the host cells.

In some embodiments, the recombinant host cells further comprise endogenous glycosyltransferases that can produce endogenous oligosaccharides and recombinant proteins bearing those endogenous oligosaccharides. In some embodiments, the recombinant host cells comprise heterologous glycosyltransferases that can produce heterologous oligosaccharides and recombinant proteins bearing those heterologous oligosaccharides. In some embodiments, the recombinant proteins bearing endogenous oligosaccharides or heterologous oligosaccharides have native glycosylation patterns. In other embodiments, the recombinant proteins bearing endogenous oligosaccharides or heterologous oligosaccharides have non-native glycosylation patterns. Non-limiting examples of such endogenous or heterologous glycosyltransferases include fucosyltransferases, galactosyltransferases, glucosyltransferases, xylosyltransferases, acetylases, glucoronyltransferases, glucoronylepimerases, sialyltransferases, mannosyltransferases, sulfotransferases, .beta.-acetylgalactosaminyltransferases, and N-acetylglucosaminyltransferases. Non-limiting examples of such endogenous or heterologous oligosaccharides include lactose, 2-fucosyl-lactose, lacto-N-tetraose, lacto-N-neotetraose, lacto-N-fucopentaose I, lacto-N-fucopentaose II, lacto-N-fucopentaose III, lacto-N-difucopentaose I, sialyllactose, 3-sialyllactose, sialyltetrasaccharide a, sialyltetrasaccharide b, sialyltetrasaccharide c, disialyltetrasaccharide and sialyl lacto-N-fucopentaose. In some embodiments, the heterologous glycosyltransferases are human glycosyltransferases that produce human oligosaccharides and recombinant proteins bearing such human oligosaccharides. In some embodiments, the heterologous glycosyltransferases are *Bos taurus* glycosyltransferases that produce *Bos taurus* oligosaccharides and recombinant proteins bearing such *Bos taurus* oligosaccharides.

In some embodiments, the recombinant host cells further comprise endogenous or heterologous phosphatases. In some such embodiments, the recombinant host cells produce recombinant proteins that have native phosphorylation patterns. In other such embodiments, the recombinant produce recombinant proteins that have non-native phosphorylation patterns.

The culturing of the recombinant host cells can be performed in any suitable fermentation vessel, including but not limited to a culture plate, a flask, or a fermentor (e.g., stirred tank fermentor, an airlift fermentor, a bubble column fermentor, a fixed bed bioreactor, or any combination thereof), and at any scale known in the art. Suitable culture media include any culture medium in which the recombinant host cells provided herein can grow and/or remain viable. In some embodiments, the culture media are aqueous media comprising carbon, nitrogen (e.g., anhydrous ammonia, ammonium sulfate, ammonium nitrate, diammonium phosphate, monoammonium phosphate, ammonium polyphosphate, sodium nitrate, urea, peptone, protein hydrolysates, yeast extract), and phosphate sources. The culture media can further comprise salts, minerals, metals, other nutrients, emulsifying oils, and surfactants. Non-limiting examples of suitable carbon sources include monosaccharides, disaccharides, polysaccharides, acetate, ethanol, methanol, methane, or one or more combinations thereof. Non-limiting examples of monosaccharides include dextrose (glucose), fructose, galactose, xylose, arabinose, and combinations thereof. Non-limiting examples of disaccharides include sucrose, lactose, maltose, trehalose, cellobiose, and combinations thereof. Non-limiting examples of polysaccharides include starch, glycogen, cellulose, amylose, hemicellulose, and combinations thereof. Suitable conditions for production of the recombinant proteins are those under which the recombinant host cells provided herein can grow and/or remain viable. Non-limiting examples of such conditions include suitable pH, suitable temperature, and suitable oxygenation. In some embodiments, the culture media further comprise proteases (e.g., plant-based proteases) that can prevent degradation of the recombinant proteins, protease inhibitors that reduce the activity of proteases that can degrade the recombinant proteins, and/or sacrificial proteins that siphon away protease activity.

The identities of the recombinant milk or non-animal proteins produced by the recombinant hosts cells can be confirmed by HPLC quantification, Western blot analysis, polyacrylamide gel electrophoresis, and 2-dimensional mass spectroscopy (2D-MS/MS) sequence identification.

Methods for isolating (e.g., purifying) a recombinant protein from culture media are well-known in the art. Exemplary methods for isolating (e.g., purifying) recombinant milk proteins are described in Imafidon et al., *Crit. Rev. Food Sci. Nutrition* 37:663-669, 1997; Simons, et al., *Protein Eng.* 6: 763-770 (1993); Hansson, et al., *Protein Express. Purif.* 4:373-381, 1993; U.S. Pat. No. 6,121,421; Choi et al., *J. Agric. Food Chem.* 49(4):1761-1766, 2001). Proteins can be separated on the basis of their molecular weight, for example, by size exclusion/exchange chromatography, ultrafiltration through membranes, gel permeation chromatography, or density centrifugation. In some embodiments, the proteins can be separated based on their surface charge or hydrophobicity/hydrophilicity, for example, by isoelectric precipitation, anion exchange chromatography, cation exchange chromatography, or reverse phase chromatography. Proteins also can be separated on the basis of their solubility, for example, by ammonium sulfate precipitation, isoelectric precipitation, surfactants, detergents, or solvent extraction. Proteins also can be separated by their affinity to another molecule, using, for example, hydrophobic interaction chromatography, reactive dyes, or hydroxyapatite. Affinity chromatography also can include using antibodies having specific binding affinity for the protein, nickel NTA for His-tagged recombinant proteins, lectins to bind to sugar moieties on a glycoprotein, or other molecules which specifically binds the protein. Generally, centrifugation at an optimum pH yields purification efficiency >95%. Isoelectric points (pI) of native caseins and whey proteins are known, and are, for example, 4.91 for *Bos taurus* α-s1-casein, 4.1 for *Bos taurus* α-s2-casein, 4.5 for *Bos taurus* β-casein, pH 4.1 for *Bos taurus* κ-casein, 4.2 for *Bos taurus* α-lactalbumin, and 5.2 for *Bos taurus* β-lactoglobulin. Other methods for protein purification include membrane filtration to remove any potential bacteria or contaminants, followed by lyophilization for protein isolation.

In some embodiments, the methods and compositions provide for a production cost that is competitive at or below $1,000/kg, $500/kg, $10/kg, $1.0/kg, $0.10/kg, $0.010/kg or $0.0010/kg of recombinant protein. In some embodiments, the cost is below $0.009, $0.007, $0.006, $0.005/kg of recombinant protein.

Methods for Producing Micelles

In some embodiments, the methods further comprise the step of producing micelles. The micelles produced can be any of the micelles described herein (and can have any of the physical characteristics of micelles described herein).

In some embodiments, the micelles are produced by homogenizing one or more milk proteins, or one or more non-animal proteins, or mixtures thereof. In some embodiments, the micelles are produced by culturing the recombinant host cells in a culture medium under conditions that permit release of micelles. Suitable culture media for use in these methods are known in the art. Micelle formation can be monitored by microscopy, light scattering, or refractometry.

The degree of micelle formation achieved and the type of micelles formed, and hence the final textures of the compositions comprising such micelles can be controlled to a certain degree by varying parameters during micelle formation. For example, micelle sizes can be adjusting by titrating types and amounts of milk proteins and/or non-animal proteins and/or other components (e.g., lipids, carbohydrates), or by titrating the amount of mechanical energy used during homogenization (e.g., extent of vortex int, agitating, sonicating). Micelle densities can be adjusted by centrifugation or filtration techniques. Micelle formation can further be affected by pH, temperature, and presence of salts.

Some of these methods further include isolating (e.g., purifying) micelles. Methods of isolating (e.g., purifying) a micelle from a liquid are well-known in the art (e.g., ultra-centrifugation).

Post-Processing Methods

In some embodiments, the methods for producing the food products provided herein further comprise the step of dehydrating (e.g., to obtain powders). Methods for dehydrating are known in the art and include, but are not limited to, spray drying, roller drying, fluid bed drying, freeze drying, drying with ethanol, and evaporating (see, for example, Handbook for Drying for Dairy Products, C. Anandharamakrishnan (ed.) ISBN:978-1-118-93049-6, Wiley-Blackwell).

Additional post-processing methods include but are not limited to membrane processing, extrusion, microwave processing, radio frequency processing, non-thermal processing (e.g., using high pressure, ionizing radiation [e.g., electron beam, gamma irradiation, UV], ultrasonication, gas treatment (e.g., with ozone, chlorine dioxide, cold plasma), pulsed electric field treatment, and oscillating magnetic field treatment.

Methods for Producing Yoghurt-Like Food Products

Also provided herein are methods for producing the yoghurt-like food products provided herein.

The invention is based on the identification of process parameters and conditions that provide similar pH profiles for fermentations of lactic acid bacteria in the presence of the milk proteins and non-animal proteins provided herein as is obtained with the same lactic acid bacteria in traditional yoghurt fermentation from dairy milk. Such pH profiles require rapid production of lactic acid by the lactic acid bacteria, leading to a drop in pH of the fermentation to between 3.8 and 5 in a time frame that permits commercial batch runs (currently about 6 hours). The invention is further based on the discovery that the composition derived from such fermentation of lactic acid bacteria in the presence of the milk proteins and plant proteins provided herein has similar attributes (e.g., viscosity) as dairy yoghurt.

These discoveries enable the production of the yoghurt-like food products provided herein using similar processes and process parameters (e.g., homogenization, pasteurization temperature, pasteurization time, use of lactic acid bacteria) as are currently used in the commercial production of dairy yoghurt, obviating a need for significant modifications of commercial yoghurt production processes.

In some embodiments, the methods for producing the yoghurt-like food products provided herein comprise the steps of: a) obtaining one or more milk proteins and one or more non-animal proteins; b) combining the one or more milk proteins, the one or more non-animal proteins, and lactic acid bacteria to obtain a milk-type culture; and c) fermenting the milk-type culture for less than 6 hours to a pH of between 3.8 and 4.8 to obtain the yoghurt-like food product.

The milk proteins and non-animal proteins can be native or recombinant milk proteins and non-animal proteins or hydrolyzed non-animal proteins, and can be obtained as described herein. They can be obtained in either solid or solubilized forms.

The inventors have made the surprising discovery that the type of milk protein used can have a significant impact on the attributes (e.g., viscosity) of the yoghurt-like food products obtained. Therefore, in some embodiments, only one milk protein is used, wherein the one milk protein is β-lactoglobulin. In some such embodiments, the homogenous milk-type mixture comprises between 0.5% and 10%, 9.5%, 9%, 8.5%, 8%, 7.5%, 7%, 6.5%, 6%, 5.5%, 5%, 4.5%, 4%, 3.5%, 3%, 2.5%, 2%, 1.5%, or 1%; between 1% and 10%, 9.5%, 9%, 8.5%, 8%, 7.5%, 7%, 6.5%, 6%, 5.5%, 5%, 4.5%, 4%, 3.5%, 3%, 2.5%, 2%, or 1.5%; between 1.5% and 10%, 9.5%, 9%, 8.5%, 8%, 7.5%, 7%, 6.5%, 6%, 5.5%, 5%, 4.5%, 4%, 3.5%, 3%, 2.5%, or 2%; between 2% and 10%, 9.5%, 9%, 8.5%, 8%, 7.5%, 7%, 6.5%, 6%, 5.5%, 5%, 4.5%, 4%, 3.5%, 3%, or 2.5%; between 2.5% and 10%, 9.5%, 9%, 8.5%, 8%, 7.5%, 7%, 6.5%, 6%, 5.5%, 5%, 4.5%, 4%, 3.5%, or 3%; between 3% and 10%, 9.5%, 9%, 8.5%, 8%, 7.5%, 7%, 6.5%, 6%, 5.5%, 5%, 4.5%, 4%, or 3.5%; between 3.5% and 10%, 9.5%, 9%, 8.5%, 8%, 7.5%, 7%, 6.5%, 6%, 5.5%, 5%, 4.5%, or 4%; between 4% and 10%, 9.5%, 9%, 8.5%, 8%, 7.5%, 7%, 6.5%, 6%, 5.5%, 5%, or 4.5%; between 4.5% and 10%, 9.5%, 9%, 8.5%, 8%, 7.5%, 7%, 6.5%, 6%, 5.5%, or 5%; between 5% and 10%, 9.5%, 9%, 8.5%, 8%, 7.5%, 7%, 6.5%, 6%, or 5.5%; between 5.5% and 10%, 9.5%, 9%, 8.5%, 8%, 7.5%, 7%, 6.5%, or 6%; between 6% and 10%, 9.5%, 9%, 8.5%, 8%, 7.5%, 7%, or 6.5%; between 6.5% and 10%, 9.5%, 9%, 8.5%, 8%, 7.5%, or 7%; between 7% and 10%, 9.5%, 9%, 8.5%, 8%, or 7.5%; between 7.5% and 10%, 9.5%, 9%, 8.5%, or 8%; between 8% and 10%, 9.5%, 9%, or 8.5%; between 8.5% and 10%, 9.5%, or 9%; between 9% and 10%, or 9.5%; or between 9.5% and 10% by weight of β-lactoglobulin.

The inventors have made the surprising discovery that in the absence of non-animal protein (e.g., when using only milk protein) the fermenting of the milk-type culture does not produce a pH of less than 4.8 in less than 6 hours. Without wishing to be bound by theory, it is believed that milk protein does not comprise the nutrients needed for suitable lactic acid fermentation. Therefore, the milk-type culture comprises such amounts of non-animal protein that fermenting the milk-type culture for less than 6 hours provides a pH of between 3.8 and 4.8. In some embodiments, the homogenous milk-type mixture comprises between 0.2% and 4%, 3.5%, 3%, 2.5%, 2%, 1.5%, 1%, or 0.5%; between 0.5% and 4%, 3.5%, 3%, 2.5%, 2%, 1.5%, or 1%; between 1% and 4%, 3.5%, 3%, 2.5%, 2%, or 1.5%; between 1.5% and 4%, 3.5%, 3%, 2.5%, or 2%; between 2% and 4%, 3.5%, 3%, or 2.5%; between 2.5% and 4%, 3.5%, or 3%; between 3% and 4%, or 3.5%; or between 3.5% and 4% by weight of non-animal protein. In some such embodiments, the non-animal protein is pea protein. In other such embodiments, the non-animal protein is fungal protein. In some embodiments, the homogenous milk-type mixture comprises between 0.01% and 1%, 0.9%, 0.8%, 0.7%, 0.6%, 0.5%, 0.4%, 0.3%, 0.2%, 0.1%, or 0.05%; between 0.05% and 1%, 0.9%, 0.8%, 0.7%, 0.6%, 0.5%, 0.4%, 0.3%, 0.2%, or 0.1%; between 0.1% and 1%, 0.9%, 0.8%, 0.7%, 0.6%, 0.5%, 0.4%, 0.3%, or 0.2%; between 0.2% and 1%, 0.9%, 0.8%, 0.7%, 0.6%, 0.5%, 0.4%, or 0.3%; between 0.3% and 1%, 0.9%, 0.8%, 0.7%, 0.6%, 0.5%, or 0.4%; between 0.4% and 1%, 0.9%, 0.8%, 0.7%, 0.6%, or 0.5%; between 0.5% and 1%, 0.9%, 0.8%, 0.7%, or 0.6%; between 0.6% and 1%, 0.9%, 0.8%, or 0.7%; between 0.7% and 1%, 0.9%, or 0.8%; between 0.8% and 1%, or 0.9%; or between 0.9% and 1% by weight of hydrolyzed non-animal protein. In some such embodiments, the hydrolyzed non-animal protein is hydrolyzed pea protein. In other such embodiments, the hydrolyzed non-animal protein is hydrolyzed fungal protein. In some embodiments, the homogenous mixture comprises β-lactoglobulin and pea protein or fungal protein at a ratio of between 19:1 and 1:3.

The lactic acid bacteria can be in freeze-dried solid or solubilized bulk culture form. Non-limiting examples of lactic acid bacteria suitable for use include all lactic acid bacteria used for conventional fermentative production of food products, including but not limited to the lactic acid bacteria disclosed herein.

In some embodiments, the methods further comprise the step of including one or more lipids (e.g., non-animal lipids), one or more carbohydrates (e.g., non-animal carbohydrates), micelles, or other components provided herein (e.g., minerals). In some such embodiments, lipids and water are added in the form of lipid-in-water or water-in-lipid emulsions. In some embodiments, the one or more carbohydrates are mono- and/or disaccharides. Is some such embodiments, no more than 2.6% by weight of mono- and/or disaccharides are added.

The one or more milk proteins, one or more non-animal proteins, lactic acid bacteria, and optional lipids, carbohydrates, micelles, and/or other components can be combined by any method known in the art, including methods that use mechanical energy (e.g., vortexing, agitating [e.g., in a conventional mixer under moderate agitation of between 100 rpm and 1,000 rpm], shearing [e.g., shearing in a conventional blender at medium speed], sonication, high pressure), heating (e.g., to a temperature greater than ambient temperature, greater than 30° C., 40° C., 50° C., 60° C., between 30° C. and 60° C., or between 40° C. and 50° C.), and/or homogenization (e.g., in a high-pressure [e.g., between 35 bar and 250 bar]). In some embodiments, the one or more milk proteins or one or more non-animal proteins or lactic acid bacteria or optional other ingredients are included in a stepwise manner to protect them from exposure to mechanical energy or heating or homogenization methods that could render them inactive (e.g., lactic acid bacteria can be added after all other components are combined to protect them from being rendered inactive during blending and/or heating).

In some embodiments, the methods further comprise a pasteurization step. Pasteurization is typically used to destroy pathogenic microorganisms in food products. It can furthermore unfold quarternary and tertiary protein structures to expose buried amino acid residues and permit formation of new intermolecular bonds via van-der-Waals, electrostatic, covalent, hydrophobic, and/or H-bonding forces. Such new intermolecular bonds can lead to formation of gels that define textural properties of food products such as yoghurt. In the methods provided herein, pasteurization can occur at pasteurization temperatures of between 60 C and 100 C and over pasteurization times of between 10 second and 30 minutes, by any means known in the art (e.g., batch, vat; continuous, high temperature short time [HTST]; continuous, higher heat shorter time [HHST]; continuous, ultra-pasteurization; aseptic, ultra-high temperature [UHT]; sterilization [e.g., retort, direct steam injection, indirect steam injection]). Typically, the higher the pasteurization temperatures the lower the required pasteurization times. In some embodiments, the pasteurization temperatures are between 78 C and 85 C and the pasteurization times are between 30 seconds and 5 minutes. In other embodiments, the pasteurization temperatures are between 90 C and 95 C and the pasteurization times are between 10 seconds and 30 seconds. In yet other embodiments, the pasteurization temperatures are between 65 C and 75 C and the pasteurization times are between 1 minute and 30 minutes. Pasteurization is typically followed by cooling to a suitable temperature (e.g., less than 45 C, less than 40 C, less than 37 C, less than 35 C, less than 30 C, ambient temperature; particularly before lactic acid bacteria are added). In some embodiments, pasteurization occurs through non-thermal means.

In some embodiments, the milk-type culture is fermented for less than 6 hours to a pH of between 3.8 and 4.8, 4.7, 4.6, 4.5, 4.4, 4.3, 4.2, 4.1, 4, or 3.9; between 3.9 and 4.8, 4.7, 4.6, 4.5, 4.4, 4.3, 4.2, 4.1, 4; between 4 and 4.8, 4.7, 4.6, 4.5, 4.4, 4.3, 4.2, 4.1; between 4.1 and 4.8, 4.7, 4.6, 4.5, 4.4, 4.3, 4.2; between 4.2 and 4.8, 4.7, 4.6, 4.5, 4.4, 4.3; between 4.3 and 4.8, 4.7, 4.6, 4.5, 4.4; between 4.4 and 4.8, 4.7, 4.6, 4.5; between 4.5 and 4.8, 4.7, 4.6; between 4.6 and 4.8, 4.7; or between 4.7 and 4.8. In some embodiments, the milk-type culture is fermented for less than 6 hours to a pH lower than the pI of the one or more milk proteins comprised in the milk-type culture.

In some embodiments, the methods further comprise the step of cooling the yoghurt-like food products to end the fermenting. Cooling can be done in a cooler or refrigerator.

EXAMPLES

The following examples are included to demonstrate preferred embodiments of the invention. It should be appreciated by those of skill in the art that the techniques disclosed in the examples that follow represent techniques discovered by the inventors to function well in the practice of the invention. However, those of skill in the art should, in light of the present disclosure, appreciate that many changes can be made in the specific embodiments that are disclosed and still obtain a like or similar result without departing from the spirit and scope of the invention, therefore all matter set forth or shown in the accompanying drawings is to be interpreted as illustrative and not in a limiting sense.

Example 1: Production of Yoghurt-Like Food Products Comprising Milk Proteins and Non-Animal Proteins Coconut oil was melted (at around 50-55 C) and blended with water in a Ninja blender to obtain an emulsion. Dry ingredients selected from Table 3 where added to the emulsion under medium shear speed.

TABLE 3

Dry Ingredient Compositions

| | Sample | | | | |
|---|---|---|---|---|---|
| Pasteurization | Whole Milk Yogurt 85 C. for 10 mins | Yogurt-like (4% LGB) 85 C. for 10 mins | Yogurt-like (2% LGB + 2% Pea) 85 C. for 10 mins | Yogurt-like (2% LGB − 1% Pea) 85 C. for 10 mins | Yogurt-like (4% Pea) 85 C. for 10 mins |
| Total Solid (%) | 12.100 | 12.39 | 10.951 | 9.880 | 12.075 |
| Total Fat (%) | 3.250 | 3.544 | 3.522 | 3.283 | 3.500 |
| Total Carb (%) | 4.660 | 4.022 | 2.722 | 2.663 | 4.000 |
| Total Protein (%) | 3.470 | 3.972 | 3.866 | 3.085 | 3.763 |
| Protein from LGB (%) | N/A | 3.910 | 2.118 | 2.134 | N/A |
| Protein from Pea (%) | N/A | N/A | 1.761 | 0.940 | 3.706 |
| Sodium (mg/100 g) | 46.000 | 42.322 | 40.000 | 47.500 | 45.143 |
| Phosphorus (mg/100 g) | 95.000 | 79.931 | 94.768 | 85.000 | 117.150 |
| Calcium (mg/100 g) | 121.000 | 109.989 | 110.022 | 105.921 | 110.000 |
| Potassium (mg/100 g) | 155.000 | 158.407 | 141.145 | 144.298 | 150.000 |

β-lactoglobulin (LGB) was supplied as enriched protein isolate that was made using enrichment protocol highlighted in International Dairy Journal 14(5): 411-419, May 2004. The enriched protein isolate comprised 90% by weight of protein (65% enriched beta-lactoglobulin and 25% other enriched whey protein fractions), 5% by weight of water, and 5% by weight of ash. Pea protein in yoghurt-like food products was added as commercial pea protein concentrate, which comprised 80% by weight of pea protein, 6% by weight of fat, 4% by weight of carbohydrate, 5% by weight of ash, and 5% by weight of water. The total carbohydrates included carbohydrates originating from the LGB protein isolate, the pea protein concentrate, and about 2.6% of added mono- and disaccharides (e.g., glucose, sucrose).

Figure 3:
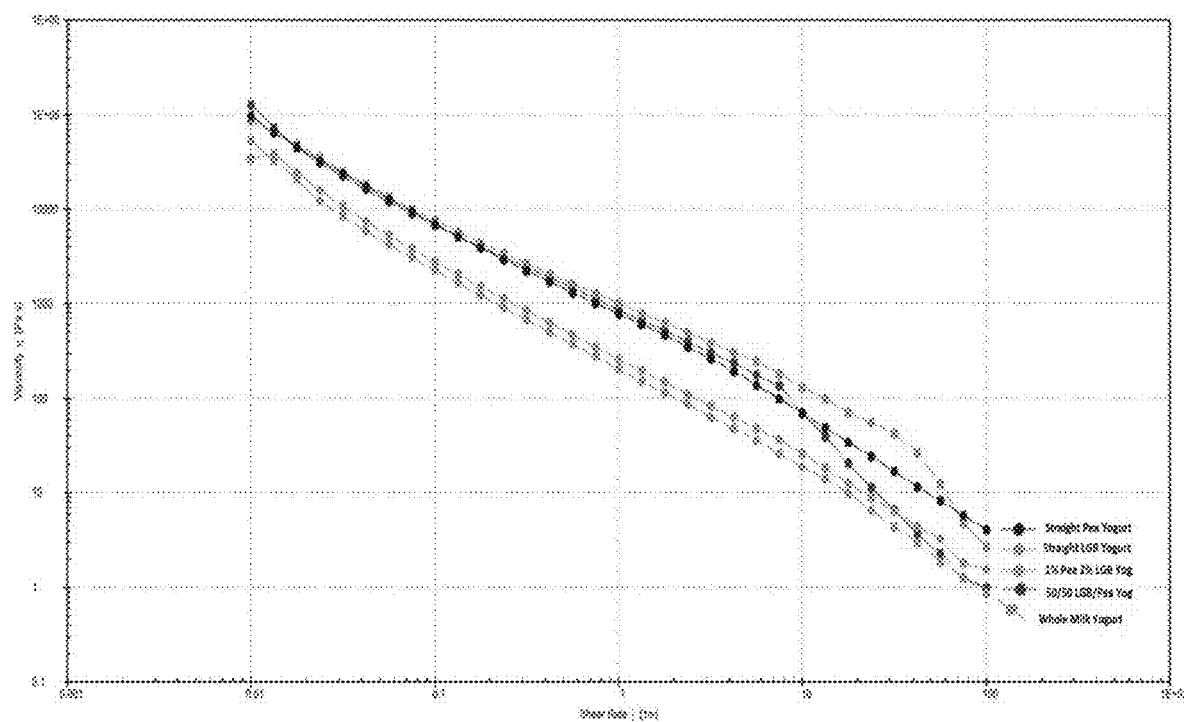
FIG. 3 shows viscosity profiles of whole milk yoghurt and yoghurt-like food products as a function of composition and shear rate, in accordance with representative embodiments of the present invention.

The mixture was then heated to 45-55 C to aid with blending, and finally homogenized at 170-175 bar (2,465 to 2,538 psi) in stage 1 and 34.5 bar (500 psi) in stage 2. The mixture was pasteurized in a stainless steel bowl at 85 C for 10 minutes, and then cooled to 43 C. 2 g of a standard lactic acid bacteria (*Streptococcus thermophilus* and *Lactobacillus bulgaricus*) culture was dissolved in 18 g of pasteurized (and subsequently cooled to ambient temperature) pea protein milk, and 1.5 mL of this culture was added to 500 mL of the mixture to obtain a milk-type culture. The milk type culture was fermented at 43 C until a pH of between 4.3 and 4.5 (~0.9% titratable acidity measured as % lactic acid) was reached and the yoghurt-like food product was obtained. As shown in FIG. 3, the milk-type cultures that comprised both (β-lactoglobulin and pea protein produced pH profiles during fermentation that were more alike that of whole milk cultures whereas cultures comprising only β-lactoglobulin or only pea protein did not reach a sufficiently acidic pH within a suitable fermentation time.

Example 2: Rheological Properties of Yoghurt-Like Food Products Comprising Milk Proteins and Non-Animal Proteins Yogurt can be classified as a viscoelastic material, having some of the elastic properties of an ideal solid and some of the flow properties of an ideal (viscous) liquid. It also exhibits time-dependent and shear rate-dependent shear thinning behavior.

The yoghurt-like food products of Example 1 were tested for flow viscosity on a rheometer to determine their flow properties under specific shear rate and shear stress conditions, wherein the flow properties were expressed as the viscosity of the yogurt gel.

Figure 2:
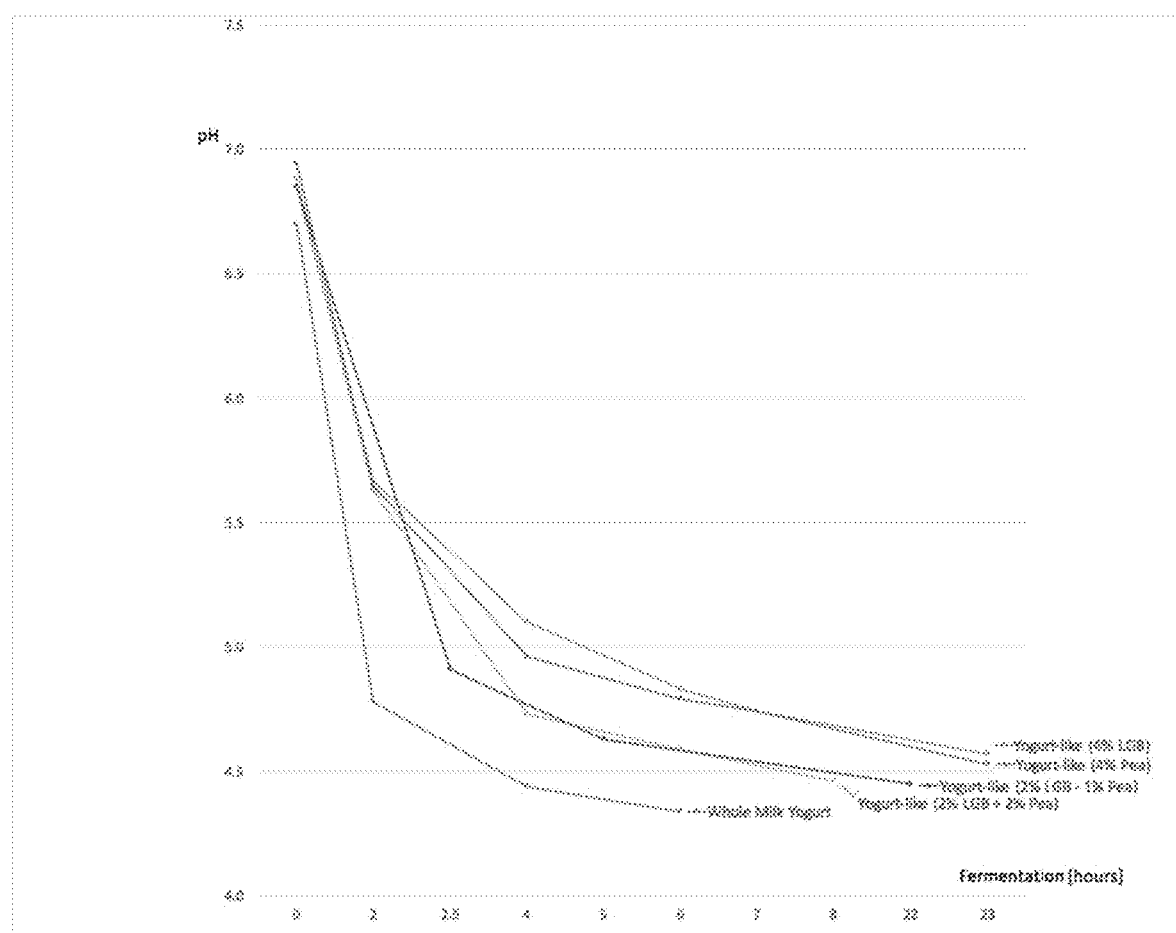
FIG. 2 shows pH profiles of whole milk yoghurt and yoghurt-like food products as a function of composition and duration of fermentation of milk-type cultures, in accordance with representative embodiments of the present invention.

As shown in FIG. 2, yoghurt-like food products that comprised only β-lactoglobulin and only pea protein were too firm at all shear rates. The yoghurt-like food product that comprised β-lactoglobulin and pea protein at a weight ratio of 1:1 had reduced viscosity at higher shear rates. The yoghurt-like food product that comprised β-lactoglobulin and pea protein at a weight ratio of 1:2 exhibited a similar viscosity profile as a function of shear rate as whole milk yoghurt and thus most closely resembled whole milk yoghurt.

All publications, patents, patent applications, sequences, database entries, and other references mentioned herein are incorporated by reference to the same extent as if each individual publication, patent, patent application, sequence, database entry, or other reference was specifically and individually indicated to be incorporated by reference. In case of conflict, the present specification, including definitions, will control. The terminology and description used herein is for the purpose of describing particular embodiments only and is not intended to limit the invention.

What is claimed is:

1. A food product that comprises:
   a single type of milk protein consisting of a recombinant β-lactoglobulin; and
   one or more native and/or recombinant non-animal proteins and/or hydrolyzed non-animal proteins,
   wherein i) the food product is essentially free of any milk protein other than the single type of milk protein consisting of a recombinant β-lactoglobulin, and ii) the recombinant β-lactoglobulin imparts on the food product a texture or a taste of a dairy product.

2. A food product of claim 1, wherein the food product comprises the recombinant β-lactoglobulin and the one or more native and/or recombinant non-animal proteins and/or hydrolyzed non-animal proteins at a weight ratio of total recombinant β-lactoglobulin to total native and/or recombinant non-animal proteins and/or hydrolyzed non-animal proteins of between 100 to 1 to 1 to 100.

3. A food product of claim 1, wherein the food product comprises between 0.1% and 40% by weight of the recombinant β-lactoglobulin, and wherein the dairy product is selected from the group consisting of milk, yoghurt, cheese, butter, cream, buttermilk, pudding, nutritional beverages, and frozen confections.

4. A food product of claim 1, wherein the food product comprises between 40% and 95% by weight of the recombinant β-lactoglobulin, and wherein the dairy product is selected from the group consisting of protein concentrate, protein isolate, whole milk powder, skim milk powder, nutritional supplements, and infant formula.

5. A food product of claim 1, wherein the one or more native and/or recombinant non-animal proteins and/or hydrolyzed non-animal proteins are one or more hydrolyzed non-animal proteins.

6. A food product of claim 1, wherein at least one of the one or more native and/or recombinant non-animal proteins or hydrolyzed non-animal proteins is a plant protein or hydrolyzed plant protein.

7. A food product of claim 1, which further comprises between 2% and 95% by weight of micelles.

8. A food product of claim 7, wherein the micelles comprise the single type of milk protein consisting of a recombinant β-lactoglobulin.

9. A food product of claim 7, wherein the micelles comprise the single type of milk protein consisting of a recombinant β-lactoglobulin and at least one of the one or more recombinant and/or native non-animal proteins and/or hydrolyzed non-animal proteins.

10. A food product of claim 1, wherein the texture is mouthfeel.

11. A method for producing a food product comprising:
   a) obtaining a single type of milk protein consisting of a recombinant β-lactoglobulin;
   b) obtaining one or more native and/or recombinant non-animal proteins;
   c) optionally hydrolyzing the one or more native and/or recombinant non-animal proteins; and
   d) combining the single type of milk protein consisting of a recombinant β-lactoglobulin and the one or more native and/or recombinant non-animal proteins or one or more hydrolyzed native and/or recombinant non-animal proteins under conditions that provide a food product, wherein i) the food product is essentially free of any milk protein other than the single type of milk protein consisting of recombinant β-lactoglobulin, and ii) the recombinant β-lactoglobulin imparts on the food product a texture or a taste of a dairy product.

12. A method of claim 11, wherein the dairy product is selected from the group consisting of milk, yoghurt, cheese, butter, cream, buttermilk, pudding, nutritional beverages, and frozen confections.

13. A method of claim 11, wherein the dairy product is selected from the group consisting of protein concentrate, protein isolate, whole milk powder, skim milk powder, nutritional supplements, and infant formula.

14. A method of claim 11, which further comprises adding, at any step during the preparation of the food product, one or more other components selected from the group consisting of minerals, vitamins, lipids, carbohydrates, taste agents, and coloring agents.

15. A method of claim 11, wherein the method comprises one or more further post-processing selected from the group consisting of dehydration, membrane processing, extrusion, microwave processing, radio frequency processing, non-thermal processing (e.g., using high pressure, ionizing radiation, ultrasonication, gas treatment, pulsed electric field treatment, and/or oscillating magnetic field treatment).

16. A method for producing a yoghurt-like food product comprising:
   a) obtaining a single type of milk protein consisting of a recombinant β-lactoglobulin;
   b) obtaining one or more native and/or recombinant non-animal proteins;
   c) optionally hydrolyzing the one or more native and/or recombinant non-animal proteins;
   d) combining the single type of milk protein consisting of a recombinant β-lactoglobulin, the one or more native and/or recombinant non-animal proteins or the one or more hydrolyzed native and/or recombinant non-animal proteins, and lactic acid bacteria to obtain a milk-type culture; and
   e) fermenting the milk-type culture for less than 6 hours to a pH of between 3.8 and 4.8 to obtain the yoghurt-like food product, wherein i) the yoghurt-like food product is essentially free of any milk protein other than the single type of milk protein consisting of recombinant β-lactoglobulin, and ii) the recombinant β-lactoglobulin imparts on the yoghurt-like food product a texture or a taste of a yoghurt dairy product.

17. A method of claim 16, wherein at least one of the native and/or recombinant non-animal proteins or hydrolyzed non-animal proteins is a plant protein or hydrolyzed plant protein.

18. A method of claim 16, wherein the method further comprises adding, at any step during the preparation of the yoghurt-like food product, one or more other components selected from the group consisting of minerals, vitamins, lipids, carbohydrates, taste agents, and coloring agents.

19. A method of claim 16, wherein the method further comprises pasteurization.

20. A food product of claim 1 wherein the recombinant β-lactoglobulin is at least 80% identical to cow β-lactoglobulin, sheep β-lactoglobulin, horse β-lactoglobulin, or goat β-lactoglobulin.

21. A food product of claim 1 wherein the recombinant β-lactoglobulin is at least 85% identical to cow β-lactoglobulin, sheep β-lactoglobulin, horse β-lactoglobulin, or goat β-lactoglobulin.

22. A food product of claim 1 wherein the recombinant β-lactoglobulin is at least 90% identical to cow β-lactoglobulin, sheep β-lactoglobulin, horse β-lactoglobulin, or goat β-lactoglobulin.

23. A food product of claim 1 wherein the recombinant β-lactoglobulin is at least 95% identical to cow β-lactoglobulin, sheep β-lactoglobulin, horse β-lactoglobulin, or goat β-lactoglobulin.

24. A food product of claim 1, wherein the recombinant β-lactoglobulin is produced by a fungal cell or a bacterial cell.

25. A food product of claim 24, wherein the fungal cell is selected from a group consisting of *Aspergillus niger, Aspergillus niger* var. *awamori, Aspergillus oryzae, Candida guilliermondii, Candida lipolytica, Candida pseudotropicalis, Candida utilis, Endothia parasitica, Eremothecium ashbyii, Fusarium moniliforme, Kluyveromyces lactis, Kluyveromyces marxianus* var. *lactis, Morteirella vinaceae* var. *raffinoseutilizer, Mucor miehei, Mucor miehei* var. Cooney et Emerson, *Mucor pusillus* Lindt, *Penicillium roquefortii, Pichia pastoris, Rhizopus niveus, Saccharomyces cervisea, Saccharomyces fragilis*, and *Trichoderma reesei*.

26. A food product of claim 1, wherein the food product further comprises a hydrolyzed native and/or recombinant β-lactoglobulin.

27. A food product of claim 6, wherein the plant protein or hydrolyzed plant protein is selected from the group consisting of pea protein, soybean protein, potato protein, oat protein, hydrolyzed pea protein, hydrolyzed soybean protein, hydrolyzed oat protein, hydrolyzed potato protein, and mixtures thereof.

28. A food product of claim 7, wherein the micelles have an average diameter of between 100 nm and 350 nm.

29. A food product of claim 1, wherein the texture is viscosity.

30. A food product of claim 1, wherein the texture is elasticity.

31. The method of claim 16, wherein a weight ratio of the single type of milk protein consisting of a recombinant β-lactoglobulin to the one or more native and/or recombinant non-animal proteins and/or hydrolyzed non-animal protein is about 20 to 1, about 10 to 1, about 9 to 1, about 8 to 1, about 7 to 1, about 6 to 1, about 5 to 1, about 4 to 1, about from 3 to 1, about 2 to 1, about 1 to 1, about 1 to 2, about 1 to 3, or about 1 to 4.

32. The method of claim 17, wherein the plant protein or hydrolyzed plant protein is selected from the group consisting of a pea protein, soybean protein, potato protein, oat protein, hydrolyzed pea protein, hydrolyzed soybean protein, hydrolyzed oat protein, hydrolyzed potato protein, and mixtures thereof.

33. A food product of claim 1, wherein the recombinant β-lactoglobulin is at least 98% identical to cow β-lactoglobulin, sheep β-lactoglobulin, horse β-lactoglobulin, or goat β-lactoglobulin.

34. A food product of claim 1, wherein the recombinant β-lactoglobulin is 100% identical to cow β-lactoglobulin, sheep β-lactoglobulin, horse β-lactoglobulin, or goat β-lactoglobulin.

35. A food product of claim 1, wherein the food product comprises: (a) between about 1% to about 5% by weight of the recombinant β-lactoglobulin, and (b) pea protein and/or hydrolyzed pea protein, soybean protein and/or hydrolyzed soybean protein, oat protein and/or hydrolyzed oat protein, or potato protein and/or hydrolyzed potato protein, or a mixture thereof, wherein the weight ratio of the total recombinant β-lactoglobulin to the total pea protein and/or hydrolyzed pea protein, soybean protein and/or hydrolyzed soybean protein, oat protein and/or hydrolyzed oat protein, potato protein and/or hydrolyzed potato protein, or mixture thereof is about 20 to 1, about 10 to 1, about 9 to 1, about 8 to 1, about 7 to 1, about 6 to 1, about 5 to 1, about 4 to 1, about 3 to 1, about 2 to 1, about 1 to 1, about 1 to 2, about 1 to 3, or about 1 to 4.

36. A food product of claim 24, wherein the fungal cell is *Aspergillus* or *Trichoderma*.

37. A food product of claim 1, wherein the food product further comprises a transesterified fatty acid ester.

38. A food product of claim 1, wherein the food product further comprises a plant-derived monoglyceride and/or diglyceride.

39. A food product of claim 1, wherein the food product further comprises a monoglyceride, diglyceride, and/or triglyceride comprising a fatty acid selected from the group consisting of butyric acid, caproic acid, caprylic acid, and capric acid.

40. A food product of claim 1, wherein the food product further comprises one or more of calcium, potassium, sodium, citrate, thiamin (vitamin B1), riboflavin (vitamin B2), niacin (vitamin B3), pantothenic acid (vitamin B5), vitamin B6 (pyridoxine), vitamin B12 (cobalamin), vitamin C, folate, vitamins A, vitamin D, vitamin E, and vitamin K.

41. The food product of claim 1, wherein the food product further comprises one or more sweetening agents selected from the group consisting of brazzein, curculin, mabinlin, miraculin, monelin, pentadin, and thaumatin.

42. The food product of claim 1, wherein the dairy product comprises native β-lactoglobulin.

\* \* \* \* \*